US010411598B2

(12) United States Patent
Li et al.

(10) Patent No.: US 10,411,598 B2
(45) Date of Patent: Sep. 10, 2019

(54) SYSTEMS AND METHODS FOR ADJUSTING ONE OR MORE THRESHOLDS IN POWER CONVERTERS

(71) Applicant: ON-BRIGHT ELECTRONICS (SHANGHAI) CO., LTD., Shanghai (CN)

(72) Inventors: Haibo Li, Shanghai (CN); Fagang Wang, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/110,300

(22) Filed: Aug. 23, 2018

(65) Prior Publication Data
US 2019/0252969 A1 Aug. 15, 2019

Related U.S. Application Data

(63) Continuation of application No. 15/945,200, filed on Apr. 4, 2018.

(30) Foreign Application Priority Data

Feb. 13, 2018 (CN) .......................... 2018 1 0149765

(51) Int. Cl.
H02M 3/158 (2006.01)
H02M 1/32 (2007.01)
(Continued)
(52) U.S. Cl.
CPC ............. H02M 3/158 (2013.01); H02M 1/32 (2013.01); H02M 3/156 (2013.01); H02M 2001/0025 (2013.01); H02M 2001/0032 (2013.01)

(58) Field of Classification Search
CPC ................. H02M 3/156; H02M 3/158; H02M 2001/0025; H02M 2001/0032; H02M 1/32
See application file for complete search history.

(56) References Cited

U.S. PATENT DOCUMENTS 9,178,418 B2   11/2015   K.S.V. et al.
9,312,859 B2    4/2016   Suhonen
(Continued)

FOREIGN PATENT DOCUMENTS

CN   1736018 A    2/2006
CN   103828237 A  5/2014
(Continued)

OTHER PUBLICATIONS

Taiwan Intellectual Property Office, Office Action dated Jan. 3, 2019, in Application No. 107113752.
(Continued)

Primary Examiner — Fred E Finch, III
Assistant Examiner — Rafael O. De León Domenech
(74) Attorney, Agent, or Firm — Faegre Baker Daniels LLP

(57) ABSTRACT

System controller and method for a power converter. For example, the system controller includes a first current controller configured to receive a first input signal and generate a first output signal based at least in part on the first input signal, a second current controller configured to receive a compensation signal and a second input signal and generate a second output signal based at least in part on the second input signal, and a drive signal generator configured to receive the first output signal and the second output signal, generate a first drive signal based at least in part on the first output signal and the second output signal, and generate a
(Continued)

second drive signal based at least in part on the first output signal and the second output signal.

46 Claims, 11 Drawing Sheets

(51) Int. Cl.
*H02M 3/156* (2006.01)
*H02M 1/00* (2006.01)

(56) References Cited

U.S. PATENT DOCUMENTS

| | | | | |
|---|---|---|---|---|
| 2006/0214647 | A1* | 9/2006 | Ishimaru | H02M 3/1588 323/222 |
| 2007/0019450 | A1* | 1/2007 | Tiew | H02M 3/156 363/98 |
| 2009/0322298 | A1* | 12/2009 | Nishida | H02M 3/1588 323/282 |
| 2012/0153915 | A1* | 6/2012 | Loikkanen | G05F 1/618 323/283 |
| 2017/0023959 | A1* | 1/2017 | Chen | G05F 1/56 |
| 2017/0063227 | A1* | 3/2017 | Nakamura | H02M 3/158 |

FOREIGN PATENT DOCUMENTS

| | | |
|---|---|---|
| CN | 106100395 A | 11/2016 |
| CN | 205945546 U | 2/2017 |
| CN | 107438931 A | 12/2017 |
| JP | 2017-123374 A | 7/2017 |
| TW | 201644168 A | 12/2016 |
| TW | 201725837 A | 7/2017 |

OTHER PUBLICATIONS

United States Patent and Trademark Office, Office Action dated Oct. 2, 2018, in U.S. Appl. No. 15/945,200.

United States Patent and Trademark Office, Notice of Allowance dated Apr. 17, 2019, in U.S. Appl. No. 15/945,200.

* cited by examiner

SYSTEMS AND METHODS FOR ADJUSTING ONE OR MORE THRESHOLDS IN POWER CONVERTERS

1. CROSS-REFERENCES TO RELATED APPLICATIONS

This application is a continuation of U.S. patent application Ser. No. 15/945,200, filed Apr. 4, 2018, which claims priority to Chinese Patent Application No. 201810149765.X, filed Feb. 13, 2018, both of these applications being incorporated by reference herein for all purposes.

2. BACKGROUND OF THE INVENTION

Certain embodiments of the present invention are directed to integrated circuits. More particularly, some embodiments of the invention provide a system and method for adjusting one or more thresholds to achieve input and output power balance. Merely by way of example, some embodiments of the invention have been applied to buck converters. But it would be recognized that the invention has a much broader range of applicability.

In recent years, with the development of integrated circuit and information technology, a variety of battery-powered portable electronic devices, such as mobile phones, digital cameras, and notebook computers, became increasingly popular. These battery-powered portable electronic devices raise the need for high-performance power-management chips with low cost, high efficiency and good transient characteristics.

Among conventional power management chips, a chip for DC-DC power converter often is one of the most widely used. A buck converter usually is one type of DC-DC power converter, and has been used to convert a high input voltage to a low output voltage. There are various types of buck converters, such as a current-mode buck converter, a voltage-mode buck converter, and a hysteresis-mode buck converter.

FIG. 1 is a simplified diagram of a conventional current-mode buck converter. The current-mode buck converter 100 includes an error amplifier 110, a compensation network 112, a comparator 114, a logic controller 120, an SR flip-flop 122, an oscillator 124, drivers 130 and 134, power transistors 140 and 144, an output filter inductor 150, an output filter capacitor 160, resistors 170 and 172, and a sensing circuit 190. The SR flip-flop 122 includes two NOR gates.

For example, the error amplifier 110, the compensation network 112, the comparator 114, the logic controller 120, the SR flip-flop 122, the oscillator 124, the drivers 130 and 134, the sensing circuit 190, and the power transistors 140 and 144 are on a chip 198. In another example, the output filter inductor 150, the output filter capacitor 160, and the resistors 170 and 172 are off the chip 198.

As shown in FIG. 1, the transistor 140 is a PMOS transistor including a drain terminal, and the transistor 144 is an NMOS transistor including a drain terminal. The drain terminal of the PMOS transistor 140 and the drain terminal of the NMOS transistor 144 are connected. The inductor 150 includes two terminals. One terminal of the inductor 150 is connected to the drain terminal of the PMOS transistor 140 and the drain terminal of the NMOS transistor 144, and the other terminal of the inductor 150 is at an output voltage 182.

An input voltage 180 is received by the current-mode buck converter 100, which in response generates the output voltage 182 and an output current 188. The output voltage 182 is converted into a feedback voltage 184 by a voltage divider including the resistors 170 and 172, and the feedback voltage 184 is proportional to the output voltage 182. The feedback voltage 184 is received by a negative input terminal of the error amplifier 110, and a reference voltage 186 is received by a positive input terminal of the error amplifier 110. The error amplifier 110 generates, together with the compensation network 112, a compensation voltage 111 based at least in part on the feedback voltage 184 and the reference voltage 186. The compensation network 112 performs loop phase compensation. If the feedback voltage 184 increases and the reference voltage 186 remains unchanged, the compensation voltage 111 decreases. Additionally, if the feedback voltage 184 decreases and the reference voltage 186 remains unchanged, the compensation voltage 111 increases.

The sensing circuit 190 detects a current that flows through the power transistor 140 and generates a current-sensing voltage 191. The current-sensing voltage 191 represents the magnitude of the current that flows through the power transistor 140. Additionally, the current-sensing voltage 191 and the compensation voltage 111 are received by the comparator 114, which in response generates a comparison signal 115. Also, the oscillator 124 generates a clock signal 125. For example, the clock signal 125 determines the time when the power transistor 140 becomes turned on.

The clock signal 125 is received by a set terminal of the SR flip-flop 122, and the comparison signal 115 is received by a reset terminal of the SR flip-flop 122. In response, the SR flip-flop 122 generates a pulse-width-modulation signal 123, and outputs the pulse-width-modulation signal 123 to the logic controller 120. The logic controller 120 generates logic signals 131 and 135 based at least in part on the pulse-width-modulation signal 123. The logic signal 131 is received by the driver 130, which in response outputs a drive signal 133 to turn on or off the power transistor 140. Additionally, the logic signal 135 is received by the driver 134, which in response outputs a drive signal 137 to turn on or off the power transistor 144.

For example, when the power transistor 140 becomes turned off, then after a predetermined dead-time period, the power transistor 144 becomes turned on. In another example, when the power transistor 144 becomes turned off, then after another predetermined dead-time period, the power transistor 140 becomes turned on. In yet another example, the predetermined dead-time period is equal to the another predetermined dead-time period in magnitude. In yet another example, the predetermined dead-time period is not equal to the another predetermined dead-time period in magnitude.

The power transistors 140 and 144 affect a current 151 that flows through the output filter inductor 150. When the power transistor 140 is turned on and the power transistor 144 is turned off, the current 151 is equal to the current that flows through the power transistor 140, and the magnitude of the current 151 is represented by the current-sensing voltage 191. When the power transistor 140 is turned off and the power transistor 144 is turned on, the current 151 is equal to the current that flows through the power transistor 144.

As shown in FIG. 1, the power transistor 140 is a PMOS transistor, and the power transistor 144 is an NMOS transistor. The gate terminal of the PMOS transistor 140 is connected to the driver 130, and the source terminal of the PMOS transistor 140 receives the input voltage 180. Additionally, the gate terminal of the NMOS transistor 144 is connected to the driver 134, and the source terminal of the NMOS transistor 144 is biased to the ground. Also, the drain terminal of the PMOS transistor 140 and the drain terminal of the NMOS transistor 144 both are connected to one terminal of the output filter inductor 150. The other terminal of the output filter inductor 150 is connected to one terminal of the output filter capacitor 160, and the other terminal of the output filter capacitor 160 is grounded.

FIG. 2 is a simplified conventional timing diagram for the current-mode buck converter 100. The waveform 225 represents the clock signal 125 as a function of time, the waveform 211 represents the compensation voltage 111 as a function of time, and the waveform 291 represents the current-sensing voltage 191 as a function of time. Additionally, the waveform 223 represents the pulse-width-modulation signal 123 as a function of time, and the waveform 251 represents the current 151 as a function of time.

When the power transistor 140 becomes turned off, then after a predetermined dead-time period, the power transistor 144 becomes turned on. For example, the predetermined dead-time period is relatively short, so effect of the predetermined dead-time period is not shown in FIG. 2. Additionally, when the power transistor 144 becomes turned off, then after another predetermined dead-time period, the power transistor 140 becomes turned on. In another example, the another predetermined dead-time period is relatively short, so effect of the another predetermined dead-time period is not shown in FIG. 2.

At time $t_1$, the clock signal 125 changes from a logic low level to a logic high level as shown by the waveform 225, and the pulse-width-modulation signal 123 changes from a logic low level to a logic high level as shown by the waveform 223. In response, at time $t_1$, the power transistor 144 becomes turned off and the power transistor 140 becomes turned on to supply energy to the output. Also, at time $t_1$, the current-sensing voltage 191 rises rapidly as shown by the waveform 291.

From time $t_1$ to time $t_2$, the current-sensing voltage 191 increases gradually (e.g., increases gradually and linearly) as shown by the waveform 291 and the current 151 also increases gradually (e.g., increases gradually and linearly) as shown by the waveform 251. At time $t_2$, the current-sensing voltage 191 reaches or exceeds the compensation voltage 111 as shown by the waveforms 291 and 211. In response, at time $t_2$, the comparison signal 115 changes from a logic low level to a logic high level, causing the pulse-width-modulation signal 123 to change from the logic high level to the logic low level as shown by the waveform 223. Additionally, at time $t_2$, the power transistor 140 becomes turned off and the power transistor 144 becomes turned on to allow freewheeling of the output filter inductor 150. Also, at time $t_2$, the current-sensing voltage 191 falls rapidly as shown by the waveform 291 and the current 151 starts to decrease gradually (e.g., to decrease gradually and linearly) as shown by the waveform 251.

If the output voltage 182 deviates from a desired magnitude, the compensation voltage 111 also changes. This change in the compensation voltage 111 causes the pulse width of the pulse-width-modulation signal 123 to also change in order to regulate the output voltage 182 to the desired magnitude. Additionally, the frequency of the clock signal 125 remains constant, and the switching frequency of the pulse-width-modulation signal 123 also remains constant.

FIG. 3 is a simplified diagram of a conventional voltage-mode buck converter. The voltage-mode buck converter 300 includes an error amplifier 310, a compensation network 312, a comparator 314, a logic controller 320, an SR flip-flop 322, an oscillator 324, drivers 330 and 334, power transistors 340 and 344, an output filter inductor 350, an output filter capacitor 360, and resistors 370 and 372. The SR flip-flop 322 includes two NOR gates.

For example, the error amplifier 310, the compensation network 312, the comparator 314, the logic controller 320, the SR flip-flop 322, the oscillator 324, the drivers 330 and 334, and the power transistors 340 and 344 are on a chip 398. In another example, the output filter inductor 350, the output filter capacitor 360, and the resistors 370 and 372 are off the chip 398.

As shown in FIG. 3, the transistor 340 is a PMOS transistor including a drain terminal, and the transistor 344 is an NMOS transistor including a drain terminal. The drain terminal of the PMOS transistor 340 and the drain terminal of the NMOS transistor 344 are connected. The inductor 350 includes two terminals. One terminal of the inductor 350 is connected to the drain terminal of the PMOS transistor 340 and the drain terminal of the NMOS transistor 344, and the other terminal of the inductor 350 is at an output voltage 382.

An input voltage 380 is received by the voltage-mode buck converter 300, which in response generates the output voltage 382 and an output current 388. The output voltage 382 is converted into a feedback voltage 384 by a voltage divider including the resistors 370 and 372, and the feedback voltage 384 is proportional to the output voltage 382. The feedback voltage 384 is received by a negative input terminal of the error amplifier 310, and a reference voltage 386 is received by a positive input terminal of the error amplifier 310. The error amplifier 310 generates, together with the compensation network 312, a compensation voltage 311 based at least in part on the feedback voltage 384 and the reference voltage 386. The compensation network 312 performs loop phase compensation. If the feedback voltage 384 increases and the reference voltage 386 remains unchanged, the compensation voltage 311 decreases. Additionally, if the feedback voltage 384 decreases and the reference voltage 386 remains unchanged, the compensation voltage 311 increases.

The compensation voltage 311 is received by the comparator 314, which also receives a ramping voltage 317 (e.g., a ramping voltage with a saw-tooth waveform). For example, the ramping voltage 317 is generated by the oscillator 324. In response, the comparator 314 generates a comparison signal 315. Additionally, the oscillator 324 generates a clock signal 325. For example, the clock signal 325 determines the time when the power transistor 340 becomes turned on.

The clock signal 325 is received by a set terminal of the SR flip-flop 322, and the comparison signal 315 is received by a reset terminal of the SR flip-flop 322. In response, the SR flip-flop 322 generates a pulse-width-modulation signal 323, and outputs the pulse-width-modulation signal 323 to the logic controller 320. The logic controller 320 generates logic signals 331 and 335 based at least in part on the pulse-width-modulation signal 323. The logic signal 331 is received by the driver 330, which in response outputs a drive signal 333 to turn on or off the power transistor 340. Additionally, the logic signal 335 is received by the driver 334, which in response outputs a drive signal 337 to turn on or off the power transistor 344.

For example, when the power transistor 340 becomes turned off, then after a predetermined dead-time period, the power transistor 344 becomes turned on. In another example, when the power transistor 344 becomes turned off, then after another predetermined dead-time period, the power transistor 340 becomes turned on. In yet another example, the predetermined dead-time period is equal to the another predetermined dead-time period in magnitude. In yet another example, the predetermined dead-time period is not equal to the another predetermined dead-time period in magnitude.

The power transistors 340 and 344 affect a current 351 that flows through the output filter inductor 350. When the power transistor 340 is turned on and the power transistor 344 is turned off, the current 351 is equal to the current that flows through the power transistor 340. When the power transistor 340 is turned off and the power transistor 344 is turned on, the current 351 is equal to the current that flows through the power transistor 344.

As shown in FIG. 3, the power transistor 340 is a PMOS transistor, and the power transistor 344 is an NMOS transistor. The gate terminal of the PMOS transistor 340 is connected to the driver 330, and the source terminal of the PMOS transistor 340 receives the input voltage 380. Additionally, the gate terminal of the NMOS transistor 344 is connected to the driver 334, and the source terminal of the NMOS transistor 344 is biased to the ground. Also, the drain terminal of the PMOS transistor 340 and the drain terminal of the NMOS transistor 344 both are connected to one terminal of the output filter inductor 350. The other terminal of the output filter inductor 350 is connected to one terminal of the output filter capacitor 360, and the other terminal of the output filter capacitor 360 is grounded.

FIG. 4 is a simplified conventional timing diagram for the voltage-mode buck converter 300. The waveform 425 represents the clock signal 325 as a function of time, the waveform 411 represents the compensation voltage 311 as a function of time, and the waveform 417 represents the ramping voltage 317 as a function of time. Additionally, the waveform 423 represents the pulse-width-modulation signal 323 as a function of time, and the waveform 451 represents the current 351 as a function of time.

When the power transistor 340 becomes turned off, then after a predetermined dead-time period, the power transistor 344 becomes turned on. For example, the predetermined dead-time period is relatively short, so effect of the predetermined dead-time period is not shown in FIG. 4. Additionally, when the power transistor 344 becomes turned off, then after another predetermined dead-time period, the power transistor 340 becomes turned on. In another example, the another predetermined dead-time period is relatively short, so effect of the another predetermined dead-time period is not shown in FIG. 4.

At time $t_{11}$, the clock signal 325 changes from a logic low level to a logic high level as shown by the waveform 425 and the pulse-width-modulation signal 323 changes from a logic low level to a logic high level as shown by the waveform 423. In response, at time $t_{ii}$, the power transistor 344 becomes turned off and the power transistor 340 becomes turned on to supply energy to the output.

From time $t_{11}$ to time $t_{12}$, the ramping voltage 317 increases gradually (e.g., increases gradually and linearly) as shown by the waveform 417 and the current 351 also increases gradually (e.g., increases gradually and linearly) as shown by the waveform 451. At time $t_{12}$, the ramping voltage 317 reaches or exceeds the compensation voltage 311 as shown by the waveforms 417 and 411. In response, at time $t_{12}$, the comparison signal 315 changes from a logic low level to a logic high level, causing the pulse-width-modulation signal 323 to change from the logic high level to the logic low level as shown by the waveform 423. Additionally, at time $t_{12}$, the power transistor 340 becomes turned off and the power transistor 344 becomes turned on to allow freewheeling of the output filter inductor 350. Also, at time $t_{12}$, the current 151 starts to decrease gradually (e.g., to decrease gradually and linearly) as shown by the waveform 451.

If the output voltage 382 deviates from a desired magnitude, the compensation voltage 311 also changes. This change in the compensation voltage 311 causes the pulse width of the pulse-width-modulation signal 323 to also change in order to regulate the output voltage 382 to the desired magnitude. Additionally, the frequency of the clock signal 325 remains constant, and the switching frequency of the pulse-width-modulation signal 323 also remains constant.

Another type of buck converter, the conventional hysteresis-mode buck converter is considered to be a simple system that can provide a rapid transient response. For example, the conventional hysteresis-mode buck converter usually does not need frequency compensation and can respond to changes in load conditions within one switching cycle.

FIG. 5 is a simplified diagram of a conventional hysteresis-mode buck converter. The hysteresis-mode buck converter 500 includes a hysteresis comparator 510, a logic controller 520, drivers 530 and 534, power transistors 540 and 544, an output filter inductor 550, an output filter capacitor 560, and resistors 570 and 572.

For example, the hysteresis comparator 510, the logic controller 520, the drivers 530 and 534, and the power transistors 540 and 544 are on a chip 598. In another example, the output filter inductor 550, the output filter capacitor 560, and the resistors 570 and 572 are off the chip 598.

As shown in FIG. 5, the transistor 540 is a PMOS transistor including a drain terminal, and the transistor 544 is an NMOS transistor including a drain terminal. The drain terminal of the PMOS transistor 540 and the drain terminal of the NMOS transistor 544 are connected. The inductor 550 includes two terminals. One terminal of the inductor 550 is connected to the drain terminal of the PMOS transistor 540 and the drain terminal of the NMOS transistor 544, and the other terminal of the inductor 550 is at an output voltage 582.

As shown in FIG. 5, an input voltage 580 is received by the hysteresis-mode buck converter 500, which in response generates the output voltage 582 and an output current 588. The output voltage 582 is converted into a feedback voltage 584 by a voltage divider including the resistors 570 and 572, and the feedback voltage 584 is proportional to the output voltage 582. The feedback voltage 584 is received by a negative input terminal of the hysteresis comparator 510, and a reference voltage 586 is received by a positive input terminal of the hysteresis comparator 510. The hysteresis comparator 510 generates a modulation signal 523, and outputs the modulation signal 523 to the logic controller 520. The logic controller 520 generates logic signals 531 and 535 based at least in part on the modulation signal 523. The logic signal 531 is received by the driver 530, which in response outputs a drive signal 533 to turn on or off the power transistor 540. Additionally, the logic signal 535 is received by the driver 534, which in response outputs a drive signal 537 to turn on or off the power transistor 544.

For example, when the power transistor 540 becomes turned off, then after a predetermined dead-time period, the power transistor 544 becomes turned on to allow freewheeling of the output filter inductor 550. In another example, when the power transistor 544 becomes turned off, then after another predetermined dead-time period, the power transistor 540 becomes turned on to supply energy to the output. In yet another example, the predetermined dead-time period is equal to the another predetermined dead-time period in magnitude. In yet another example, the predetermined dead-time period is not equal to the another predetermined dead-time period in magnitude.

The power transistors 540 and 544 affect a current 551 that flows through the output filter inductor 550. When the power transistor 540 is turned on and the power transistor 544 is turned off, the current 551 is equal to the current that flows through the power transistor 540. When the power transistor 540 is turned off and the power transistor 544 is turned on, the current 551 is equal to the current that flows through the power transistor 544.

As shown in FIG. 5, the power transistor 540 is a PMOS transistor, and the power transistor 544 is an NMOS transistor. The gate terminal of the PMOS transistor 540 is connected to the driver 530, and the source terminal of the PMOS transistor 540 receives the input voltage 580. Additionally, the gate terminal of the NMOS transistor 544 is connected to the driver 534, and the source terminal of the NMOS transistor 544 is biased to the ground. Also, the drain terminal of the PMOS transistor 540 and the drain terminal of the NMOS transistor 544 both are connected to one terminal of the output filter inductor 550. The other terminal of the output filter inductor 550 is connected to one terminal of the output filter capacitor 560, and the other terminal of the output filter capacitor 560 is grounded.

The power transistors 540 and 544 are affected by the modulation signal 523, which is generated by the hysteresis comparator 510 based at least in part on the feedback voltage 584 and the reference voltage 586. The hysteresis-mode buck converter 500 adjusts the output voltage 582 by keeping the feedback voltage 584 within the hysteresis window that has been set by the reference voltage 586 for the hysteresis comparator 510. For high input voltage 580, the output filter inductor 550 with high inductance and the output filter capacitor 560 with high capacitance often are used.

For the conventional current-mode buck converter 100 and the voltage-mode buck converter 300, the switching frequency usually is fixed and determined by an internal clock. With the fixed switching frequency, the conventional current-mode buck converter 100 and the voltage-mode buck converter 300 often encounter significant difficulties in achieving high efficiency under light load conditions. Additionally, the conventional hysteresis-mode buck converter 500 often suffers from system instability that is causes by signal noises and/or phase lags.

Hence it is highly desirable to improve the techniques of power converters.

3. BRIEF SUMMARY OF THE INVENTION

Certain embodiments of the present invention are directed to integrated circuits. More particularly, some embodiments of the invention provide a system and method for adjusting one or more thresholds to achieve input and output power balance. Merely by way of example, some embodiments of the invention have been applied to buck converters. But it would be recognized that the invention has a much broader range of applicability.

According to one embodiment, a system controller for a power converter includes a first current controller configured to receive a first input signal and generate a first output signal based at least in part on the first input signal, a second current controller configured to receive a compensation signal and a second input signal and generate a second output signal based at least in part on the second input signal, and a drive signal generator configured to receive the first output signal and the second output signal, generate a first drive signal based at least in part on the first output signal and the second output signal, and generate a second drive signal based at least in part on the first output signal and the second output signal. The first current controller is configured to, in response to the first input signal becoming equal to or larger than a first threshold, change the first output signal from a first logic level to a second logic level, and the second current controller is configured to, in response to the second input signal becoming equal to or smaller than a second threshold, change the second output signal from the first logic level to the second logic level. The drive signal generator is configured to: in response to the first output signal being at the first logic level and the second output signal being at the second logic level, generate, with or without a first delay, the first drive signal at a third logic level; and in response to the first output signal being at the second logic level and the second output signal being at the first logic level, generate, with or without a second delay, the first drive signal at a fourth logic level, the fourth logic level being different from the third logic level. The second current controller is further configured to, under a continuous-conduction-mode, in response to the compensation signal increasing in magnitude, increase the second threshold in magnitude; and in response to the compensation signal decreasing in magnitude, decrease the second threshold in magnitude.

According to another embodiment, a system controller for a power converter includes a first current controller configured to receive a first input signal and generate a first output signal based at least in part on the first input signal, and a second current controller configured to receive a second input signal, generate a second output signal based at least in part on the second input signal, and generate a third output signal. Additionally, the system controller further includes an output signal generator configured to receive a third input signal, the third output signal and the second output signal, and generate a fourth output signal based at least in part on the third input signal, the third output signal and the second output signal, and a drive signal generator configured to receive the first output signal and the fourth output signal, generate a first drive signal based at least in part on the first output signal and the fourth output signal, and generate a second drive signal based at least in part on the first output signal and the fourth output signal. The first current controller is configured to, in response to the first input signal becoming equal to or larger than a first threshold, change the first output signal from a first logic level to a second logic level, and the second current controller is configured to, in response to the second input signal becoming equal to or smaller than a second threshold, change the second output signal from the first logic level to the second logic level. The drive signal generator is configured to: in response to the first output signal being at the first logic level and the fourth output signal being at the second logic level, generate, with or without a first delay, the first drive signal at a third logic level; and in response to the first output signal being at the second logic level and the fourth output signal being at the first logic level, generate, with or without a second delay, the first drive signal at a fourth logic level, the fourth logic level being different from the third logic level. The second current controller is further configured to, in response to the second threshold being larger than a predetermined threshold, generate the third output signal at a fifth logic level; and in response to the second threshold being smaller than the predetermined threshold, generate the third output signal at a sixth logic level, the sixth logic level being different from the fifth logic level.

According to yet another embodiment, a system controller for a power converter includes a first current controller configured to receive a compensation signal and a first input signal and generate a first output signal based at least in part on the first input signal, a second current controller configured to receive a second input signal, generate a second output signal based at least in part on the second input signal, and a drive signal generator configured to receive the first output signal and a third output signal related to the second output signal, generate a first drive signal based at least in part on the first output signal and the third output signal, and generate a second drive signal based at least in part on the first output signal and the third output signal. The first current controller is configured to, in response to the first input signal becoming equal to or larger than a first threshold, change the first output signal from a first logic level to a second logic level, and the second current controller is configured to, in response to the second input signal becoming equal to or smaller than a second threshold, change the second output signal from the first logic level to the second logic level. The drive signal generator is configured to: in response to the first output signal being at the first logic level and the third output signal being at the second logic level, generate, with or without a first delay, the first drive signal at a third logic level; and in response to the first output signal being at the second logic level and the third output signal being at the first logic level, generate, with or without a second delay, the first drive signal at a fourth logic level, the fourth logic level being different from the third logic level. The first current controller is further configured to, under a continuous-conduction-mode, in response to the compensation signal increasing in magnitude, increase the first threshold in magnitude; and in response to the compensation signal decreasing in magnitude, decrease the first threshold in magnitude.

According to yet another embodiment, a method for a power converter includes: receiving a first input signal, generating a first output signal based at least in part on the first input signal; receiving a compensation signal, and determining, under a continuous-conduction-mode, a second threshold based at least in part on the compensation signal. Additionally, the method further includes receiving a second input signal, generating a second output signal based at least in part on the second input signal, receiving the first output signal and the second output signal, generating a first drive signal based at least in part on the first output signal and the second output signal, and generating a second drive signal based at least in part on the first output signal and the second output signal. The generating a first output signal based at least in part on the first input signal includes, in response to the first input signal becoming equal to or larger than a first threshold, changing the first output signal from a first logic level to a second logic level, and the generating a second output signal based at least in part on the second input signal includes, in response to the second input signal becoming equal to or smaller than a second threshold, changing the second output signal from the first logic level to the second logic level. The generating a first drive signal based at least in part on the first output signal and the second output signal includes: in response to the first output signal being at the first logic level and the second output signal being at the second logic level, generating, with or without a first delay, the first drive signal at a third logic level; and in response to the first output signal being at the second logic level and the second output signal being at the first logic level, generating, with or without a second delay, the first drive signal at a fourth logic level, the fourth logic level being different from the third logic level. The determining, under a continuous-conduction-mode, a second threshold based at least in part on the compensation signal includes, under the continuous-conduction-mode, in response to the compensation signal increasing in magnitude, increasing the second threshold in magnitude; and in response to the compensation signal decreasing in magnitude, decreasing the second threshold in magnitude.

According to yet another embodiment, a method for a power converter includes receiving a first input signal, generating a first output signal based at least in part on the first input signal, receiving a second input signal, and generating a second output signal based at least in part on the second input signal. Additionally, the method further includes generating a third output signal, receiving a third input signal, the third output signal and the second output signal, and generating a fourth output signal based at least in part on the third input signal, the third output signal and the second output signal. Moreover, the method further includes receiving the first output signal and the fourth output signal, generating a first drive signal based at least in part on the first output signal and the fourth output signal, and generating a second drive signal based at least in part on the first output signal and the fourth output signal. The generating a first output signal based at least in part on the first input signal includes, in response to the first input signal becoming equal to or larger than a first threshold, changing the first output signal from a first logic level to a second logic level, and the generating a second output signal based at least in part on the second input signal includes, in response to the second input signal becoming equal to or smaller than a second threshold, changing the second output signal from the first logic level to the second logic level. The generating a first drive signal based at least in part on the first output signal and the fourth output signal includes: in response to the first output signal being at the first logic level and the fourth output signal being at the second logic level, generating, with or without a first delay, the first drive signal at a third logic level; and in response to the first output signal being at the second logic level and the fourth output signal being at the first logic level, generating, with or without a second delay, the first drive signal at a fourth logic level. The fourth logic level is different from the third logic level. The generating a third output signal includes: in response to the second threshold being larger than a predetermined threshold, generating the third output signal at a fifth logic level; and in response to the second threshold being smaller than the predetermined threshold, generating the third output signal at a sixth logic level. The sixth logic level is different from the fifth logic level.

According to yet another embodiment, a method for a power converter includes receiving a compensation signal, determining, under a continuous-conduction-mode, a first threshold based at least in part on the compensation signal, receiving a first input signal, and generating a first output signal based at least in part on the first input signal. Additionally, the method further includes receiving a second input signal, and generating a second output signal based at least in part on the second input signal. Moreover, the method further includes receiving the first output signal and a third output signal related to the second output signal; generating a first drive signal based at least in part on the first output signal and the third output signal; and generating a second drive signal based at least in part on the first output signal and the third output signal. The generating a first output signal based at least in part on the first input signal includes, in response to the first input signal becoming equal to or larger than the first threshold, changing the first output signal from a first logic level to a second logic level, and generating a second output signal based at least in part on the second input signal includes, in response to the second input signal becoming equal to or smaller than a second threshold, changing the second output signal from the first logic level to the second logic level. The generating a first drive signal based at least in part on the first output signal and the third output signal includes: in response to the first output signal being at the first logic level and the third output signal being at the second logic level, generating, with or without a first delay, the first drive signal at a third logic level; and in response to the first output signal being at the second logic level and the third output signal being at the first logic level, generating, with or without a second delay, the first drive signal at a fourth logic level, the fourth logic level being different from the third logic level. The determining, under a continuous-conduction-mode, a first threshold based at least in part on the compensation signal includes, under the continuous-conduction-mode, in response to the compensation signal increasing in magnitude, increasing the first threshold in magnitude; and in response to the compensation signal decreasing in magnitude, decreasing the first threshold in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for adjusting one or more thresholds to achieve input and output power balance. Merely by way of example, some embodiments of the invention have been applied to buck converters. But it would be recognized that the invention has a much broader range of applicability.

Figure 1:
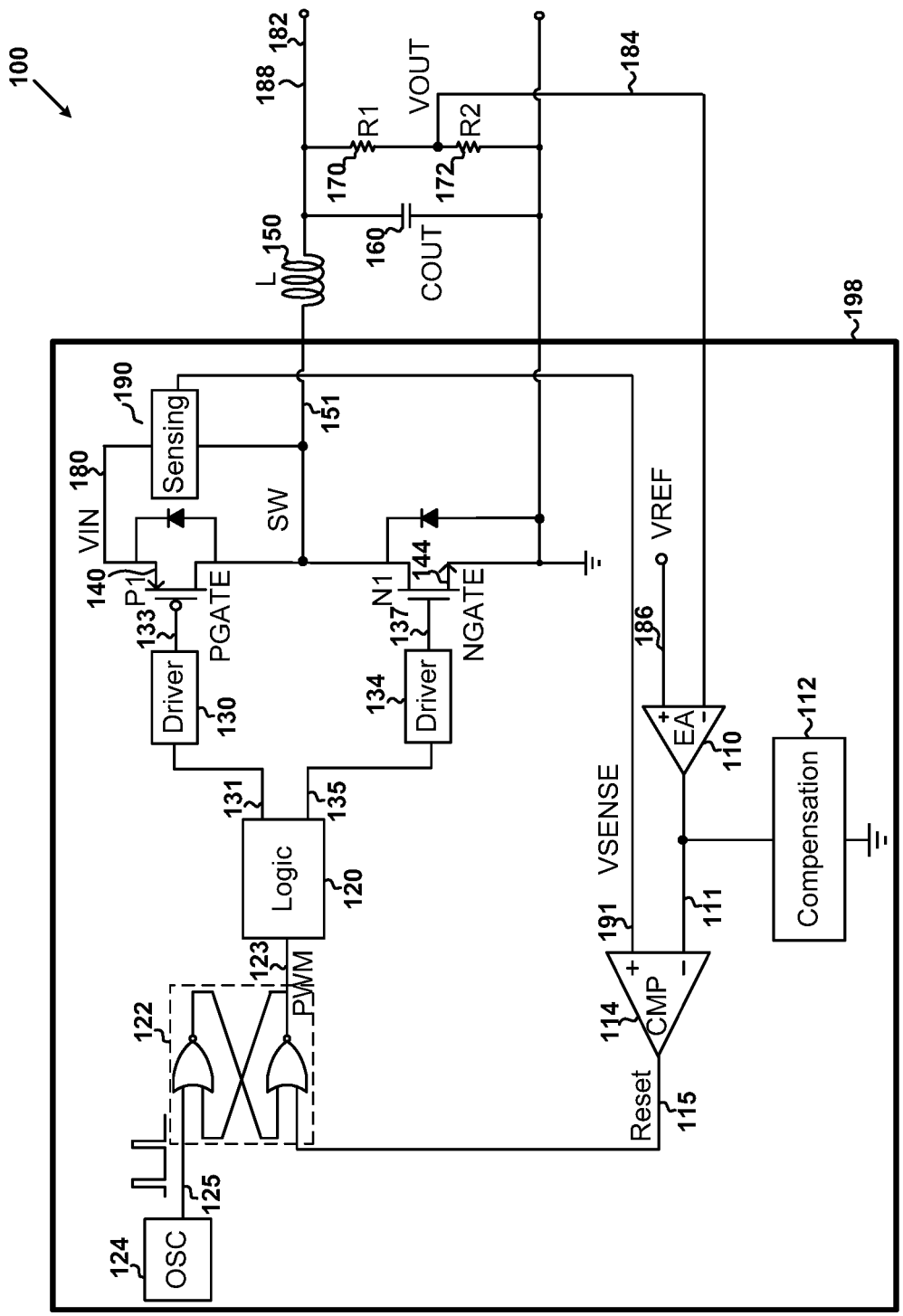
FIG. 1 is a simplified diagram of a conventional current-mode buck converter.
Figure 2:
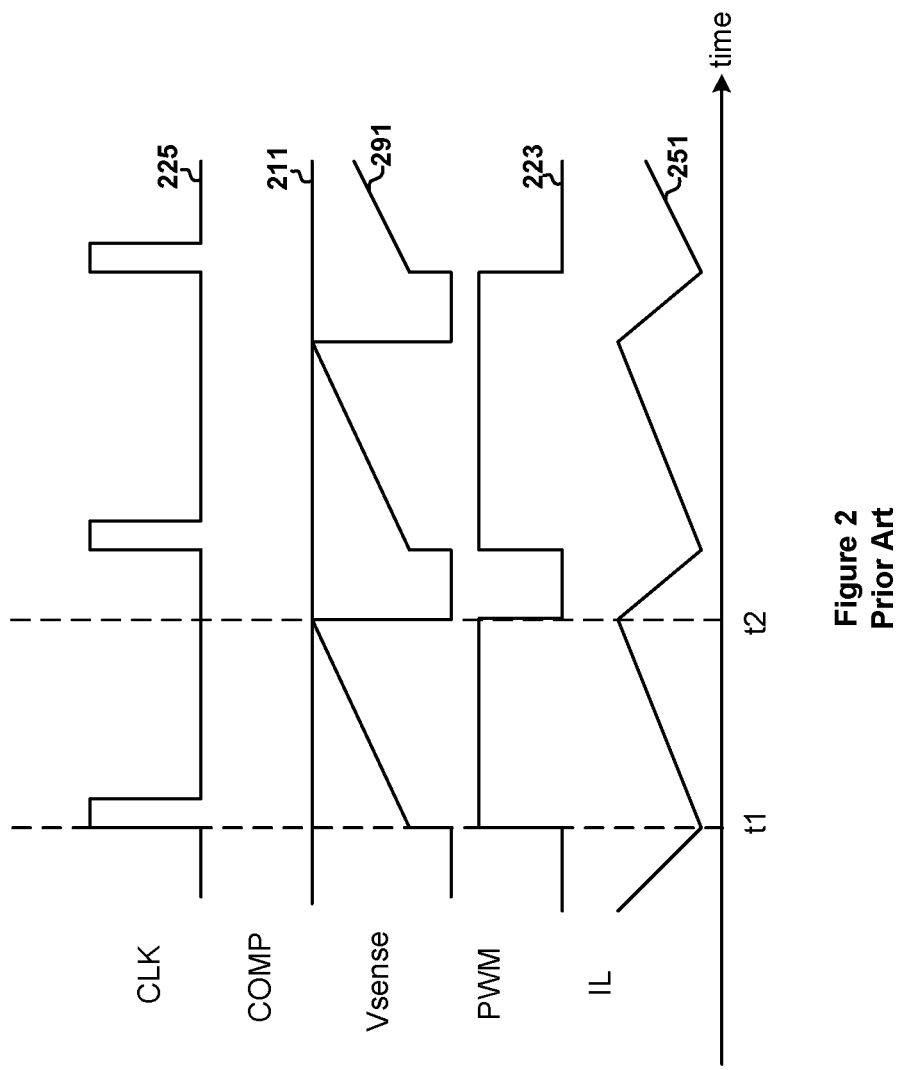
FIG. 2 is a simplified conventional timing diagram for the current-mode buck converter as shown in FIG. 1.
Figure 3:
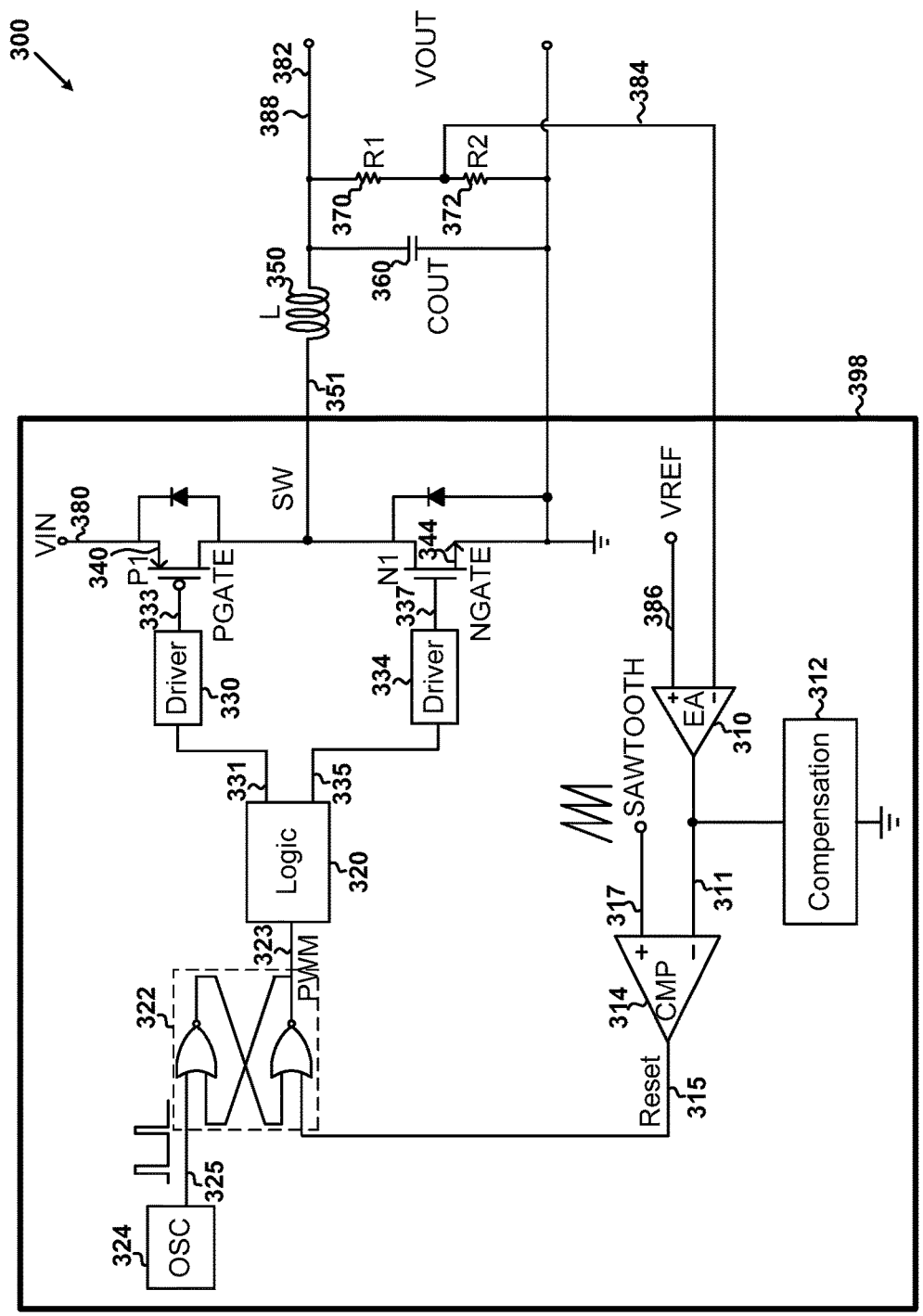
FIG. 3 is a simplified diagram of a conventional voltage-mode buck converter.
Figure 4:
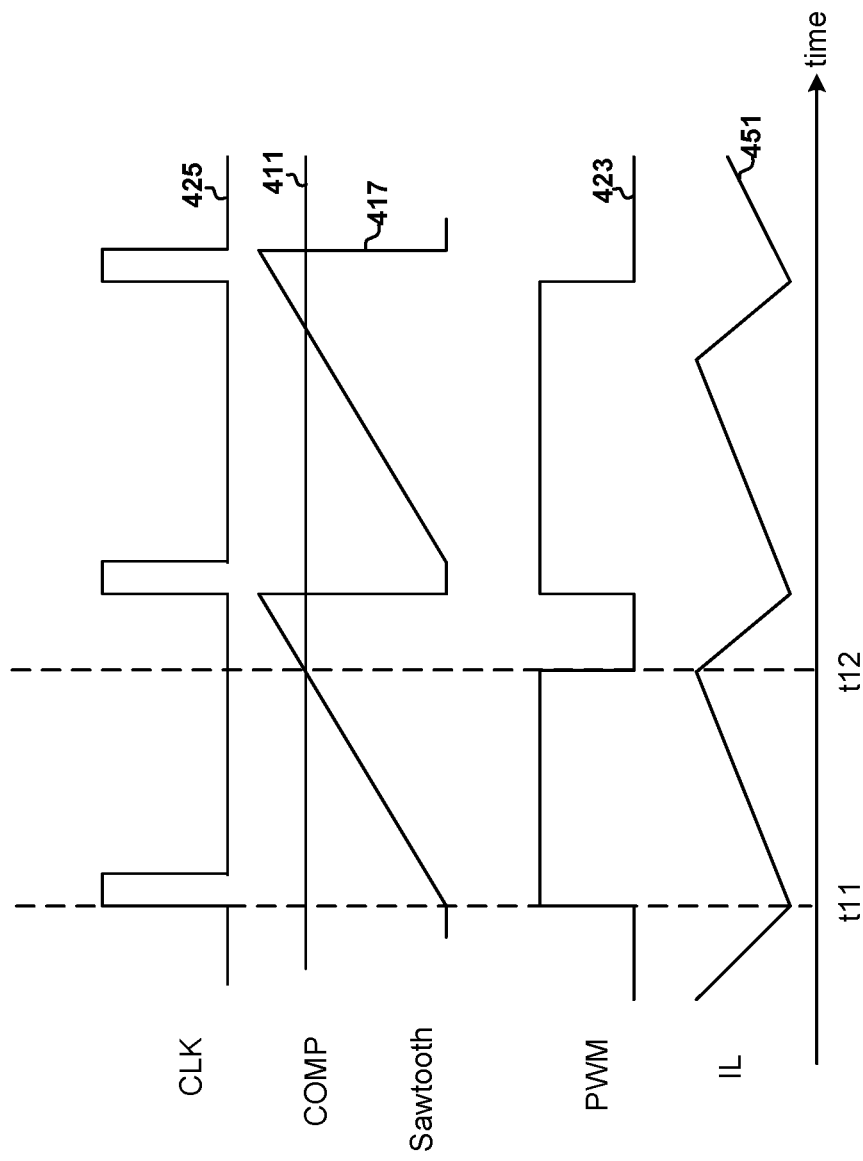
FIG. 4 is a simplified conventional timing diagram for the voltage-mode buck converter as shown in FIG. 3.
Figure 5:
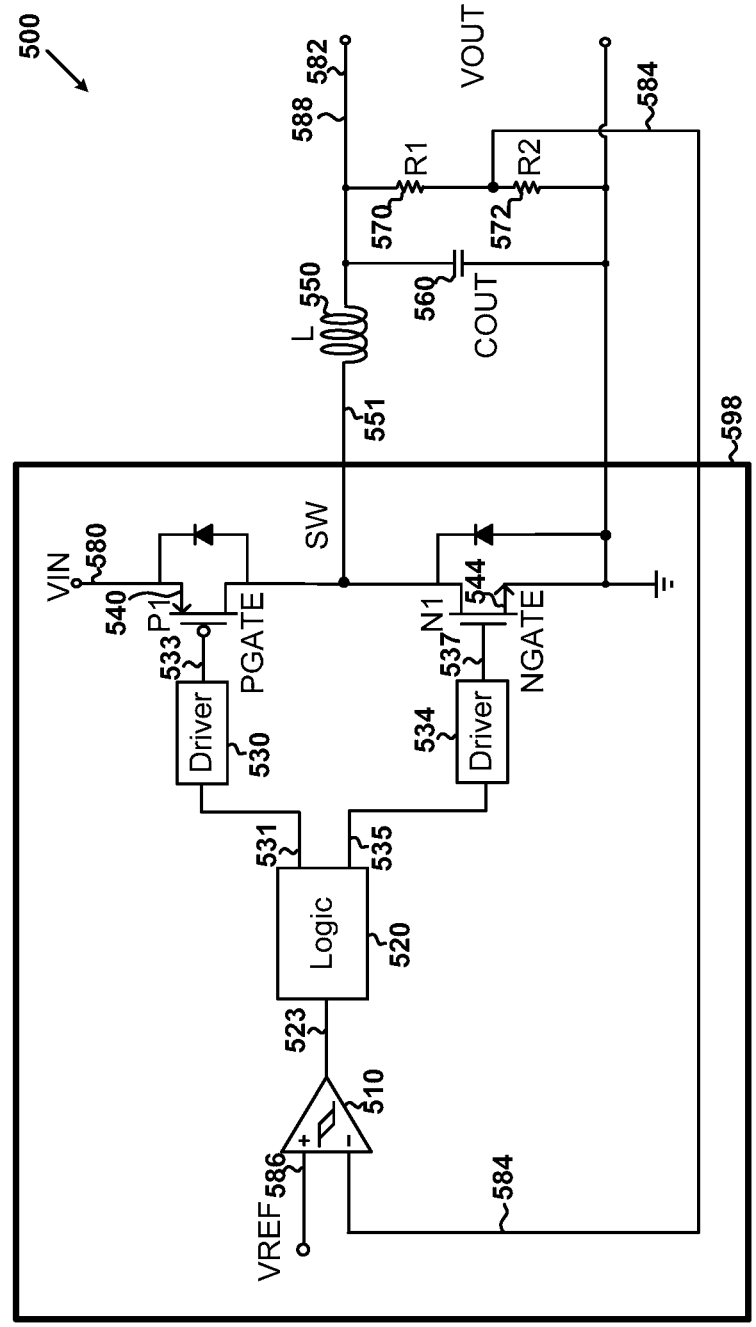
FIG. 5 is a simplified diagram of a conventional hysteresis-mode buck converter.

As shown in FIG. 5, the power transistors 540 and 544 are affected by the modulation signal 523, which is generated by the hysteresis comparator 510 based at least in part on the feedback voltage 584 and the reference voltage 586. Small disturbances by external noises on the feedback voltage 584 and/or the reference voltage 586 often cause significant fluctuations in switching frequency and/or pulse width of the modulation signal 523 and also cause the output voltage 582 to fluctuate with significant ripples in magnitude. Accordingly, the hysteresis-mode buck converter 500 often possesses weak anti-noise capability.

Also, for high input voltage 580, the output filter inductor 550 with high inductance and the output filter capacitor 560 with high capacitance often are used. The output filter inductor 550 with high inductance and the output filter capacitor 560 with high capacitance usually cause significant phase delay to the output voltage 582 and also render the hysteresis comparator 510 less stable.

Figure 6:
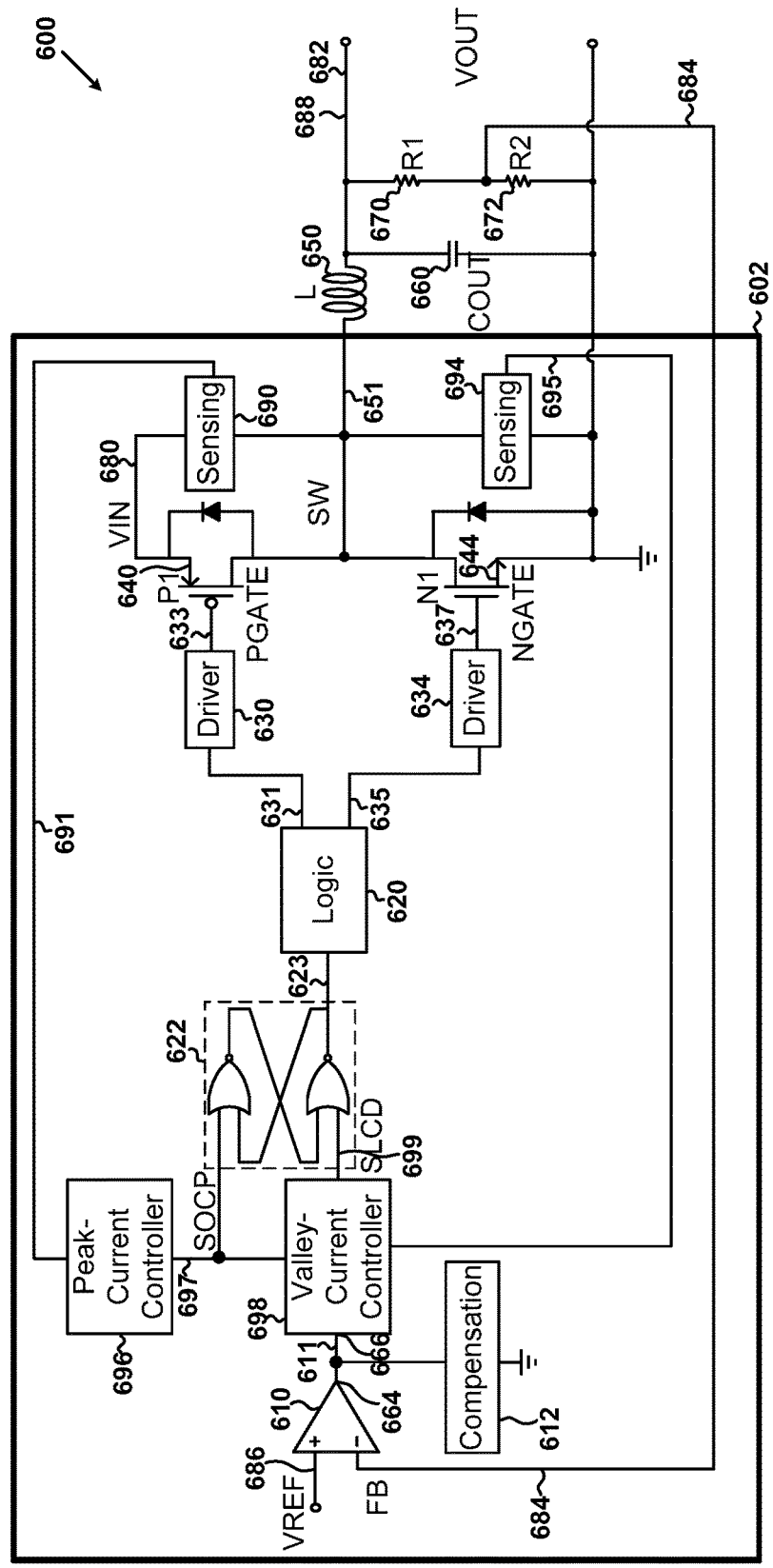
FIG. 6 is a simplified diagram of a buck converter according to an embodiment of the present invention.

FIG. 6 is a simplified diagram of a buck converter according to an embodiment of the present invention. This diagram is merely an example, which should not unduly limit the scope of the claims. One of ordinary skill in the art would recognize many variations, alternatives, and modifications. The power converter 600 (e.g., a buck converter) includes an error amplifier 610, a compensation network 612, a logic controller 620, an SR flip-flop 622, drivers 630 and 634, transistors 640 and 644, an inductor 650, a capacitor 660, resistors 670 and 672, sensing circuits 690 and 694, a peak-current controller 696, and a valley-current controller 698. For example, the SR flip-flop 622 includes two NOR gates. In another example, the power converter 600 operates in continuous-conduction-mode (CCM).

For example, the error amplifier 610, the compensation network 612, the logic controller 620, the SR flip-flop 622, the drivers 630 and 634, the peak-current controller 696, the valley-current controller 698, the transistors 640 and 644, and the sensing circuits 690 and 694 are on a chip 602. In another example, the inductor 650, the capacitor 660, and the resistors 670 and 672 are off the chip 602.

As shown in FIG. 6, the transistor 640 is a PMOS transistor including a drain terminal, and the transistor 644 is an NMOS transistor including a drain terminal according to certain embodiments. For example, the drain terminal of the PMOS transistor 640 and the drain terminal of the NMOS transistor 644 are connected. In another example, the inductor 650 includes two terminals. In yet another example, one terminal of the inductor 650 is connected to the drain terminal of the PMOS transistor 640 and the drain terminal of the NMOS transistor 644, and the other terminal of the inductor 650 is at an output voltage 682.

In one embodiment, an input voltage 680 is received by the buck converter 600, which in response generates the output voltage 682 and an output current 688. For example, the output voltage 682 is converted into a feedback voltage 684 by a voltage divider including the resistors 670 and 672, and the feedback voltage 684 is proportional to the output voltage 682. In another example, the feedback voltage 684 is received by a negative input terminal of the error amplifier 610, and a reference voltage 686 is received by a positive input terminal of the error amplifier 610. In yet another example, the error amplifier 610 generates, together with the compensation network 612, a compensation voltage 611 based at least in part on the feedback voltage 684 and the reference voltage 686. For example, the compensation voltage 611 is received by the valley-current controller 698. In another example, if the feedback voltage 684 increases and the reference voltage 686 remains unchanged, the compensation voltage 611 decreases. In yet another example, if the feedback voltage 684 decreases and the reference voltage 686 remains unchanged, the compensation voltage 611 increases.

In yet another example, the compensation network 612 performs loop phase compensation, and includes two terminals. In yet another example, one terminal of the compensation network 612 is connected to a terminal 664 of the error amplifier 610 and a terminal 666 of the valley-current controller 698. In yet another example, another terminal of the compensation network 612 is grounded.

In another embodiment, the sensing circuit 690 detects a current that flows through the transistor 640 and generates a current-sensing voltage 691, and the sensing circuit 694 detects a current that flows through the transistor 644 and generates a current-sensing voltage 695. For example, the current-sensing voltage 691 represents the magnitude of the current that flows through the transistor 640, and the current-sensing voltage 695 represents the magnitude of the current that flows through the transistor 644. In another example, the current-sensing voltage 691 is received by the peak-current controller 696. In yet another example, the current-sensing voltage 695 is received by the valley-current controller 698.

According to one embodiment, the peak-current controller 696 receives the current-sensing voltage 691, compares the current-sensing voltage 691 with a peak-voltage threshold (e.g., $V_{th\_pe}$), and generates a peak-voltage control signal 697. For example, the peak-voltage threshold (e.g., $V_{th\_pe}$) corresponds to a peak-current threshold (e.g., $I_{th\_pe}$). In another example, if the current-sensing voltage 691 is larger than the peak-voltage threshold (e.g., $V_{th\_pe}$), the current that flows through the transistor 640 is larger than the peak-current threshold (e.g., $I_{th\_pe}$). In yet another example, if the current-sensing voltage 691 is equal to the peak-voltage threshold (e.g., $V_{th\_pe}$), the current that flows through the transistor 640 is equal to the peak-current threshold (e.g., $I_{th\_pe}$). In yet another example, if the current-sensing voltage 691 is smaller than the peak-voltage threshold (e.g., $V_{th\_pe}$), the current that flows through the transistor 640 is smaller than the peak-current threshold (e.g., $I_{th\_pe}$).

In yet another example, if the current-sensing voltage 691 becomes equal to or larger than the peak-voltage threshold (e.g., $V_{th\_pe}$), the peak-voltage control signal 697 changes from a logic low level to a logic high level, and remains at the logic high level for a predetermined period of time (e.g., $T_p$) before changing back to the logic low level in order to form a signal pulse with a predetermined pulse width (e.g., $T_p$). In yet another example, the peak-voltage control signal 697 is received by a reset terminal of the SR flip-flop 622. In yet another example, the peak-voltage control signal 697 is also received by the valley-current controller 698.

According to another embodiment, the valley-current controller 698 receives the compensation voltage 611, the current-sensing voltage 695, and the peak-voltage control signal 697, compares the current-sensing voltage 695 with a valley-voltage threshold (e.g., $V_{th\_va}$), and generates a valley-voltage control signal 699. For example, the valley-voltage threshold (e.g., $V_{th\_va}$) corresponds to a valley-current threshold (e.g., $I_{th\_va}$). In another example, if the current-sensing voltage 695 is larger than the valley-voltage threshold (e.g., $V_{th\_va}$), the current that flows through the transistor 644 is larger than the valley-current threshold (e.g., $I_{th\_va}$). In yet another example, if the current-sensing voltage 695 is equal to the valley-voltage threshold (e.g., $V_{th\_va}$), the current that flows through the transistor 644 is equal to the valley-current threshold (e.g., $I_{th\_va}$). In yet another example, if the current-sensing voltage 695 is smaller than the valley-voltage threshold (e.g., $V_{th\_va}$), the current that flows through the transistor 644 is smaller than the valley-current threshold (e.g., $I_{th\_va}$).

In yet another example, if the compensation voltage 611 increases, the valley-current controller 698 makes the valley-voltage threshold (e.g., $V_{th\_va}$) larger, and if the compensation voltage 611 decreases, the valley-current controller 698 makes the valley-voltage threshold (e.g., $V_{th\_va}$) smaller. In yet another example, if the current-sensing voltage 695 becomes equal to or smaller than the valley-voltage threshold, the valley-voltage control signal 699 changes from a logic low level to a logic high level and remains at the logic high level until the peak-voltage control signal 697 changes from the logic low level to the logic high level. In yet another example, if the peak-voltage control signal 697 changes from the logic low level to the logic high level, the valley-voltage control signal 699 changes from the logic high level back to the logic low level. In yet another example, the valley-voltage control signal 699 is received by a set terminal of the SR flip-flop 622.

In one embodiment, the SR flip-flop 622 receives the peak-voltage control signal 697 and the valley-voltage control signal 699, generates a modulation signal 623 (e.g., a pulse-width-modulation signal), and outputs the modulation signal 623 to the logic controller 620. For example, the logic controller 620 generates logic signals 631 and 635 based at least in part on the modulation signal 623. In another example, the logic signal 631 is received by the driver 630, which in response outputs a drive signal 633 to turn on or off the transistor 640. In yet another example, the logic signal 635 is received by the driver 634, which in response outputs a drive signal 637 to turn on or off the transistor 644.

In another embodiment, when the transistor 640 becomes turned off, then after a predetermined dead-time period, the transistor 644 becomes turned on (e.g., becomes turned on to allow freewheeling of the inductor 650). For example, the predetermined dead-time period after the driver 630 generates the drive signal 633 at a logic high level to turn off the transistor 640 (e.g., a PMOS transistor), the driver 634 generates the drive signal 637 at the logic high level to turn on the transistor 644 (e.g., an NMOS transistor). In yet another embodiment, when the transistor 644 becomes turned off, then after another predetermined dead-time period, the transistor 640 becomes turned on (e.g., becomes turned on to supply energy to the output). For example, the another predetermined dead-time period after the driver 634 generates the drive signal 637 at a logic low level to turn off the transistor 644 (e.g., an NMOS transistor), the driver 630 generates the drive signal 633 at the logic low level to turn on the transistor 640 (e.g., a PMOS transistor). In another example, the predetermined dead-time period is equal to the another predetermined dead-time period in magnitude. In yet another example, the predetermined dead-time period is not equal to the another predetermined dead-time period in magnitude.

According to one embodiment, the transistors 640 and 644 affect a current 651 that flows through the inductor 650. For example, when the transistor 640 is turned on and the transistor 644 is turned off, the current 651 is equal to the current that flows through the transistor 640, and the magnitude of the current 651 is represented by the current-sensing voltage 691. In another example, when the transistor 640 is turned off and the transistor 644 is turned on, the current 651 is equal to the current that flows through the transistor 644, and the magnitude of the current 651 is represented by the current-sensing voltage 695.

According to another embodiment, if the current 651 is equal to the current that flows through the transistor 640 and if the current-sensing voltage 691 is larger than or equal to the peak-voltage threshold (e.g., $V_{th\_pe}$), the current 651 is larger than or equal to the peak-current threshold (e.g., $I_{th\_pe}$). According to yet another embodiment, if the current 651 is equal to the current that flows through the transistor 644 and if the current-sensing voltage 695 is smaller than or equal to the valley-voltage threshold (e.g., $V_{th\_va}$), the current 651 is smaller than or equal to the valley-current threshold (e.g., $I_{th\_va}$).

According to yet another embodiment, the transistor 640 (e.g., a power transistor) is a PMOS transistor, and the transistor 644 (e.g., a power transistor) is an NMOS transistor. For example, the gate terminal of the PMOS transistor 640 is connected to the driver 630, and the source terminal of the PMOS transistor 640 receives the input voltage 680. In another example, the gate terminal of the NMOS transistor 644 is connected to the driver 634, and the source terminal of the NMOS transistor 644 is biased to the ground. In yet another example, the drain terminal of the PMOS transistor 640 and the drain terminal of the NMOS transistor 644 both are connected to one terminal of the inductor 650. In yet another example, the other terminal of the inductor 650 is connected to one terminal of the capacitor 660, and the other terminal of the capacitor 660 is grounded.

Figure 7:
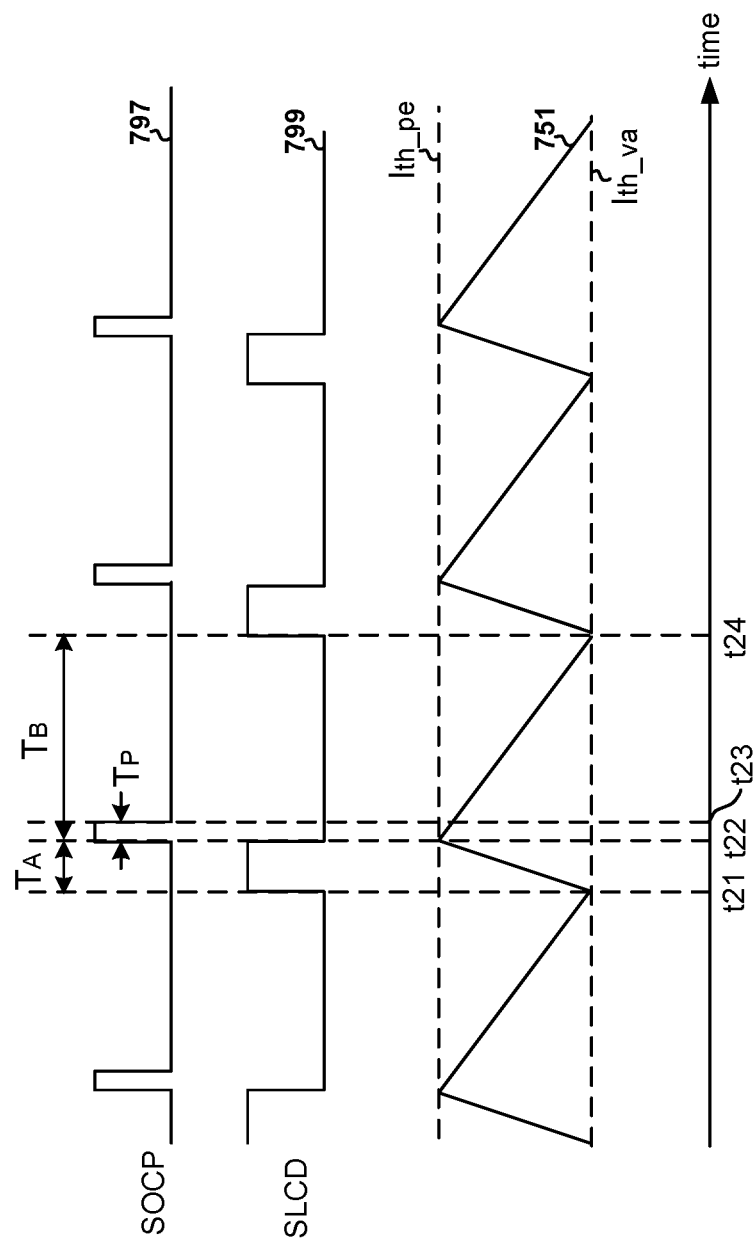
FIG. 7 is a simplified timing diagram for the power converter as shown in FIG. 6 according to an embodiment of the present invention.

FIG. 7 is a simplified timing diagram for the power converter 600 according to an embodiment of the present invention. This diagram is merely an example, which should not unduly limit the scope of the claims. One of ordinary skill in the art would recognize many variations, alternatives, and modifications. The waveform 797 represents the peak-voltage control signal 697 as a function of time, the waveform 799 represents the valley-voltage control signal 699 as a function of time, and the waveform 751 represents the current 651 as a function of time.

In one embodiment, when the power transistor 640 becomes turned off, then after a predetermined dead-time period, the power transistor 644 becomes turned on. For example, the predetermined dead-time period is relatively short, so effect of the predetermined dead-time period is not shown in FIG. 7. In another embodiment, when the power transistor 644 becomes turned off, then after another predetermined dead-time period, the power transistor 640 becomes turned on. For example, the another predetermined dead-time period is relatively short, so effect of the another predetermined dead-time period is not shown in FIG. 7.

According to one embodiment, at time $t_{21}$, the current 651 becomes equal to or smaller than the valley-current threshold (e.g., $I_{th\_va}$) as shown by the waveform 751, causing the valley-voltage control signal 699 to change from the logic low level to the logic high level as shown by the waveform 799. For example, at time $t_{21}$, the peak-voltage control signal 697 is at the logic low level as shown by the waveform 797. In another example, at time $t_{21}$, the modulation signal 623 changes from the logic high level to the logic low level. In yet another example, at time $t_{21}$, the transistor 644 becomes turned off and the transistor 640 becomes turned on. In yet another example, at time $t_{21}$, the drive signal 633, with or without a delay (e.g., with a delay), is changed to a logic low level to turn on the transistor 640 (e.g., a PMOS transistor), and the drive signal 637, with or without a delay (e.g., without a delay), is changed to the logic low level to turn off the transistor 644 (e.g., an NMOS transistor).

According to another embodiment, from time $t_{21}$ to time $t_{22}$, the valley-voltage control signal 699 remains at the logic high level as shown by the waveform 799 and the peak-voltage control signal 697 remains at the logic low level as shown by the waveform 797. For example, from time $t_{21}$ to time $t_{22}$, the modulation signal 623 remains at the logic low level. In another example, from time $t_{21}$ to time $t_{22}$, the transistor 640 remains turned on, and the transistor 644 remains turned off. In yet another example, from time $t_{21}$ to time $t_{22}$, the drive signal 633, with or without a delay (e.g., with a delay), is generated at the logic low level so that the transistor 640 (e.g., a PMOS transistor) remains being turned on, and the drive signal 637, with or without a delay (e.g., without a delay), is generated at the logic low level so that the transistor 644 (e.g., an NMOS transistor) remains being turned off. In yet another example, from time $t_{21}$ to time $t_{22}$, the current 651 increases (e.g., increases gradually and/or linearly) as shown by the waveform 751.

In one embodiment, at time $t_{22}$, the current 651 becomes equal to or larger than the peak-current threshold (e.g., $I_{th\_pe}$) as shown by the waveform 751, causing the peak-voltage control signal 697 to change from the logic low level to the logic high level as shown by the waveform 797 and the valley-voltage control signal 699 to change from the logic high level to the logic low level as shown by the waveform 799. For example, at time $t_{22}$, the modulation signal 623 changes from the logic low level to the logic high level. In another example, at time $t_{22}$, the transistor 640 becomes turned off and the transistor 644 becomes turned on. In another example, at time $t_{22}$, the drive signal 633, with or without a delay (e.g., without a delay), is changed to a logic high level to turn off the transistor 640 (e.g., a PMOS transistor), and the drive signal 637, with or without a delay (e.g., with a delay), is changed to the logic high level to turn on the transistor 644 (e.g., an NMOS transistor).

In another embodiment, from time $t_{22}$ to time $t_{23}$, the peak-voltage control signal 697 remains at the logic high level as shown by the waveform 797, and the valley-voltage control signal 699 remains at the logic low level as shown by the waveform 799. For example, from time $t_{22}$ to time $t_{23}$, the modulation signal 623 remains at the logic high level. In another example, from time $t_{22}$ to time $t_{23}$, the transistor 640 remains turned off, and the transistor 644 remains turned on. In yet another example, from time $t_{22}$ to time $t_{23}$, the current 651 decreases (e.g., decreases gradually and/or linearly) as shown by the waveform 751. In yet another example, the time duration from time $t_{22}$ to time $t_{23}$ is equal to a predetermined period of time (e.g., $T_p$) in magnitude to form a signal pulse with a predetermined pulse width (e.g., $T_p$) for the peak-voltage control signal 697 as shown by the waveform 797.

According to one embodiment, at time $t_{23}$, the peak-voltage control signal 697 changes from the logic high level to the logic low level as shown by the waveform 797. For example, at time $t_{23}$, the valley-voltage control signal 699 is at the logic low level as shown by the waveform 799. In another example, at time $t_{23}$, the modulation signal 623 remains at the logic high level. In yet another example, at time $t_{23}$, the transistor 640 remains turned off, and the transistor 644 remains turned on.

According to another embodiment, from time $t_{23}$ to time $t_{24}$, the peak-voltage control signal 697 remains at the logic low level as shown by the waveform 797, and the valley-voltage control signal 699 remains at the logic low level as shown by the waveform 799. For example, from time $t_{23}$ to time $t_{24}$, the modulation signal 623 remains at the logic high level. In another example, from time $t_{23}$ to time $t_{24}$, the transistor 640 remains turned off, and the transistor 644 remains turned on. In yet another example, from time $t_{23}$ to time $t_{24}$, the current 651 decreases (e.g., decreases gradually and/or linearly) as shown by the waveform 751.

According to yet another embodiment, from time $t_{22}$ to time $t_{24}$, the drive signal 633, with or without a delay (e.g., without a delay), is generated at the logic high level so that the transistor 640 (e.g., a PMOS transistor) remains being turned off, and the drive signal 637, with or without a delay (e.g., with a delay), is generated at the logic low level so that the transistor 644 (e.g., an NMOS transistor) remains being turned on. For example, from time $t_{22}$ to time $t_{24}$, the current 651 decreases (e.g., decreases gradually and/or linearly) as shown by the waveform 751.

According to yet another embodiment, at time $t_{24}$, the current 651 becomes equal to or smaller than the valley-current threshold (e.g., $I_{th\_va}$) as shown by the waveform 751, causing the valley-voltage control signal 699 to change from the logic low level to the logic high level as shown by the waveform 799. For example, at time $t_{24}$, the peak-voltage control signal 697 is at the logic low level as shown by the waveform 797. In another example, at time $t_{24}$, the modulation signal 623 changes from the logic high level to the logic low level. In yet another example, at time $t_{24}$, the transistor 644 becomes turned off and the transistor 640 becomes turned on.

In one embodiment, at time $t_{21}$, the peak-voltage control signal 697 is at the logic low level, the valley-voltage control signal 699 changes from the logic low level to the logic high level, the transistor 640 becomes turned on, and the transistor 644 becomes turned off. In another embodiment, at time $t_{22}$, the peak-voltage control signal 697 changes from the logic low level to the logic high level, the valley-voltage control signal 699 changes from the logic high level to the logic low level, the transistor 640 becomes turned off, and the transistor 644 becomes turned on.

Referring back to FIG. 6, if the output current 688 changes, the output voltage 682 deviates from a desired magnitude according to certain embodiments. For example, if the output voltage 682 deviates from the desired magnitude, the result of the reference voltage 686 minus the feedback voltage 684 is amplified by the error amplifier 610, which in response generates, together with the compensation network 612, the compensation voltage 611. In another example, if the feedback voltage 684 becomes larger, the compensation voltage 611 becomes smaller and the valley-voltage threshold (e.g., $V_{th\_va}$) also becomes smaller. In yet another example, if the feedback voltage 684 becomes smaller, the compensation voltage 611 becomes larger and the valley-voltage threshold (e.g., $V_{th\_va}$) also becomes larger.

According to some embodiment, the valley-voltage threshold (e.g., $V_{th\_va}$) changes until the input power and the output power of the power converter 600 reaches equilibrium. In one embodiment, if the output current 688 increases, the input power of the power converter 600 becomes smaller than the output power of the power converter 600, and the input power of the power converter is not in equilibrium with the output power of the power converter 600. For example, if the input power of the power converter 600 becomes smaller than the output power of the power converter 600, the capacitor 660 provides extra energy to the output, causing the output voltage 682 to decrease gradually and hence the feedback voltage 684 to also decrease gradually. In another example, in response to the feedback voltage 684 decreasing, the valley-voltage threshold (e.g., $V_{th\_va}$) increases in order to make the input power of the power converter 600 larger. In yet another example, if the input power of the power converter 600 becomes larger than the output power of the power converter 600, the output voltage 682 increases gradually and hence the feedback voltage 684 also increases gradually. In yet another example, if the input power of the power converter 600 becomes equal to and hence in equilibrium with the output power of the power converter 600, the output voltage 682 stops changing and the valley-voltage threshold (e.g., $V_{th\_va}$) also stops changing.

In another embodiment, if the output current 688 decreases, the input power of the power converter 600 becomes larger than the output power of the power converter 600, and the input power of the power converter is not in equilibrium with the output power of the power converter 600. For example, if the input power of the power converter 600 becomes larger than the output power of the power converter 600, the capacitor 660 stores extra energy from the input, causing the output voltage 682 to increase gradually and hence the feedback voltage 684 to also increase gradually. In another example, in response to the feedback voltage 684 increasing, the valley-voltage threshold (e.g., $V_{th\_va}$) decreases in order to make the input power of the power converter 600 smaller. In yet another example, if the input power of the power converter 600 becomes smaller than the output power of the power converter 600, the output voltage 682 decreases gradually and hence the feedback voltage 684 also decreases gradually. In yet another example, if the input power of the power converter 600 becomes equal to and hence in equilibrium with the output power of the power converter 600, the output voltage 682 stops changing and the valley-voltage threshold (e.g., $V_{th\_va}$) also stops changing.

According to one embodiment, as shown in FIG. 7, from time $t_{21}$ to time $t_{22}$, the current 651 increases (e.g., increases linearly) from the valley-current threshold (e.g., $I_{th\_va}$) to the peak-current threshold (e.g., $I_{th\_pe}$) as shown by the waveform 751, and from time $t_{22}$ to time $t_{24}$, the current 651 decreases (e.g., decreases linearly) from the peak-current threshold (e.g., $I_{th\_pe}$) to the valley-current threshold (e.g., $I_{th\_va}$) as shown by the waveform 751. For example, the valley-current threshold (e.g., $I_{th\_va}$) is larger than zero. In another example, the power converter 600 operates in continuous-conduction-mode (CCM).

In yet another example, from time $t_{21}$ to time $t_{22}$, the amount of increase for the current 651 is determined as follows:

$$\Delta I_A = \frac{V_{in} - V_{out}}{L} \times T_A \qquad \text{(Equation 1)}$$

where $\Delta I_A$ represents the amount of increase for the current 651 from time $t_{21}$ to time $t_{22}$. Additionally, $V_1$ represents the input voltage 680, and $V_{out}$ represents the output voltage 682. Moreover, L represents inductance of the inductor 650. Also, $T_A$ is equal to the time duration from time $t_{21}$ to time $t_{22}$ as shown in FIG. 7.

In yet another example, from time $t_{22}$ to time $t_{24}$, the amount of decrease for the current 651 is determined as follows:

$$\Delta I_B = \frac{V_{out}}{L} \times T_B \qquad \text{(Equation 2)}$$

where $\Delta I_B$ represents the amount of decrease for the current 651 from time $t_{22}$ to time $t_{24}$. Additionally, $V_{out}$ represents the output voltage 682, and L represents inductance of the inductor 650. Also, $T_B$ is equal to the time duration from time $t_{22}$ to time $t_{24}$ as shown in FIG. 7.

According to another embodiment, if the input power of the power converter 600 is equal to and hence in equilibrium with the output power of the power converter 600, the amount (e.g., $\Delta I_A$) of increase for the current 651 from time $t_{21}$ to time $t_{22}$ is equal to the amount (e.g., $\Delta I_B$) of decrease for the current 651 from time $t_{22}$ to time $t_{24}$. For example, if $\Delta I_A$ and $\Delta I_B$ are equal, based on Equations 1 and 2, the following is obtained:

$$T_B = \frac{V_{in} - V_{out}}{V_{out}} \times T_A \quad \text{(Equation 3)}$$

According to yet another embodiment, if the input power of the power converter 600 is equal to and hence in equilibrium with the output power of the power converter 600, average of the current 651 is equal to the output current 688 as follows:

$$I_{L\_ave} = I_{out} \quad \text{(Equation 4)}$$

where $I_{L\_ave}$ represents average of the current 651, and $I_{out}$ represents the output current 688.

For example, as shown by the waveform 751, average of the current 651 is determined as follows:

$$I_{L\_ave} = I_{th\_va} + \frac{(I_{th\_pe} - I_{th\_va})}{2} \quad \text{(Equation 5)}$$

where $I_{L\_ave}$ represents average of the current 651. Additionally, $I_{th\_pe}$ represents the peak-current threshold, and $I_{th\_va}$ represents the valley-current threshold.

In another example, based on Equations 4 and 5, the output current 688 is determined as follows:

$$I_{out} = I_{th\_va} + \frac{(I_{th\_pe} - I_{th\_va})}{2} \quad \text{(Equation 6)}$$

where $I_{out}$ represents the output current 688. Additionally, $I_{th\_pe}$ represents the peak-current threshold, and $I_{th\_va}$ represents the valley-current threshold.

According to yet another embodiment, the output current 688 has the following relationship with the peak-current threshold of the current 651 and the output voltage 682:

$$I_{out} = I_{th\_pe} - \frac{V_{out}}{2L} \times T_B \quad \text{(Equation 7)}$$

where $I_{out}$ represents the output current 688. Additionally, $I_{th\_pe}$ represents the peak-current threshold, and $V_{out}$ represents the output voltage 682. Moreover, L represents inductance of the inductor 650, and $T_B$ is equal to the time duration from time $t_{22}$ to time $t_{24}$ as shown in FIG. 7.

For example, under continuous-conduction-mode (CCM), the switching frequency of the power converter 600 is determined as follows:

$$f_{sw} = \frac{V_{out} \times (V_{in} - V_{out})}{2 \times L \times V_{in} \times (I_{th\_pe} - I_{out})} \quad \text{(Equation 8)}$$

where $f_{sw}$ represents the switching frequency of the power converter 600. Additionally, $V_{out}$ represents the output voltage 682, and $V_{in}$ represents the input voltage 680. Moreover, L represents inductance of the inductor 650, $I_{th\_pe}$ represents the peak-current threshold, and $I_{out}$ represents the output current 688.

In another example, according to Equation 8, under continuous-conduction-mode (CCM), if the input voltage 680, the output voltage 682, inductance of the inductor 650, and the peak-current threshold are constant, the switching frequency of the power converter 600 increases with the increasing output current 688, and the switching frequency of the power converter 600 decreases with the decreasing output current 688.

As shown in FIGS. 6 and 7, the power converter 600 (e.g., a buck converter) is a hysteresis converter according to certain embodiments. For example, as shown by the waveform 751, the current 651 changes between the peak-current threshold (e.g., $I_{th\_pe}$) and the valley-current threshold (e.g., $I_{th\_va}$). In another example, the difference between the peak-current threshold (e.g., $I_{th\_pe}$) and the valley-current threshold (e.g., $I_{th\_va}$) forms a hysteresis window for current.

Figure 8:
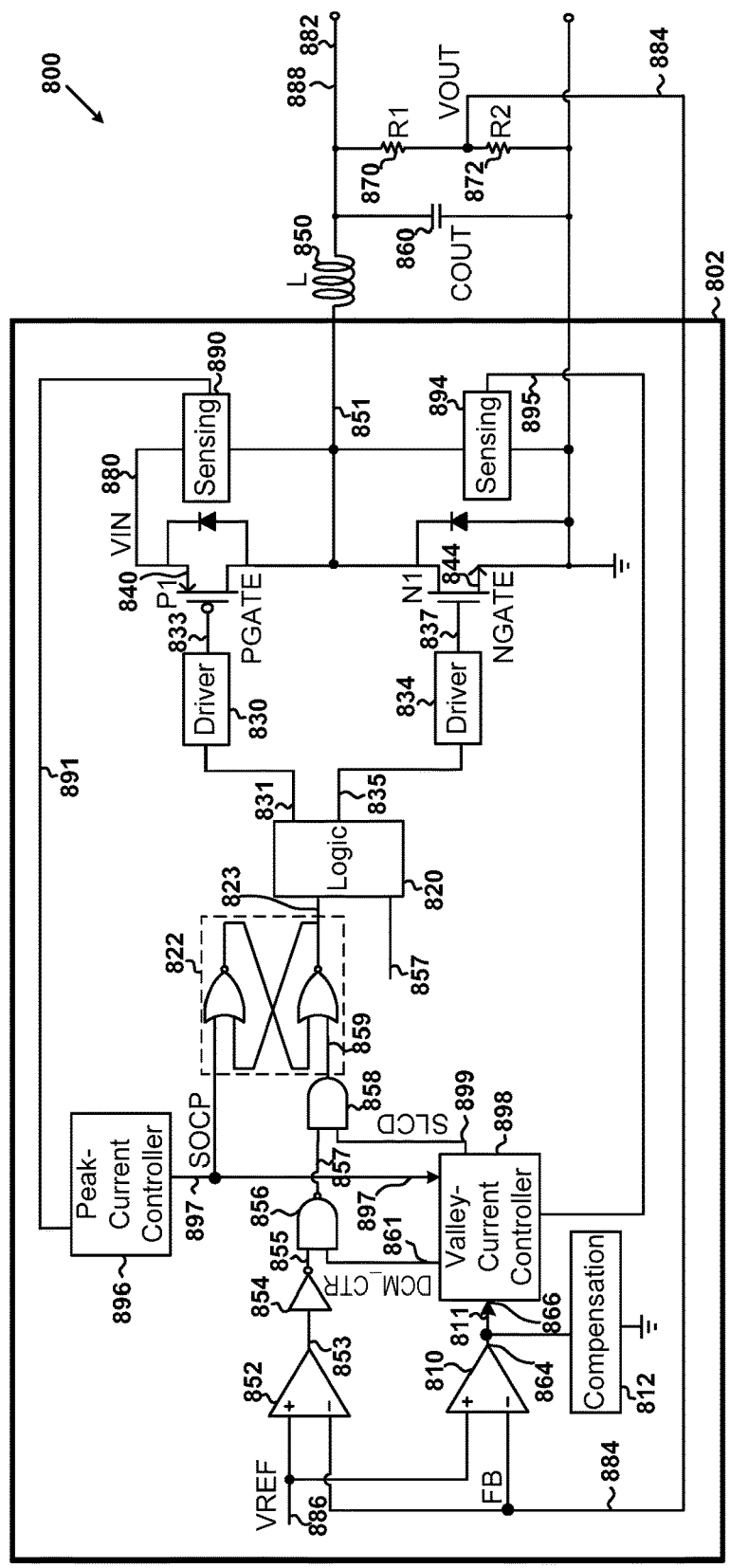
FIG. 8 is a simplified diagram of a buck converter according to another embodiment of the present invention.

FIG. 8 is a simplified diagram of a buck converter according to another embodiment of the present invention. This diagram is merely an example, which should not unduly limit the scope of the claims. One of ordinary skill in the art would recognize many variations, alternatives, and modifications. The power converter 800 (e.g., a buck converter) includes an error amplifier 810, a compensation network 812, a logic controller 820, an SR flip-flop 822, drivers 830 and 834, transistors 840 and 844, an inductor 850, a comparator 852, a NOT gate 854, a NAND gate 856, an AND gate 858, a capacitor 860, resistors 870 and 872, sensing circuits 890 and 894, a peak-current controller 896, and a valley-current controller 898. For example, the SR flip-flop 822 includes two NOR gates. In another example, the power converter 800 operates in continuous-conduction-mode (CCM) and discontinuous-conduction-mode (DCM).

For example, the error amplifier 810, the compensation network 812, the logic controller 820, the SR flip-flop 822, the drivers 830 and 834, the comparator 852, the NOT gate 854, the NAND gate 856, the AND gate 858, the peak-current controller 896, the valley-current controller 898, the transistors 840 and 844, and the sensing circuits 890 and 894 are on a chip 802. In another example, the inductor 850, the capacitor 860, and the resistors 870 and 872 are off the chip 802.

As shown in FIG. 8, the transistor 840 is a PMOS transistor including a drain terminal, and the transistor 844 is an NMOS transistor including a drain terminal according to certain embodiments. For example, the drain terminal of the PMOS transistor 840 and the drain terminal of the NMOS transistor 844 are connected. In another example, the inductor 850 includes two terminals. In yet another example, one terminal of the inductor 850 is connected to the drain terminal of the PMOS transistor 840 and the drain terminal of the NMOS transistor 844, and the other terminal of the inductor 850 is at an output voltage 882.

In one embodiment, an input voltage 880 is received by the buck converter 800, which in response generates the output voltage 882 and an output current 888. For example, the output voltage 882 is converted into a feedback voltage 884 by a voltage divider including the resistors 870 and 872, and the feedback voltage 884 is proportional to the output voltage 882. In another example, the feedback voltage 884 is received by a negative input terminal of the error amplifier 810, and a reference voltage 886 is received by a positive input terminal of the error amplifier 810. In yet another example, the error amplifier 810 generates, together with the compensation network 812, a compensation voltage 811 based at least in part on the feedback voltage 884 and the reference voltage 886. For example, the compensation voltage 811 is received by the valley-current controller 898. In another example, if the feedback voltage 884 increases and the reference voltage 886 remains unchanged, the compensation voltage 811 decreases. In yet another example, if the feedback voltage 884 decreases and the reference voltage 886 remains unchanged, the compensation voltage 811 increases.

In yet another example, the compensation network 812 performs loop phase compensation, and includes two terminals. In yet another example, one terminal of the compensation network 812 is connected to a terminal 864 of the error amplifier 810 and a terminal 866 of the valley-current controller 898. In yet another example, another terminal of the compensation network 812 is grounded.

In another embodiment, the sensing circuit 890 detects a current that flows through the transistor 840 and generates a current-sensing voltage 891, and the sensing circuit 894 detects a current that flows through the transistor 844 and generates a current-sensing voltage 695. For example, the current-sensing voltage 891 represents the magnitude of the current that flows through the transistor 840, and the current-sensing voltage 895 represents the magnitude of the current that flows through the transistor 844. In another example, the current-sensing voltage 891 is received by the peak-current controller 896. In yet another example, the current-sensing voltage 895 is received by the valley-current controller 898.

According to one embodiment, the peak-current controller 896 receives the current-sensing voltage 891, compares the current-sensing voltage 891 with a peak-voltage threshold (e.g., $V_{th\_pe}$), and generates a peak-voltage control signal 897. For example, the peak-voltage threshold (e.g., $V_{th\_pe}$) corresponds to a peak-current threshold (e.g., $I_{th\_pe}$). In another example, if the current-sensing voltage 891 is larger than the peak-voltage threshold (e.g., $V_{th\_pe}$), the current that flows through the transistor 840 is larger than the peak-current threshold (e.g., $I_{th\_pe}$). In yet another example, if the current-sensing voltage 891 is equal to the peak-voltage threshold (e.g., $V_{th\_pe}$), the current that flows through the transistor 840 is equal to the peak-current threshold (e.g., $I_{th\_pe}$). In yet another example, if the current-sensing voltage 891 is smaller than the peak-voltage threshold (e.g., $V_{th\_pe}$), the current that flows through the transistor 840 is smaller than the peak-current threshold (e.g., $I_{th\_pe}$).

In yet another example, if the current-sensing voltage 891 becomes equal to or larger than the peak-voltage threshold (e.g., $V_{th\_pe}$), the peak-voltage control signal 897 changes from a logic low level to a logic high level, and remains at the logic high level for a predetermined period of time (e.g., $T_p$) before changing back to the logic low level in order to form a signal pulse with a predetermined pulse width (e.g., $T_p$). In yet another example, the peak-voltage control signal 897 is received by a reset terminal of the SR flip-flop 822. In yet another example, the peak-voltage control signal 897 is also received by the valley-current controller 898.

According to another embodiment, the valley-current controller 898 receives the compensation voltage 811, the current-sensing voltage 895, and the peak-voltage control signal 897, compares the current-sensing voltage 895 with a valley-voltage threshold (e.g., $V_{th\_va}$), and generates a valley-voltage control signal 899 and a mode control signal 861. For example, the valley-voltage threshold (e.g., $V_{th\_va}$) corresponds to a valley-current threshold (e.g., $I_{th\_va}$). In another example, if the current-sensing voltage 895 is larger than the valley-voltage threshold (e.g., $V_{th\_va}$), the current that flows through the transistor 844 is larger than the valley-current threshold (e.g., $I_{th\_va}$). In yet another example, if the current-sensing voltage 895 is equal to the valley-voltage threshold (e.g., $V_{th\_va}$), the current that flows through the transistor 844 is equal to the valley-current threshold (e.g., $I_{th\_va}$). In yet another example, if the current-sensing voltage 895 is smaller than the valley-voltage threshold (e.g., $V_{th\_va}$), the current that flows through the transistor 844 is smaller than the valley-current threshold (e.g., $I_{th\_va}$).

In yet another example, if the compensation voltage 811 increases, the valley-current controller 898 makes the valley-voltage threshold (e.g., $V_{th\_va}$) larger, and if the compensation voltage 811 decreases, the valley-current controller 898 makes the valley-voltage threshold (e.g., $V_{th\_va}$) smaller. In yet another example, if the current-sensing voltage 895 becomes equal to or smaller than the valley-voltage threshold, the valley-voltage control signal 899 changes from a logic low level to a logic high level and remains at the logic high level until the peak-voltage control signal 897 changes from the logic low level to the logic high level. In yet another example, if the peak-voltage control signal 897 changes from the logic low level to the logic high level, the valley-voltage control signal 899 changes from the logic high level back to the logic low level. In yet another example, the valley-voltage control signal 899 is received by the AND gate 858.

In yet another example, if the valley-voltage threshold (e.g., $V_{th\_va}$) is larger than a mode threshold (e.g., $V_{th\_mod}$), the valley-current controller 898 generates the mode control signal 861 at a logic low level. In yet another example, if the valley-voltage threshold (e.g., $V_{th\_va}$) is equal to or smaller than the mode threshold (e.g., $V_{th\_mod}$), the valley-current controller 898 generates the mode control signal 861 at a logic high level. In yet another example, the mode control signal 861 is received by the NAND gate 856.

In one embodiment, the comparator 852 receives the reference voltage 886 at a positive terminal of the comparator 852 and the feedback voltage 884 at a negative terminal of the comparator 852, and generates a comparison signal 853 (e.g., a pulse-width-modulation signal). For example, if the reference voltage 886 is larger than the feedback voltage 884, the comparison signal 853 is at a logic high level. In another example, if the reference voltage 886 is smaller than the feedback voltage 884, the comparison signal 853 is at a logic low level. In yet another example, the comparison signal 853 is received by the NOT gate 854.

In another embodiment, the NOT gate 854 receives the comparison signal 853 and generates a signal 855. For example, if the comparison signal 853 is at a logic high level, the signal 855 is at a logic low level. In another example, if the comparison signal 853 is at a logic low level, the signal 855 is at a logic high level. In yet another example, the signal 855 is received by the NAND gate 856.

In yet another embodiment, the NAND gate 856 receives the signal 855 and the mode control signal 861 and generates a signal 857 (e.g., a pulse-width-modulation signal). For example, if the mode control signal 861 is at a logic low level, the signal 857 is at a logic high level. In another example, if the mode control signal 861 is at a logic high level, the signal 857 is the logical complement of the signal 855 and is the same as the comparison signal 853. In yet another example, the signal 857 is received by the AND gate 858 and the logic controller 820.

In yet another embodiment, the AND gate 858 receives the signal 857 and the valley-voltage control signal 899 and generates a signal 859. For example, if the mode control signal 861 is at a logic low level, the signal 859 is the same as the valley-voltage control signal 899. In another example, if the mode control signal 861 is at a logic high level, the signal 859 is determined by AND operation performed on the comparison signal 853 and the valley-voltage control signal 899. In yet another example, the signal 859 is received by a set terminal of the SR flip-flop 822.

In one embodiment, the SR flip-flop 822 receives the peak-voltage control signal 897 and the signal 859, generates a modulation signal 823, and outputs the modulation signal 823 to the logic controller 820, which also receives the signal 857. For example, the logic controller 820 generates logic signals 831 and 835 based at least in part on the modulation signal 823 and/or the signal 857. In another example, the logic signal 831 is received by the driver 830, which in response outputs a drive signal 833 to turn on or off the transistor 840. In yet another example, the logic signal 835 is received by the driver 834, which in response outputs a drive signal 837 to turn on or off the transistor 844.

In another embodiment, if the signal 857 is at a logic low level, the logic controller 820 generates, regardless of the modulation signal 823, the logic signals 831 and 835 in order to turn off the transistors 840 and 844. For example, if the signal 857 is at the logic low level, the logic controller 820 generates, regardless of the modulation signal 823, the logic signal 831 so that the driver 830 generates the drive signal 833 at the logic high level to turn off the transistor 840. In another example, if the signal 857 is at the logic low level, the logic controller 820 generates, regardless of the modulation signal 823, the logic signal 835 so that the driver 834 generates the drive signal 837 at the logic low level to turn off the transistor 844.

In another embodiment, if the signal 857 is at a logic high level, when the transistor 840 becomes turned off, then after a predetermined dead-time period, the transistor 844 becomes turned on (e.g., becomes turned on to allow free-wheeling of the inductor 850). For example, if the signal 857 is at the logic high level, the predetermined dead-time period after the driver 830 generates the drive signal 833 at a logic high level to turn off the transistor 840 (e.g., a PMOS transistor), the driver 834 generates the drive signal 837 at the logic high level to turn on the transistor 844 (e.g., an NMOS transistor).

In yet another embodiment, if the signal 857 is at the logic high level, when the transistor 844 becomes turned off, then after another predetermined dead-time period, the transistor 840 becomes turned on (e.g., becomes turned on to supply energy to the output). For example, if the signal 857 is at the logic high level, the another predetermined dead-time period after the driver 834 generates the drive signal 837 at a logic low level to turn off the transistor 844 (e.g., an NMOS transistor), the driver 830 generates the drive signal 833 at the logic low level to turn on the transistor 840 (e.g., a PMOS transistor). In another example, the predetermined dead-time period is equal to the another predetermined dead-time period in magnitude. In yet another example, the predetermined dead-time period is not equal to the another predetermined dead-time period in magnitude.

According to one embodiment, the transistors 840 and 844 affect a current 851 that flows through the inductor 850.

For example, when the transistor 840 is turned on and the transistor 844 is turned off, the current 851 is equal to the current that flows through the transistor 840, and the magnitude of the current 851 is represented by the current-sensing voltage 891. In another example, when the transistor 840 is turned off and the transistor 844 is turned on, the current 851 is equal to the current that flows through the transistor 844, and the magnitude of the current 851 is represented by the current-sensing voltage 895. In yet another example, when the transistor 840 is turned off and the transistor 844 is turned off, the current 851 is equal to zero in magnitude.

According to another embodiment, if the current 851 is equal to the current that flows through the transistor 840 and if the current-sensing voltage 891 is larger than or equal to the peak-voltage threshold (e.g., $V_{th\_pe}$), the current 851 is larger than or equal to the peak-current threshold (e.g., $I_{th\_pe}$). According to yet another embodiment, if the current 851 is equal to the current that flows through the transistor 844 and if the current-sensing voltage 895 is smaller than or equal to the valley-voltage threshold (e.g., $V_{th\_va}$), the current 851 is smaller than or equal to the valley-current threshold (e.g., $I_{th\_va}$).

According to yet another embodiment, the transistor 840 (e.g., a power transistor) is a PMOS transistor, and the transistor 844 (e.g., a power transistor) is an NMOS transistor. For example, the gate terminal of the PMOS transistor 840 is connected to the driver 830, and the source terminal of the PMOS transistor 840 receives the input voltage 880. In another example, the gate terminal of the NMOS transistor 844 is connected to the driver 834, and the source terminal of the NMOS transistor 844 is biased to the ground. In yet another example, the drain terminal of the PMOS transistor 840 and the drain terminal of the NMOS transistor 844 both are connected to one terminal of the inductor 850. In yet another example, the other terminal of the inductor 850 is connected to one terminal of the capacitor 860, and the other terminal of the capacitor 860 is grounded.

In one embodiment, if the output current 888 becomes smaller, the output voltage 882 and the feedback voltage 884 become larger. For example, if the feedback voltage 884 becomes larger, the result of the reference voltage 886 minus the feedback voltage 884 becomes smaller, causing the valley-voltage threshold (e.g., $V_{th\_va}$) to also become smaller. In another example, if the valley-voltage threshold (e.g., $V_{th\_va}$) becomes equal to or smaller than the mode threshold (e.g., $V_{th\_mod}$), the mode control signal 861 changes from the logic low level to the logic high level. In yet another example, after the mode control signal 861 has changed to the logic high level, the power converter 800 operates in discontinuous-conduction-mode (DCM).

In another embodiment, if the output current 888 becomes larger, the output voltage 882 and the feedback voltage 884 become smaller. For example, if the feedback voltage 884 becomes smaller, the result of the reference voltage 886 minus the feedback voltage 884 becomes larger, causing the valley-voltage threshold (e.g., $V_{th\_va}$) to also become larger. In another example, if the valley-voltage threshold (e.g., $V_{th\_va}$) becomes larger than the mode threshold (e.g., $V_{th\_mod}$), the mode control signal 861 changes from the logic high level to the logic low level. In yet another example, if the mode control signal 861 is at the logic low level, the power converter 800 operates in continuous-conduction-mode (CCM).

Figure 9:
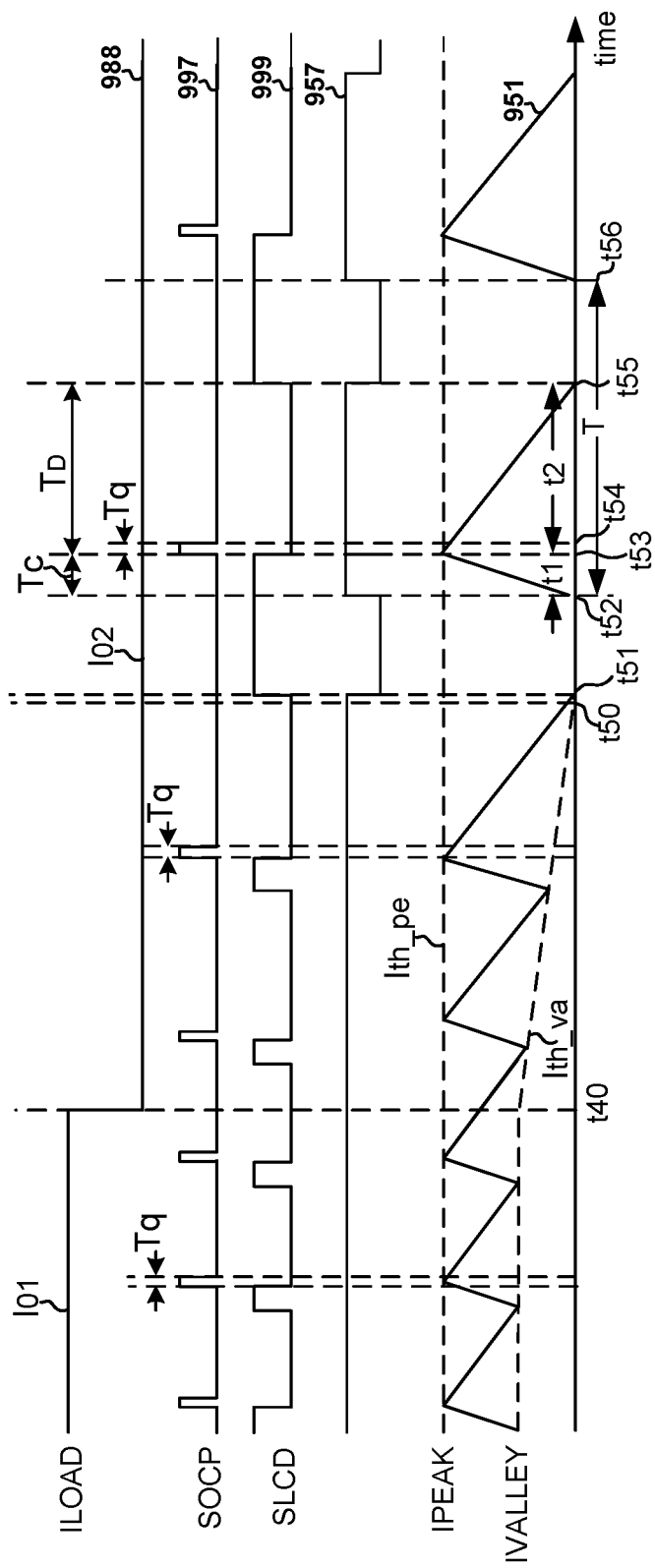
FIG. 9 is a simplified timing diagram for the power converter as shown in FIG. 8 according to an embodiment of the present invention.

FIG. 9 is a simplified timing diagram for the power converter 800 according to an embodiment of the present invention. This diagram is merely an example, which should not unduly limit the scope of the claims. One of ordinary skill in the art would recognize many variations, alternatives, and modifications. The waveform 988 represents the output current 888 as a function of time, the waveform 997 represents the peak-voltage control signal 897 as a function of time, the waveform 999 represents the valley-voltage control signal 899 as a function of time, the waveform 957 represents the signal 857 as a function of time, and the waveform 951 represents the current 851 as a function of time.

In one embodiment, if the signal 857 is at the logic high level, when the power transistor 840 becomes turned off, then after a predetermined dead-time period, the power transistor 844 becomes turned on. For example, the predetermined dead-time period is relatively short, so effect of the predetermined dead-time period is not shown in FIG. 9. In another embodiment, if the signal 857 is at the logic high level, when the power transistor 844 becomes turned off, then after another predetermined dead-time period, the power transistor 840 becomes turned on. For example, the another predetermined dead-time period is relatively short, so effect of the another predetermined dead-time period is not shown in FIG. 9.

According to one embodiment, at time $t_{40}$, the output current 888 drops from a high current magnitude (e.g., $I_{o1}$) to a low current magnitude (e.g., $I_{o2}$), and from time $t_{40}$ to time $t_{50}$, the output current 888 remains at the low current magnitude (e.g., $I_{o2}$), as shown by the waveform 988. For example, from time $t_{40}$ to time $t_{50}$, the input power of the power converter 800 is larger than the output power of the power converter 800, causing the output voltage 882 to increase gradually and the feedback voltage 884 to also increase gradually. In another example, from time $t_{40}$ to time $t_{50}$, in response to the feedback voltage 884 increasing, the result of the reference voltage 886 minus the feedback voltage 884 becomes smaller, and the valley-voltage threshold (e.g., $V_{th\_va}$) and the valley-current threshold (e.g., $I_{th\_va}$) also become smaller, as shown by the waveform 951.

In yet another example, from time $t_{40}$ to time $t_{50}$, even though the valley-voltage threshold (e.g., $V_{th\_va}$) becomes smaller, the valley-voltage threshold (e.g., $V_{th\_va}$) still remains larger than the mode threshold (e.g., $V_{th\_mod}$), and the mode control signal 861 remains at a logic low level. In yet another example, from time $t_{40}$ to time $t_{50}$, the mode control signal 861 remains at the logic low level, and the signal 857 remains at a logic high level as shown by the waveform 957. In yet another example, from time $t_{40}$ to time $t_{50}$, the mode control signal 861 remains at the logic low level, and the signal 859 remains the same as the valley-voltage control signal 899 as shown by the waveform 999.

According to another embodiment, at time $t_{50}$, the valley-voltage threshold (e.g., $V_{th\_va}$) becomes equal to or smaller than the mode threshold (e.g., $V_{th\_mod}$), causing the mode control signal 861 to change from the logic low level to a logic high level. For example, the mode threshold (e.g., $V_{th\_mod}$) is larger than zero. In another example, at time $t_{50}$, the mode control signal 861 changes from the logic low level to the logic high level, and the signal 857 becomes the same as the comparison signal 853. In yet another example, at time $t_{50}$, the comparison signal 853 is at a logic high level, and the signal 857 remains at the logic high level as shown by the waveform 957. In yet another example, at time $t_{50}$, the valley-voltage control signal 899 is at a logic low level as shown by the waveform 999, and the signal 859 is also at a logic low level. In yet another example, at time $t_{50}$, the signal 859 is at the logic low level, and the peak-voltage control signal 897 is also at the logic low level as shown by the waveform 997. In yet another example, at time $t_{50}$, the modulation signal 823 is at the logic high level and the signal 857 remains at the logic high level. In yet another example, at time $t_{50}$, the transistor 840 is turned off and the transistor 844 is turned on.

According to yet another embodiment, from time $t_{50}$ to time $t_{56}$, the mode control signal 861 remains at the logic high level, and the signal 857 remains to be the same as the comparison signal 853. For example, from time $t_{50}$ to time $t_{56}$, the signal 859 is determined by AND operation performed on the signal 857 and the valley-voltage control signal 899 as shown by the waveforms 957 and 999. In another example, from time $t_{50}$ to time $t_{56}$, the mode control signal 861 remains at the logic high level, and the signal 859 is determined by AND operation performed on the comparison signal 853 and the valley-voltage control signal 899. In yet another example, from time $t_{50}$ to time $t_{56}$, the output current 888 remains at the low current magnitude (e.g., $I_{o2}$), as shown by the waveform 988.

In one embodiment, from time $t_{50}$ to time $t_{51}$, the mode control signal 861 remains at the logic high level, the comparison signal 853 remains at the logic high level, and the signal 857 also remains at the logic high level as shown by the waveform 957. For example, from time $t_{50}$ to time $t_{51}$, the valley-voltage control signal 899 remains at the logic low level as shown by the waveform 999, and the signal 859 also remains at the logic low level. In another example, from time $t_{50}$ to time $t_{51}$, the signal 859 remains at the logic low level, and the peak-voltage control signal 897 also remains at the logic low level as shown by the waveform 997. In yet another example, from time $t_{50}$ to time $t_{51}$, the modulation signal 823 remains at the logic high level and the signal 857 also remains at the logic high level. In yet another example, from time $t_{50}$ to time $t_{51}$, the transistor 840 remains turned off and the transistor 844 remains turned on. In yet another example, as shown in FIG. 9, from time $t_{50}$ to time $t_{51}$, the current 851 decreases (e.g., decreases gradually and/or linearly) to zero as shown by the waveform 951.

In one embodiment, at time $t_{51}$, the current 851 becomes equal to or smaller than the valley-current threshold (e.g., $I_{th\_va}$) as shown by the waveform 951, causing the valley-voltage control signal 899 to change from the logic low level to the logic high level as shown by the waveform 999. For example, as shown in FIG. 9, at time $t_{51}$, the valley-voltage threshold (e.g., $V_{th\_va}$) is equal to zero, the valley-current threshold (e.g., $I_{th\_va}$) is equal to zero, and the current 851 is also equal to zero in magnitude as shown by the waveform 951. In another example, at time $t_{51}$, the mode control signal 861 is at the logic high level, the comparison signal 853 changes from the logic high level to the logic low level, the signal 857 also changes from the logic high level to the logic low level as shown by the waveform 957, and the signal 859 remains at the logic low level. In yet another example, at time $t_{51}$, the signal 859 remains at the logic low level, and the peak-voltage control signal 897 is also at the logic low level as shown by the waveform 997. In yet another example, at time $t_{51}$, the signal 857 changes from the logic high level to the logic low level as shown by the waveform 957, and both the transistors 840 and 844 are turned off.

In another embodiment, from time $t_{51}$ to time $t_{52}$, the mode control signal 861 remains at the logic high level, the comparison signal 853 remains at the logic low level, the signal 857 remains at the logic low level as shown by the waveform 957, and the signal 859 also remains at the logic low level. For example, from time $t_{51}$ to time $t_{52}$, the valley-voltage control signal 899 remains at the logic high level as shown by the waveform 999. In another example, from time $t_{51}$ to time $t_{52}$, the signal 859 remains at the logic low level, and the peak-voltage control signal 897 also remains at the logic low level as shown by the waveform 997. In yet another example, from time $t_{51}$ to time $t_{52}$, the signal 857 remains at the logic low level as shown by the waveform 957, and both the transistors 840 and 844 remain turned off. In yet another example, as shown in FIG. 9, from time $t_{51}$ to time $t_{52}$, the valley-voltage threshold (e.g., $V_{th\_va}$) remains equal to zero, the valley-current threshold (e.g., $I_{th\_va}$) remains equal to zero, and the current 851 also remains equal to zero in magnitude as shown by the waveform 951.

In yet another embodiment, at time $t_{52}$, the mode control signal 861 is at the logic high level and the valley-voltage control signal 899 is at the logic high level as shown by the waveform 999, but the comparison signal 853 changes from the logic low level to the logic high level and the signal 857 also changes from the logic low level to the logic high level as shown by the waveform 957, causing the signal 859 to change from the logic low level to a logic high level. For example, at time $t_{52}$, the peak-voltage control signal 897 is at the logic low level as shown by the waveform 997. In another example, at time $t_{52}$, the modulation signal 823 changes from the logic high level to the logic low level, and the signal 857 changes from the logic low level to the logic high level as shown by the waveform 957. In yet another example, at time $t_{52}$, the transistor 844 is turned off and the transistor 840 is turned on. In yet another example, at time $t_{52}$, the current 851 is equal to zero in magnitude as shown by the waveform 951.

In yet another embodiment, from time $t_{52}$ to time $t_{53}$, the mode control signal 861 remains at the logic high level, the valley-voltage control signal 899 remains at the logic high level as shown by the waveform 999, the comparison signal 853 remains at the logic high level, the signal 857 remains at the logic high level as shown by the waveform 957, and the signal 859 remains at the logic high level. For example, from time $t_{52}$ to time $t_{53}$, the peak-voltage control signal 897 remains at the logic low level as shown by the waveform 997. In another example, from time $t_{52}$ to time $t_{53}$, the modulation signal 823 remains at the logic low level, and the signal 857 remains at the logic high level as shown by the waveform 957. In yet another example, from time $t_{52}$ to time $t_{53}$, the transistor 840 remains turned on and the transistor 844 remains turned off. In yet another example, from time $t_{52}$ to time $t_{53}$, the current 851 increases (e.g., increases gradually and/or linearly) as shown by the waveform 951.

According to one embodiment, at time $t_{53}$, the current 851 becomes equal to or larger than the peak-current threshold (e.g., $I_{th\_pe}$) as shown by the waveform 951, causing the peak-voltage control signal 897 to change from the logic low level to the logic high level as shown by the waveform 997 and the valley-voltage control signal 899 to change from the logic high level to the logic low level as shown by the waveform 999. For example, at time $t_{53}$, the valley-voltage control signal 899 changes from the logic high level to the logic low level as shown by the waveform 999, and the signal 859 changes from the logic high level to the logic low level. In another example, at time $t_{53}$, the modulation signal 823 changes from the logic low level to the logic high level. In yet another example, at time $t_{53}$, the mode control signal 861 remains at the logic high level, the comparison signal 853 remains at the logic high level, and the signal 857 remains at the logic high level as shown by the waveform 957. In yet another example, at time $t_{53}$, the transistor 840 becomes turned off and the transistor 844 becomes turned on.

According to another embodiment, from time $t_{53}$ to time $t_{54}$, the peak-voltage control signal 897 remains at the logic high level as shown by the waveform 997 and the valley-voltage control signal 899 remains at the logic low level as shown by the waveform 999. For example, from time $t_{53}$ to time $t_{54}$, the valley-voltage control signal 899 remains at the logic low level as shown by the waveform 999, and the signal 859 remains at the logic low level. In another example, from time $t_{53}$ to time $t_{54}$, the modulation signal 823 remains at the logic high level. In yet another example, from time $t_{53}$ to time $t_{54}$, the mode control signal 861 remains at the logic high level, the comparison signal 853 remains at the logic high level, and the signal 857 remains at the logic high level as shown by the waveform 957. In yet another example, from time $t_{53}$ to time $t_{54}$, the transistor 840 remains turned off and the transistor 844 remains turned on. In yet another example, from time $t_{53}$ to time $t_{54}$, the current 851 decreases (e.g., decreases gradually and/or linearly) as shown by the waveform 951. In yet another example, the time duration from time $t_{53}$ to time $t_{54}$ is equal to a predetermined period of time (e.g., $T_q$) in magnitude to form a signal pulse with a predetermined pulse width (e.g., $T_q$) for the peak-voltage control signal 897 as shown by the waveform 997.

According to yet another embodiment, at time $t_{54}$, the peak-voltage control signal 897 changes from the logic high level to the logic low level as shown by the waveform 997, and the valley-voltage control signal 899 is at the logic low level as shown by the waveform 999. For example, at time $t_{54}$, the valley-voltage control signal 899 is at the logic low level as shown by the waveform 999, and the signal 859 is at the logic low level. In another example, at time $t_{54}$, the modulation signal 823 remains at the logic high level. In yet another example, at time $t_{54}$, the mode control signal 861 remains at the logic high level, the comparison signal 853 remains at the logic high level, and the signal 857 remains at the logic high level as shown by the waveform 957. In yet another example, at time $t_{54}$, the transistor 840 remains turned off and the transistor 844 remains turned on.

According to yet another embodiment, from time $t_{54}$ to time $t_{55}$, the peak-voltage control signal 897 remains at the logic low level as shown by the waveform 997, and the valley-voltage control signal 899 remains at the logic low level as shown by the waveform 999. For example, from time $t_{54}$ to time $t_{55}$, the valley-voltage control signal 899 remains at the logic low level as shown by the waveform 999, and the signal 859 remains at the logic low level. In another example, from time $t_{54}$ to time $t_{55}$, the modulation signal 823 remains at the logic high level. In yet another example, from time $t_{54}$ to time $t_{55}$, the mode control signal 861 remains at the logic high level, the comparison signal 853 remains at the logic high level, and the signal 857 remains at the logic high level as shown by the waveform 957. In yet another example, from time $t_{54}$ to time $t_{55}$, the transistor 840 remains turned off and the transistor 844 remains turned on. In yet another example, from time $t_{54}$ to time $t_{55}$, the current 851 decreases (e.g., decreases gradually and/or linearly) as shown by the waveform 951.

In one embodiment, at time $t_{55}$, the current 851 becomes equal to or smaller than the valley-current threshold (e.g., $I_{th\_va}$) as shown by the waveform 951, causing the valley-voltage control signal 899 to change from the logic low level to the logic high level as shown by the waveform 999. For example, at time $t_{55}$, the valley-current threshold (e.g., $I_{th\_va}$) is equal to zero, and the current 851 is also equal to zero as shown by the waveform 951. In another example, at time $t_{55}$, the mode control signal 861 is at the logic high level, the comparison signal 853 changes from the logic high level to the logic low level, the signal 857 also changes from the logic high level to the logic low level as shown by the waveform 957, and the signal 859 is at the logic low level. In yet another example, at time $t_{55}$, the signal 859 is at the logic low level, and the peak-voltage control signal 897 is also at the logic low level as shown by the waveform 997. In yet another example, at time $t_{55}$, the signal 857 changes from the logic high level to the logic low level as shown by the waveform 957, and both the transistors 840 and 844 are turned off.

In another embodiment, from time $t_{55}$ to time $t_{56}$, the mode control signal 861 remains at the logic high level, the comparison signal 853 remains at the logic low level, the signal 857 remains at the logic low level as shown by the waveform 957, and the signal 859 also remains at the logic low level. For example, from time $t_{55}$ to time $t_{56}$, the valley-voltage control signal 899 remains at the logic high level as shown by the waveform 999. In another example, from time $t_{55}$ to time $t_{56}$, the signal 859 remains at the logic low level, and the peak-voltage control signal 897 also remains at the logic low level as shown by the waveform 997. In yet another example, from time $t_{55}$ to time $t_{56}$, the signal 857 remains at the logic low level as shown by the waveform 957, and both the transistors 840 and 844 remain turned off. In yet another example, from time $t_{55}$ to time $t_{56}$, the current 851 remains at zero in magnitude as shown by the waveform 951.

In yet another embodiment, at time $t_{56}$, the mode control signal 861 is at the logic high level and the valley-voltage control signal 899 is at the logic high level as shown by the waveform 999, but the comparison signal 853 changes from the logic low level to the logic high level and the signal 857 also changes from the logic low level to the logic high level as shown by the waveform 957, causing the signal 859 to change from the logic low level to the logic high level. For example, at time $t_{56}$, the peak-voltage control signal 897 is at the logic low level as shown by the waveform 997. In another example, at time $t_{56}$, the modulation signal 823 changes from the logic high level to the logic low level, and the signal 857 also changes from the logic low level to the logic high level as shown by the waveform 957. In yet another example, at time $t_{56}$, the transistor 844 is turned off and the transistor 840 is turned on.

As shown in FIG. 9, the power converter 800 operates in continuous-conduction-mode (CCM) until time $t_{50}$, and starts operating in discontinuous-conduction-mode (DCM) at time $t_{52}$ according to certain embodiments. For example, starting at time $t_{52}$, the power converter 800 operates in discontinuous-conduction-mode (DCM) with a switching period equal to a time duration from time $t_{52}$ to time $t_{56}$.

In another example, from time $t_{52}$ to time $t_{53}$, the amount of increase for the current 851 is determined as follows:

$$\Delta I_C = \frac{V_{in} - V_{out}}{L} \times T_C \quad \text{(Equation 9)}$$

where $\Delta I_C$ represents the amount of increase for the current 851 from time $t_{52}$ to time $t_{53}$. Additionally, $V_{in}$ represents the input voltage 880, and $V_{out}$ represents the output voltage 882. Moreover, L represents inductance of the inductor 850. Also, $T_C$ is equal to the time duration from time $t_{52}$ to time $t_{53}$ as shown in FIG. 9.

In yet another example, the current 851 is equal to zero at time $t_{52}$ and is equal to the peak-current threshold (e.g., $I_{th\_pe}$) at time $t_{53}$, and Equation 9 is changed as follows:

$$I_{th\_pe} = \frac{V_{in} - V_{out}}{L} \times T_C \quad \text{(Equation 10)}$$

where $I_{th\_pe}$ represents the peak-current threshold. Additionally, $V_{in}$ represents the input voltage 880, and $V_{out}$ represents the output voltage 882. Moreover, L represents inductance of the inductor 850. Also, $T_C$ is equal to the time duration from time $t_{52}$ to time $t_{53}$ as shown in FIG. 9.

In yet another example, from time $t_{53}$ to time $t_{55}$, the amount of decrease for the current 851 is determined as follows:

$$\Delta I_D = \frac{V_{out}}{L} \times T_D \quad \text{(Equation 11)}$$

where $\Delta I_D$ represents the amount of decrease for the current 651 from time $t_{53}$ to time $t_{55}$. Additionally, $V_{out}$ represents the output voltage 882, and L represents inductance of the inductor 850. Also, $T_D$ is equal to the time duration from time $t_{53}$ to time $t_{55}$ as shown in FIG. 9.

In yet another example, the current 851 is equal to the peak-current threshold (e.g., $I_{th\_pe}$) at time $t_{53}$ and is equal to zero at time $t_{55}$, and Equation 11 is changed as follows:

$$\Delta I_{th\_pe} = \frac{V_{out}}{L} \times T_D \quad \text{(Equation 12)}$$

where $I_{th\_pe}$ represents the peak-current threshold. Additionally, $V_{out}$ represents the output voltage 882, and L represents inductance of the inductor 850. Also, $T_D$ is equal to the time duration from time $t_{53}$ to time $t_{55}$ as shown in FIG. 9.

In one embodiment, if the input power of the power converter 800 is equal to and hence in equilibrium with the output power of the power converter 800, average of the current 851 is equal to the output current 888 as follows:

$$I_{L\_ave} = I_{out} \quad \text{(Equation 13)}$$

where $I_{L\_ave}$ represents average of the current 851, and $I_{out}$ represents the output current 888.

In another embodiment, the output current 888 has the following relationship with the peak-current threshold of the current 851:

$$I_{out} = \frac{I_{th\_pe} \times (T_C - T_D)}{2 \times T} \quad \text{(Equation 14)}$$

where $I_{out}$ represents the output current 888. Additionally, $I_{th\_pe}$ represents the peak-current threshold. Moreover, $T_C$ is equal to the time duration from time $t_{52}$ to time $t_{53}$ as shown in FIG. 9, and $T_D$ is equal to the time duration from time $t_{53}$ to time $t_{55}$ as shown in FIG. 9. Also, T represents a switching period that is equal to a time duration from time $t_{52}$ to time $t_{56}$ as shown in FIG. 9.

For example, under discontinuous-conduction-mode (DCM), the switching frequency of the power converter 800 is determined as follows:

$$f_{sw} = \frac{2 \times I_{out} \times V_{out} \times (V_{in} - V_{out})}{I_{th\_pe}^2 \times L \times V_{in}} \qquad \text{(Equation 15)}$$

where $f_{sw}$ represents the switching frequency of the power converter 800. Additionally, $I_{out}$ represents the output current 888, $V_{out}$ represents the output voltage 882, and $V_{in}$ represents the input voltage 880. Moreover, $I_{th\_pe}$ represents the peak-current threshold, and L represents inductance of the inductor 850.

In another example, according to Equation 15, under discontinuous-conduction-mode (DCM), if the output voltage 882, the input voltage 880, the peak-current threshold, and inductance of the inductor 850 are constant, the switching frequency of the power converter 800 increases with the increasing output current 888, and the switching frequency of the power converter 800 decreases with the decreasing output current 888.

As shown in FIGS. 8 and 9, the power converter 800 (e.g., a buck converter) is a hysteresis converter according to certain embodiments. For example, as shown by the waveform 951, the current 851 changes between the peak-current threshold (e.g., $I_{th\_pe}$) and the valley-current threshold (e.g., $I_{th\_va}$). In another example, the difference between the peak-current threshold (e.g., $I_{th\_pe}$) and the valley-current threshold (e.g., $I_{th\_va}$) forms a hysteresis window for current.

Figure 10:
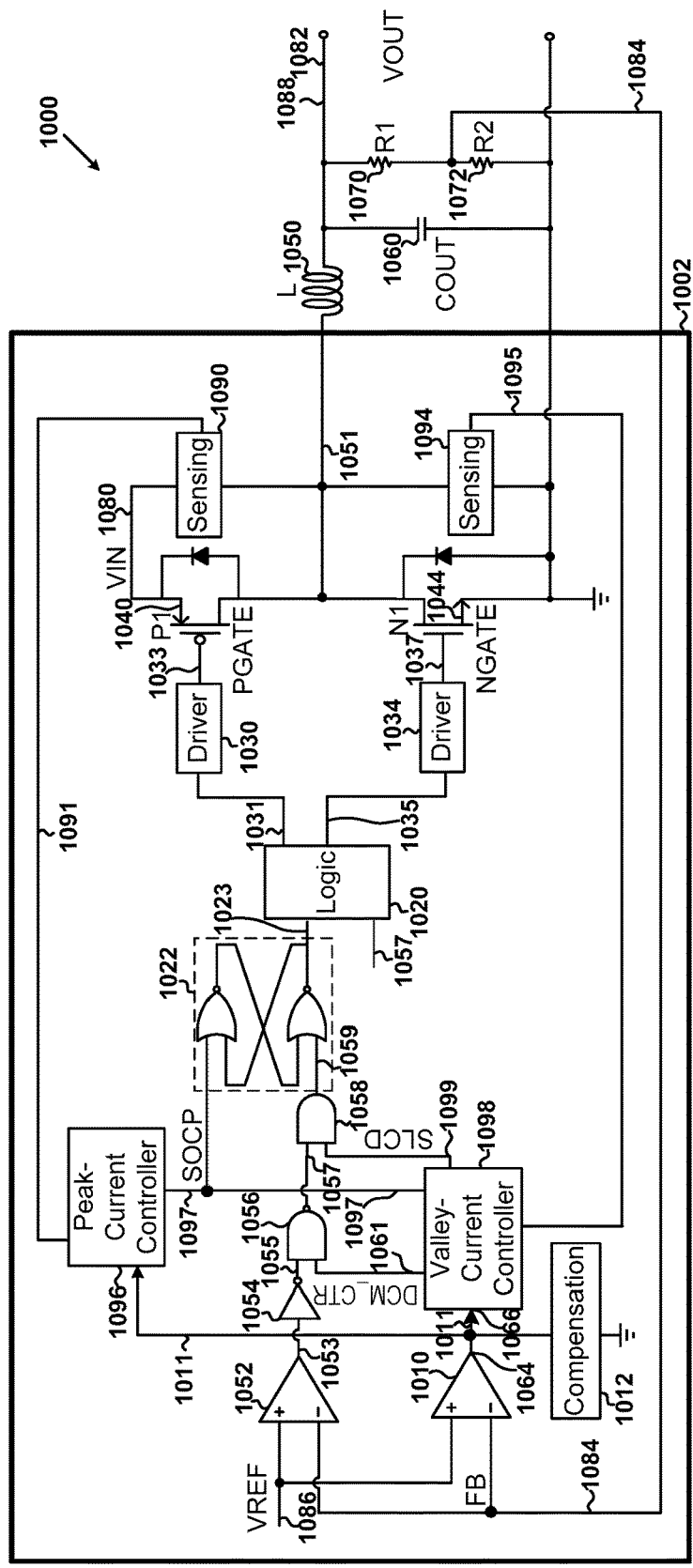
FIG. 10 is a simplified diagram of a buck converter according to yet another embodiment of the present invention.

FIG. 10 is a simplified diagram of a buck converter according to yet another embodiment of the present invention. This diagram is merely an example, which should not unduly limit the scope of the claims. One of ordinary skill in the art would recognize many variations, alternatives, and modifications. The power converter 1000 (e.g., a buck converter) includes an error amplifier 1010, a compensation network 1012, a logic controller 1020, an SR flip-flop 1022, drivers 1030 and 1034, transistors 1040 and 1044, an inductor 1050, a comparator 1052, a NOT gate 1054, a NAND gate 1056, an AND gate 1058, a capacitor 1060, resistors 1070 and 1072, sensing circuits 1090 and 1094, a peak-current controller 1096, and a valley-current controller 1098. For example, the SR flip-flop 1022 includes two NOR gates. In another example, the power converter 1000 operates in continuous-conduction-mode (CCM) and discontinuous-conduction-mode (DCM).

For example, the error amplifier 1010, the compensation network 1012, the logic controller 1020, the SR flip-flop 1022, the drivers 1030 and 1034, the comparator 1052, the NOT gate 1054, the NAND gate 1056, the AND gate 1058, the peak-current controller 1096, the valley-current controller 1098, the transistors 1040 and 1044, and the sensing circuits 1090 and 1094 are on a chip 1002. In another example, the inductor 1050, the capacitor 1060, and the resistors 1070 and 1072 are off the chip 1002.

As shown in FIG. 10, the transistor 1040 is a PMOS transistor including a drain terminal, and the transistor 1044 is an NMOS transistor including a drain terminal according to certain embodiments. For example, the drain terminal of the PMOS transistor 1040 and the drain terminal of the NMOS transistor 1044 are connected. In another example, the inductor 1050 includes two terminals. In yet another example, one terminal of the inductor 1050 is connected to the drain terminal of the PMOS transistor 1040 and the drain terminal of the NMOS transistor 1044, and the other terminal of the inductor 1050 is at an output voltage 1082.

In one embodiment, an input voltage 1080 is received by the buck converter 1000, which in response generates the output voltage 1082 and an output current 1088. For example, the output voltage 1082 is converted into a feedback voltage 1084 by a voltage divider including the resistors 1070 and 1072, and the feedback voltage 1084 is proportional to the output voltage 1082. In another example, the feedback voltage 1084 is received by a negative input terminal of the error amplifier 1010, and a reference voltage 1086 is received by a positive input terminal of the error amplifier 1010. In yet another example, the error amplifier 1010 generates, together with the compensation network 1012, a compensation voltage 1011 based at least in part on the feedback voltage 1084 and the reference voltage 1086. For example, the compensation voltage 1011 is received by the peak-current controller 1096 and the valley-current controller 1098. In another example, if the feedback voltage 1084 increases and the reference voltage 1086 remains unchanged, the compensation voltage 1011 decreases. In yet another example, if the feedback voltage 1084 decreases and the reference voltage 1086 remains unchanged, the compensation voltage 1011 increases.

In yet another example, the compensation network 1012 performs loop phase compensation, and includes two terminals. In yet another example, one terminal of the compensation network 1012 is connected to a terminal 1064 of the error amplifier 1010 and a terminal 1066 of the valley-current controller 1098. In yet another example, another terminal of the compensation network 1012 is grounded.

In another embodiment, the sensing circuit 1090 detects a current that flows through the transistor 1040 and generates a current-sensing voltage 1091, and the sensing circuit 1094 detects a current that flows through the transistor 1044 and generates a current-sensing voltage 1095. For example, the current-sensing voltage 1091 represents the magnitude of the current that flows through the transistor 1040, and the current-sensing voltage 1095 represents the magnitude of the current that flows through the transistor 1044. In another example, the current-sensing voltage 1091 is received by the peak-current controller 1096. In yet another example, the current-sensing voltage 1095 is received by the valley-current controller 1098.

According to one embodiment, the peak-current controller 1096 receives the compensation voltage 1011 and the current-sensing voltage 1091, compares the current-sensing voltage 1091 with a peak-voltage threshold (e.g., $V_{th\_pe}$), and generates a peak-voltage control signal 1097. For example, the peak-voltage threshold (e.g., $V_{ape}$) corresponds to a peak-current threshold (e.g., $I_{th\_pe}$). In another example, if the current-sensing voltage 1091 is larger than the peak-voltage threshold (e.g., $V_{th\_pe}$), the current that flows through the transistor 1040 is larger than the peak-current threshold (e.g., $I_{th\_pe}$). In yet another example, if the current-sensing voltage 1091 is equal to the peak-voltage threshold (e.g., $V_{th\_pe}$), the current that flows through the transistor 1040 is equal to the peak-current threshold (e.g., $I_{th\_pe}$). In yet another example, if the current-sensing voltage 1091 is smaller than the peak-voltage threshold (e.g., $V_{th\_pe}$), the current that flows through the transistor 1040 is smaller than the peak-current threshold (e.g., $I_{th\_pe}$).

In yet another example, if the compensation voltage 1011 increases, the peak-current controller 1096 makes the peak-voltage threshold (e.g., $V_{th\_pe}$) larger, and if the compensation voltage 1011 decreases, the peak-current controller 1096 makes the peak-voltage threshold (e.g., $V_{th\_pe}$) smaller. In yet another example, if the current-sensing voltage 1091 becomes equal to or larger than the peak-voltage threshold (e.g., $V_{th\_pe}$), the peak-voltage control signal 1097 changes from a logic low level to a logic high level, and remains at the logic high level for a predetermined period of time (e.g., $T_p$) before changing back to the logic low level in order to form a signal pulse with a predetermined pulse width (e.g., $T_p$). In yet another example, the peak-voltage control signal 1097 is received by a reset terminal of the SR flip-flop 1022. In yet another example, the peak-voltage control signal 1097 is also received by the valley-current controller 1098.

According to another embodiment, the valley-current controller 1098 receives the compensation voltage 1011, the current-sensing voltage 1095, and the peak-voltage control signal 1097, compares the current-sensing voltage 1095 with a valley-voltage threshold (e.g., $V_{th\_va}$), and generates a valley-voltage control signal 1099 and a mode control signal 1061. For example, the valley-voltage threshold (e.g., $V_{th\_va}$) corresponds to a valley-current threshold (e.g., $I_{th\_va}$). In another example, if the current-sensing voltage 1095 is larger than the valley-voltage threshold (e.g., $V_{th\_va}$), the current that flows through the transistor 1044 is larger than the valley-current threshold (e.g., $I_{th\_va}$). In yet another example, if the current-sensing voltage 1095 is equal to the valley-voltage threshold (e.g., $V_{th\_va}$), the current that flows through the transistor 1044 is equal to the valley-current threshold (e.g., $I_{th\_va}$). In yet another example, if the current-sensing voltage 1095 is smaller than the valley-voltage threshold (e.g., $V_{th\_va}$), the current that flows through the transistor 1044 is smaller than the valley-current threshold (e.g., $I_{th\_va}$).

In yet another example, if the compensation voltage 1011 increases, the valley-current controller 1098 makes the valley-voltage threshold (e.g., $V_{th\_va}$) larger, and if the compensation voltage 1011 decreases, the valley-current controller 1098 makes the valley-voltage threshold (e.g., $V_{th\_va}$) smaller. In yet another example, if the compensation voltage 1011 increases, both the peak-voltage threshold (e.g., $V_{th\_pe}$) and the valley-voltage threshold (e.g., $V_{th\_va}$) become larger, but the result of the peak-voltage threshold (e.g., $V_{th\_pe}$) minus the valley-voltage threshold (e.g., $V_{th\_va}$) remains the same. In yet another example, if the compensation voltage 1011 increases, both the peak-voltage threshold (e.g., $V_{th\_pe}$) and the valley-voltage threshold (e.g., $V_{th\_va}$) become larger, and the result of the peak-voltage threshold (e.g., $V_{th\_pe}$) minus the valley-voltage threshold (e.g., $V_{th\_va}$) also changes. In yet another example, if the compensation voltage 1011 decreases, both the peak-voltage threshold (e.g., $V_{th\_pe}$) and the valley-voltage threshold (e.g., $V_{th\_va}$) become smaller, but the result of the peak-voltage threshold (e.g., $V_{th\_pe}$) minus the valley-voltage threshold (e.g., $V_{th\_va}$) remains the same. In yet another example, if the compensation voltage 1011 decreases, both the peak-voltage threshold (e.g., $V_{th\_pe}$) and the valley-voltage threshold (e.g., $V_{th\_va}$) become smaller, and the result of the peak-voltage threshold (e.g., $V_{th\_pe}$) minus the valley-voltage threshold (e.g., $V_{th\_va}$) also changes.

In yet another example, if the current-sensing voltage 1095 becomes equal to or smaller than the valley-voltage threshold, the valley-voltage control signal 1099 changes from a logic low level to a logic high level and remains at the logic high level until the peak-voltage control signal 1097 changes from the logic low level to the logic high level. In yet another example, if the peak-voltage control signal 1097 changes from the logic low level to the logic high level, the valley-voltage control signal 1099 changes from the logic high level back to the logic low level. In yet another example, the valley-voltage control signal 1099 is received by the AND gate 1058.

In yet another example, if the valley-voltage threshold (e.g., $V_{th\_va}$) is larger than a mode threshold (e.g., $V_{th\_mod}$), the valley-current controller 1098 generates the mode control signal 1061 at a logic low level. In yet another example, if the valley-voltage threshold (e.g., $V_{th\_va}$) is equal to or smaller than the mode threshold (e.g., $V_{th\_mod}$), the valley-current controller 1098 generates the mode control signal 1061 at a logic high level. In yet another example, the mode control signal 1061 is received by the NAND gate 1056.

In one embodiment, the comparator 1052 receives the reference voltage 1086 at a positive terminal of the comparator 1052 and the feedback voltage 1084 at a negative terminal of the comparator 1052, and generates a comparison signal 1053 (e.g., a pulse-width-modulation signal). For example, if the reference voltage 1086 is larger than the feedback voltage 1084, the comparison signal 1053 is at a logic high level. In another example, if the reference voltage 1086 is smaller than the feedback voltage 1084, the comparison signal 1053 is at a logic low level. In yet another example, the comparison signal 1053 is received by the NOT gate 1054.

In another embodiment, the NOT gate 1054 receives the comparison signal 1053 and generates a signal 1055. For example, if the comparison signal 1053 is at a logic high level, the signal 1055 is at a logic low level. In another example, if the comparison signal 1053 is at a logic low level, the signal 1055 is at a logic high level. In yet another example, the signal 1055 is received by the NAND gate 1056.

In yet another embodiment, the NAND gate 1056 receives the signal 1055 and the mode control signal 1061 and generates a signal 1057 (e.g., a pulse-width-modulation signal). For example, if the mode control signal 1061 is at a logic low level, the signal 1057 is at a logic high level. In another example, if the mode control signal 1061 is at a logic high level, the signal 1057 is the logical complement of the signal 1055 and is the same as the comparison signal 1053. In yet another example, the signal 1057 is received by the AND gate 1058 and the logic controller 1020.

In yet another embodiment, the AND gate 1058 receives the signal 1057 and the valley-voltage control signal 1099 and generates a signal 1059. For example, if the mode control signal 1061 is at a logic low level, the signal 1059 is the same as the valley-voltage control signal 1099. In another example, if the mode control signal 1061 is at a logic high level, the signal 1059 is determined by AND operation performed on the comparison signal 1053 and the valley-voltage control signal 1099. In yet another example, the signal 1059 is received by a set terminal of the SR flip-flop 1022.

In one embodiment, the SR flip-flop 1022 receives the peak-voltage control signal 1097 and the signal 1059, generates a modulation signal 1023, and outputs the modulation signal 1023 to the logic controller 1020, which also receives the signal 1057. For example, the logic controller 1020 generates logic signals 1031 and 1035 based at least in part on the modulation signal 1023 and/or the signal 1057. In another example, the logic signal 1031 is received by the driver 1030, which in response outputs a drive signal 1033 to turn on or off the transistor 1040. In yet another example, the logic signal 1035 is received by the driver 1034, which in response outputs a drive signal 1037 to turn on or off the transistor 1044.

In another embodiment, if the signal 1057 is at a logic low level, the logic controller 1020 generates, regardless of the modulation signal 1023, the logic signals 1031 and 1035 in order to turn off the transistors 1040 and 1044. For example, if the signal 1057 is at the logic low level, the logic controller 1020 generates, regardless of the modulation signal 1023, the logic signal 1031 so that the driver 1030 generates the drive signal 1033 at the logic high level to turn off the transistor 1040. In another example, if the signal 1057 is at the logic low level, the logic controller 1020 generates, regardless of the modulation signal 1023, the logic signal 1035 so that the driver 1034 generates the drive signal 1037 at the logic low level to turn off the transistor 1044.

In another embodiment, if the signal 1057 is at a logic high level, when the transistor 1040 becomes turned off, then after a predetermined dead-time period, the transistor 1044 becomes turned on (e.g., becomes turned on to allow freewheeling of the inductor 1050). For example, if the signal 1057 is at the logic high level, the predetermined dead-time period after the driver 1030 generates the drive signal 1033 at a logic high level to turn off the transistor 1040 (e.g., a PMOS transistor), the driver 1034 generates the drive signal 1037 at the logic high level to turn on the transistor 1044 (e.g., an NMOS transistor). In yet another embodiment, if the signal 1057 is at the logic high level, when the transistor 1044 becomes turned off, then after another predetermined dead-time period, the transistor 1040 becomes turned on (e.g., becomes turned on to supply energy to the output). For example, if the signal 1057 is at the logic high level, the another predetermined dead-time period after the driver 1034 generates the drive signal 1037 at a logic low level to turn off the transistor 1044 (e.g., an NMOS transistor), the driver 1030 generates the drive signal 1033 at the logic low level to turn on the transistor 1040 (e.g., a PMOS transistor). In another example, the predetermined dead-time period is equal to the another predetermined dead-time period in magnitude. In yet another example, the predetermined dead-time period is not equal to the another predetermined dead-time period in magnitude.

According to one embodiment, the transistors 1040 and 1044 affect a current 1051 that flows through the inductor 1050. For example, when the transistor 1040 is turned on and the transistor 1044 is turned off, the current 1051 is equal to the current that flows through the transistor 1040, and the magnitude of the current 1051 is represented by the current-sensing voltage 1091. In another example, when the transistor 1040 is turned off and the transistor 1044 is turned on, the current 1051 is equal to the current that flows through the transistor 1044, and the magnitude of the current 1051 is represented by the current-sensing voltage 1095. In yet another example, when the transistor 1040 is turned off and the transistor 1044 is turned off, the current 1051 is equal to zero in magnitude.

According to another embodiment, if the current 1051 is equal to the current that flows through the transistor 1040 and if the current-sensing voltage 1091 is larger than or equal to the peak-voltage threshold (e.g., $V_{th\_pe}$), the current 1051 is larger than or equal to the peak-current threshold (e.g., $I_{th\_pe}$). According to yet another embodiment, if the current 1051 is equal to the current that flows through the transistor 1044 and if the current-sensing voltage 1095 is smaller than or equal to the valley-voltage threshold (e.g., $V_{th\_va}$), the current 1051 is smaller than or equal to the valley-current threshold (e.g., $I_{th\_va}$).

According to yet another embodiment, the transistor 1040 (e.g., a power transistor) is a PMOS transistor, and the transistor 1044 (e.g., a power transistor) is an NMOS transistor. For example, the gate terminal of the PMOS transistor 1040 is connected to the driver 1030, and the source terminal of the PMOS transistor 1040 receives the input voltage 1080. In another example, the gate terminal of the NMOS transistor 1044 is connected to the driver 1034, and the source terminal of the NMOS transistor 1044 is biased to the ground. In yet another example, the drain terminal of the PMOS transistor 1040 and the drain terminal of the NMOS transistor 1044 both are connected to one terminal of the inductor 1050. In yet another example, the other terminal of the inductor 1050 is connected to one terminal of the capacitor 1060, and the other terminal of the capacitor 1060 is grounded.

In one embodiment, if the output current 1088 becomes smaller, the output voltage 1082 and the feedback voltage 1084 become larger. For example, if the feedback voltage 1084 becomes larger, the result of the reference voltage 1086 minus the feedback voltage 1084 becomes smaller, causing both the peak-voltage threshold (e.g., $V_{th\_pe}$) and the valley-voltage threshold (e.g., $V_{th\_va}$) to also become smaller. In another example, if the valley-voltage threshold (e.g., $V_{th\_va}$) becomes equal to or smaller than the mode threshold (e.g., $V_{th\_mod}$), the mode control signal 1061 changes from the logic low level to the logic high level. In yet another example, after the mode control signal 1061 has changed to the logic high level, the power converter 1000 operates in discontinuous-conduction-mode (DCM).

In another embodiment, if the output current 1088 becomes larger, the output voltage 1082 and the feedback voltage 1084 become smaller. For example, if the feedback voltage 1084 becomes smaller, the result of the reference voltage 1086 minus the feedback voltage 1084 becomes larger, causing both the peak-voltage threshold (e.g., $V_{th\_pe}$) and the valley-voltage threshold (e.g., $V_{th\_va}$) to also become larger. In another example, if the valley-voltage threshold (e.g., $V_{th\_va}$) becomes larger than the mode threshold (e.g., $V_{th\_mod}$), the mode control signal 1061 changes from the logic high level to the logic low level. In yet another example, if the mode control signal 1061 is at the logic low level, the power converter 1000 operates in continuous-conduction-mode (CCM).

Figure 11:
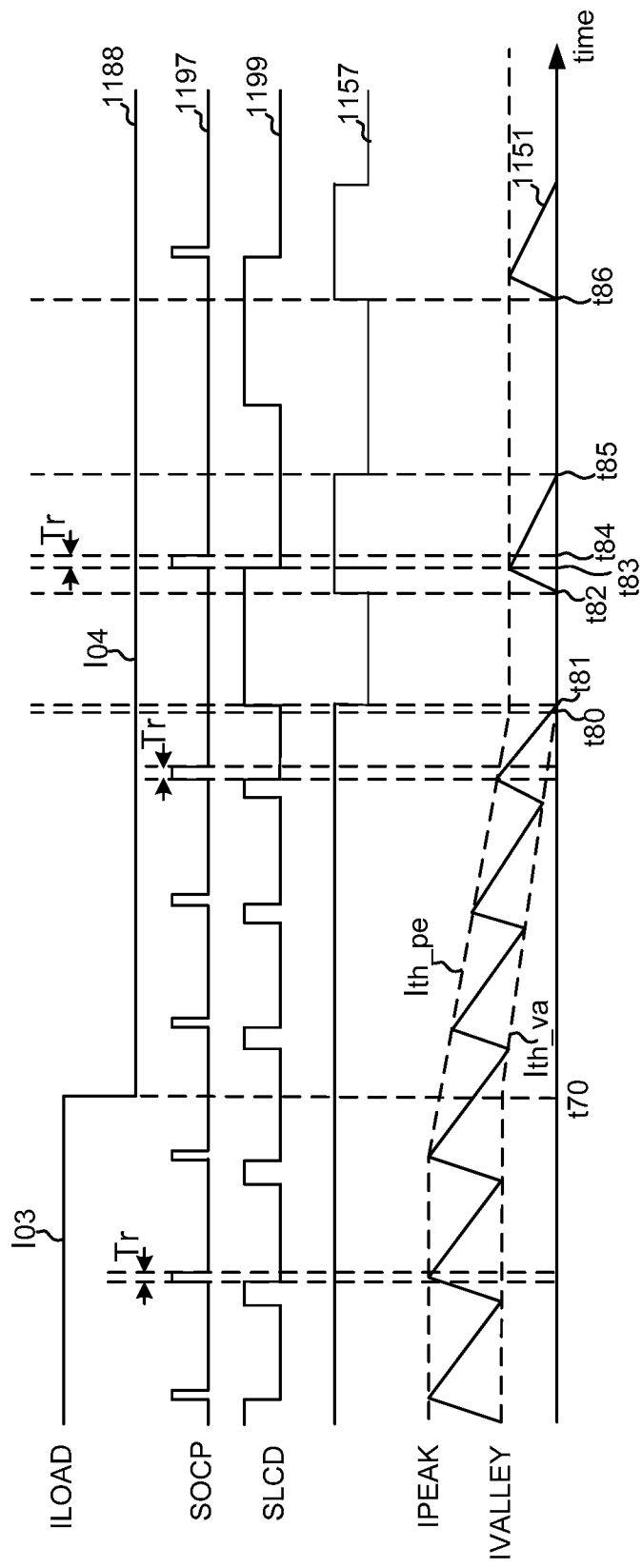
FIG. 11 is a simplified timing diagram for the power converter as shown in FIG. 10 according to an embodiment of the present invention.

FIG. 11 is a simplified timing diagram for the power converter 1000 according to an embodiment of the present invention. This diagram is merely an example, which should not unduly limit the scope of the claims. One of ordinary skill in the art would recognize many variations, alternatives, and modifications. The waveform 1188 represents the output current 1088 as a function of time, the waveform 1197 represents the peak-voltage control signal 1097 as a function of time, the waveform 1199 represents the valley-voltage control signal 1099 as a function of time, the waveform 1157 represents the signal 1057 as a function of time, and the waveform 1151 represents the current 1051 as a function of time.

In one embodiment, if the signal 1057 is at the logic high level, when the power transistor 1040 becomes turned off, then after a predetermined dead-time period, the power transistor 1044 becomes turned on. For example, the predetermined dead-time period is relatively short, so effect of the predetermined dead-time period is not shown in FIG. 11. In another embodiment, if the signal 1057 is at the logic high level, when the power transistor 1044 becomes turned off, then after another predetermined dead-time period, the power transistor 1040 becomes turned on. For example, the another predetermined dead-time period is relatively short, so effect of the another predetermined dead-time period is not shown in FIG. 11.

According to one embodiment, at time $t_{70}$, the output current 1088 drops from a high current magnitude (e.g., $I_{o3}$) to a low current magnitude (e.g., $I_{o4}$), and from time $t_{70}$ to time $t_{80}$, the output current remains at the low current magnitude (e.g., $I_{o4}$), as shown by the waveform 1188. For example, from time $t_{70}$ to time $t_{80}$, the input power of the power converter 1000 is larger than the output power of the power converter 1000, causing the output voltage 1082 to increase gradually and the feedback voltage 1084 to also increase gradually. In another example, from time $t_{70}$ to time $t_{80}$, in response to the feedback voltage 1084 increasing, the result of the reference voltage 1086 minus the feedback voltage 1084 becomes smaller, and the peak-voltage threshold (e.g., $V_{th\_pe}$) and the peak-current threshold (e.g., $I_{th\_pe}$) also become smaller, as shown by the waveform 1151. In yet another example, from time $t_{70}$ to time $t_{80}$, in response to the feedback voltage 1084 increasing, the result of the reference voltage 1086 minus the feedback voltage 1084 becomes smaller, and the valley-voltage threshold (e.g., $V_{th\_va}$) and the valley-current threshold (e.g., $I_{th\_va}$) also become smaller, as shown by the waveform 1151.

In yet another example, from time $t_{70}$ to time $t_{80}$, even though the valley-voltage threshold (e.g., $V_{th\_va}$) becomes smaller, the valley-voltage threshold (e.g., $V_{th\_va}$) still remains larger than the mode threshold (e.g., $V_{th\_mod}$), and the mode control signal 1061 remains at a logic low level. In yet another example, from time $t_{70}$ to time $t_{80}$, the mode control signal 1061 remains at the logic low level, and the signal 1057 remains at a logic high level as shown by the waveform 1157. In yet another example, from time $t_{70}$ to time $t_{80}$, the mode control signal 1061 remains at the logic low level, and the signal 1059 remains the same as the valley-voltage control signal 1099 as shown by the waveform 1199.

According to another embodiment, at time $t_{80}$, the valley-voltage threshold (e.g., $V_{th\_va}$) becomes equal to or smaller than the mode threshold (e.g., $V_{th\_mod}$), causing the mode control signal 1061 to change from the logic low level to a logic high level. For example, the mode threshold (e.g., $V_{th\_mod}$) is larger than zero. In another example, at time $t_{80}$, the mode control signal 1061 changes from the logic low level to the logic high level, and the signal 1057 becomes the same as the comparison signal 1053. In yet another example, at time $t_{80}$, the comparison signal 1053 is at a logic high level, and the signal 1057 remains at the logic high level as shown by the waveform 1157. In yet another example, at time $t_{80}$, the valley-voltage control signal 1099 is at a logic low level as shown by the waveform 1199, and the signal 1059 is also at a logic low level. In yet another example, at time $t_{80}$, the signal 1059 is at the logic low level, and the peak-voltage control signal 1097 is also at the logic low level as shown by the waveform 1197. In yet another example, at time $t_{80}$, the modulation signal 1023 is at the logic high level and the signal 1057 remains at the logic high level. In yet another example, at time $t_{80}$, the transistor 1040 is turned off and the transistor 1044 is turned on.

According to yet another embodiment, from time $t_{80}$ to time $t_{86}$, the mode control signal 1061 remains at the logic high level, and the signal 1057 remains to be the same as the comparison signal 1053. For example, from time $t_{80}$ to time $t_{86}$, the signal 1059 is determined by AND operation performed on the signal 1057 and the valley-voltage control signal 1099 as shown by the waveforms 1157 and 1199. In another example, from time $t_{80}$ to time $t_{86}$, the mode control signal 1061 remains at the logic high level, and the signal 1059 is determined by AND operation performed on the comparison signal 1053 and the valley-voltage control signal 1099. In yet another example, from time $t_{80}$ to time $t_{86}$, the output current 1088 remains at the low current magnitude (e.g., $I_{o4}$), as shown by the waveform 1188.

In one embodiment, from time $t_{80}$ to time $t_{81}$, the mode control signal 1061 remains at the logic high level, the comparison signal 1053 remains at the logic high level, and the signal 1057 also remains at the logic high level as shown by the waveform 1157. For example, from time $t_{80}$ to time $t_{81}$, the valley-voltage control signal 1099 remains at the logic low level as shown by the waveform 1199, and the signal 1059 also remains at the logic low level. In another example, from time $t_{80}$ to time $t_{81}$, the signal 1059 remains at the logic low level, and the peak-voltage control signal 1097 also remains at the logic low level as shown by the waveform 1197. In yet another example, from time $t_{80}$ to time $t_{81}$, the modulation signal 1023 remains at the logic high level and the signal 1057 also remains at the logic high level. In yet another example, from time $t_{80}$ to time $t_{81}$, the transistor 1040 remains turned off and the transistor 1044 remains turned on. In yet another example, as shown in FIG. 11, from time $t_{80}$ to time $t_{81}$, the current 1051 decreases (e.g., decreases gradually and/or linearly) to zero as shown by the waveform 1151.

In one embodiment, at time $t_{81}$, the current 1051 becomes equal to or smaller than the valley-current threshold (e.g., $I_{th\_va}$) as shown by the waveform 1151, causing the valley-voltage control signal 1099 to change from the logic low level to the logic high level as shown by the waveform 1199. For example, as shown in FIG. 11, at time $t_{81}$, the valley-voltage threshold (e.g., $V_{th\_va}$) is equal to zero, the valley-current threshold (e.g., $I_{th\_va}$) is equal to zero, and the current 1051 is also equal to zero in magnitude as shown by the waveform 1151.

For example, at time $t_{81}$, the valley-voltage threshold (e.g., $V_{th\_va}$) is larger than zero, and the valley-current threshold (e.g., $I_{th\_va}$) is also larger than zero. In another example, at time $t_{81}$, the mode control signal 1061 is at the logic high level, the comparison signal 1053 changes from the logic high level to the logic low level, the signal 1057 also changes from the logic high level to the logic low level as shown by the waveform 1157, and the signal 1059 remains at the logic low level. In yet another example, at time $t_{81}$, the signal 1059 remains at the logic low level, and the peak-voltage control signal 1097 is also at the logic low level as shown by the waveform 1197. In yet another example, at time $t_{81}$, the signal 1057 changes from the logic high level to the logic low level as shown by the waveform 1157, and both the transistors 1040 and 1044 are turned off.

In another embodiment, from time $t_{81}$ to time $t_{82}$, the mode control signal 1061 remains at the logic high level, the comparison signal 1053 remains at the logic low level, the signal 1057 remains at the logic low level as shown by the waveform 1157, and the signal 1059 also remains at the logic low level. For example, from time $t_{81}$ to time $t_{82}$, the valley-voltage control signal 1099 remains at the logic high level as shown by the waveform 1199. In another example, from time $t_{58}$ to time $t_{82}$, the signal 1059 remains at the logic low level, and the peak-voltage control signal 1097 also remains at the logic low level as shown by the waveform 1197. In yet another example, from time $t_{81}$ to time $t_{82}$, the signal 1057 remains at the logic low level as shown by the waveform 1157, and both the transistors 1040 and 1044 remain turned off. In yet another example, as shown in FIG. 11, from time $t_{81}$ to time $t_{82}$, the valley-voltage threshold (e.g., $V_{th\_va}$) remains equal to zero, the valley-current threshold (e.g., $I_{th\_va}$) remains equal to zero, and the current 1051 also remains equal to zero in magnitude as shown by the waveform 1151.

In yet another embodiment, at time $t_{82}$, the mode control signal 1061 is at the logic high level and the valley-voltage control signal 1099 is at the logic high level as shown by the waveform 1199, but the comparison signal 1053 changes from the logic low level to the logic high level and the signal 1057 also changes from the logic low level to the logic high level as shown by the waveform 1157, causing the signal 1059 to change from the logic low level to a logic high level. For example, at time $t_{82}$, the peak-voltage control signal 1097 is at the logic low level as shown by the waveform 1197. In another example, at time $t_{82}$, the modulation signal 1023 changes from the logic high level to the logic low level, and the signal 1057 changes from the logic low level to the logic high level as shown by the waveform 1157. In yet another example, at time $t_{82}$, the transistor 1044 is turned off and the transistor 1040 is turned on. In yet another example, at time $t_{82}$, the current 1051 is equal to zero in magnitude as shown by the waveform 1151.

In yet another embodiment, from time $t_{82}$ to time $t_{83}$, the mode control signal 1061 remains at the logic high level, the valley-voltage control signal 1099 remains at the logic high level as shown by the waveform 1199, the comparison signal 1053 remains at the logic high level, the signal 1057 remains at the logic high level as shown by the waveform 1157, and the signal 1059 remains at the logic high level. For example, from time $t_{82}$ to time $t_{83}$, the peak-voltage control signal 1097 remains at the logic low level as shown by the waveform 1197. In another example, from time $t_{82}$ to time $t_{83}$, the modulation signal 1023 remains at the logic low level, and the signal 1057 remains at the logic high level as shown by the waveform 1157. In yet another example, from time $t_{82}$ to time $t_{83}$, the transistor 1040 remains turned on and the transistor 1044 remains turned off. In yet another example, from time $t_{82}$ to time $t_{83}$, the current 1051 increases (e.g., increases gradually and/or linearly) as shown by the waveform 1151.

According to one embodiment, at time $t_{83}$, the current 1051 becomes equal to or larger than the peak-current threshold (e.g., $I_{th\_pe}$) as shown by the waveform 1151, causing the peak-voltage control signal 1097 to change from the logic low level to the logic high level as shown by the waveform 1197 and the valley-voltage control signal 1099 to change from the logic high level to the logic low level as shown by the waveform 1199. For example, at time $t_{83}$, the valley-voltage control signal 1099 changes from the logic high level to the logic low level as shown by the waveform 1199, and the signal 1059 changes from the logic high level to the logic low level. In another example, at time $t_{83}$, the modulation signal 1023 changes from the logic low level to the logic high level. In yet another example, at time $t_{83}$, the mode control signal 1061 remains at the logic high level, the comparison signal 1053 remains at the logic high level, and the signal 1057 remains at the logic high level as shown by the waveform 1157. In yet another example, at time $t_{83}$, the transistor 1040 becomes turned off and the transistor 1044 becomes turned on.

According to another embodiment, from time $t_{83}$ to time $t_{84}$, the peak-voltage control signal 1097 remains at the logic high level as shown by the waveform 1197 and the valley-voltage control signal 1099 remains at the logic low level as shown by the waveform 1199. For example, from time $t_{83}$ to time $t_{84}$, the valley-voltage control signal 1099 remains at the logic low level as shown by the waveform 1199, and the signal 1059 remains at the logic low level. In another example, from time $t_{83}$ to time $t_{84}$, the modulation signal 1023 remains at the logic high level. In yet another example, from time $t_{83}$ to time $t_{84}$, the mode control signal 1061 remains at the logic high level, the comparison signal 1053 remains at the logic high level, and the signal 1057 remains at the logic high level as shown by the waveform 1157. In yet another example, from time $t_{83}$ to time $t_{84}$, the transistor 1040 remains turned off and the transistor 1044 remains turned on. In yet another example, from time $t_{83}$ to time $t_{84}$, the current 1051 decreases (e.g., decreases gradually and/or linearly) as shown by the waveform 1151. In yet another example, the time duration from time $t_{83}$ to time $t_{84}$ is equal to a predetermined period of time (e.g., $T_r$) in magnitude to form a signal pulse with a predetermined pulse width (e.g., $T_r$) for the peak-voltage control signal 1097 as shown by the waveform 1197.

According to another embodiment, at time $t_{84}$, the peak-voltage control signal 1097 changes from the logic high level to the logic low level as shown by the waveform 1197, and the valley-voltage control signal 1099 is at the logic low level as shown by the waveform 1199. For example, at time $t_{84}$, the valley-voltage control signal 1099 is at the logic low level as shown by the waveform 1199, and the signal 1059 is at the logic low level. In another example, at time $t_{84}$, the modulation signal 1023 remains at the logic high level. In yet another example, at time $t_{84}$, the mode control signal 1061 remains at the logic high level, the comparison signal 1053 remains at the logic high level, and the signal 1057 remains at the logic high level as shown by the waveform 1157. In yet another example, at time $t_{84}$, the transistor 1040 remains turned off and the transistor 1044 remains turned on.

According to yet another embodiment, from time $t_{84}$ to time $t_{85}$, the peak-voltage control signal 1097 remains at the logic low level as shown by the waveform 1197, and the valley-voltage control signal 1099 remains at the logic low level as shown by the waveform 1199. For example, from time $t_{84}$ to time $t_{85}$, the valley-voltage control signal 1099 remains at the logic low level as shown by the waveform 1199, and the signal 1059 remains at the logic low level. In another example, from time $t_{84}$ to time $t_{85}$, the modulation signal 1023 remains at the logic high level. In yet another example, from time $t_{84}$ to time $t_{85}$, the mode control signal 1061 remains at the logic high level, the comparison signal 1053 remains at the logic high level, and the signal 1057 remains at the logic high level as shown by the waveform 1157. In yet another example, from time $t_{84}$ to time $t_{85}$, the transistor 1040 remains turned off and the transistor 1044 remains turned on. In yet another example, from time $t_{84}$ to time $t_{85}$, the current 1051 decreases (e.g., decreases gradually and/or linearly) as shown by the waveform 1151.

In one embodiment, at time $t_{85}$, the current 1051 becomes equal to or smaller than the valley-current threshold (e.g., $I_{th\_va}$) as shown by the waveform 1151, causing the valley-voltage control signal 1099 to change from the logic low level to the logic high level as shown by the waveform 1199. For example, at time $t_{85}$, the valley-current threshold (e.g., $I_{th\_va}$) is equal to zero, and the current 1051 is also equal to zero as shown by the waveform 1151. In another example, at time $t_{85}$, the mode control signal 1061 is at the logic high level, the comparison signal 1053 changes from the logic high level to the logic low level, the signal 1057 also changes from the logic high level to the logic low level as shown by the waveform 1157, and the signal 1059 is also at the logic low level. In yet another example, at time $t_{85}$, the signal 1059 is at the logic low level, and the peak-voltage control signal 1097 is also at the logic low level as shown by the waveform 1197. In yet another example, at time $t_{85}$, the signal 1057 changes from the logic high level to the logic low level as shown by the waveform 1157, and both the transistors 1040 and 1044 are turned off.

In another embodiment, from time $t_{85}$ to time $t_{86}$, the mode control signal 1061 remains at the logic high level, the comparison signal 1053 remains at the logic low level, the signal 1057 remains at the logic low level as shown by the waveform 1157, and the signal 1059 also remains at the logic low level. For example, from time $t_{85}$ to time $t_{86}$, the valley-voltage control signal 1099 remains at the logic high level as shown by the waveform 1199. In another example, from time $t_{85}$ to time $t_{86}$, the signal 1059 remains at the logic low level, and the peak-voltage control signal 1097 also remains at the logic low level as shown by the waveform 1197. In yet another example, from time $t_{85}$ to time $t_{86}$, the signal 1057 remains at the logic low level as shown by the waveform 1157, and both the transistors 1040 and 1044 remain turned off. In yet another example, from time $t_{85}$ to time $t_{86}$, the current 1051 remains at zero in magnitude as shown by the waveform 1151.

In yet another embodiment, at time $t_{86}$, the mode control signal 1061 is at the logic high level and the valley-voltage control signal 1099 is at the logic high level as shown by the waveform 1199, but the comparison signal 1053 changes from the logic low level to the logic high level and the signal 1057 also changes from the logic low level to the logic high level as shown by the waveform 1157, causing the signal 1059 to change from the logic low level to the logic high level. For example, at time $t_{86}$, the peak-voltage control signal 1097 is at the logic low level as shown by the waveform 1197. In another example, at time $t_{86}$, the modulation signal 1023 changes from the logic high level to the logic low level, and the signal 1057 also changes from the logic low level to the logic high level as shown by the waveform 1157. In yet another example, at time $t_{86}$, the transistor 1044 is turned off and the transistor 1040 is turned on.

As shown in FIG. 11, the power converter 1000 operates in continuous-conduction-mode (CCM) until time $t_{80}$, and starts operating in discontinuous-conduction-mode (DCM) at time $t_{82}$ according to certain embodiments. For example, starting at time $t_{82}$, the power converter 1000 operates in discontinuous-conduction-mode (DCM) with a switching period equal to a time duration from time $t_{82}$ and time $t_{85}$.

As shown in FIGS. 10 and 11, the power converter 1000 (e.g., a buck converter) is a hysteresis converter according to some embodiments. For example, as shown by the waveform 1151, the current 1051 changes between the peak-current threshold (e.g., $I_{th\_pe}$) and the valley-current threshold (e.g., $I_{th\_va}$). In another example, the difference between the peak-current threshold (e.g., $I_{th\_pe}$) and the valley-current threshold (e.g., $I_{th\_va}$) forms a hysteresis window for current.

According to certain embodiments, as shown in FIG. 9, starting at time $t_{52}$, the power converter 800 operates in discontinuous-conduction-mode (DCM). According to some embodiments, as shown in FIG. 11, starting at time $t_{82}$, the power converter 1000 operates in discontinuous-conduction-mode (DCM). For example, when operating in discontinuous-conduction-mode (DCM), the peak-current threshold (e.g., $I_{th\_pe}$) of the power converter 1000 is smaller than the peak-current threshold (e.g., $I_{th\_pe}$) of the power converter 800. In another example, when operating in discontinuous-conduction-mode (DCM), the power converter 1000 has smaller output ripples than the power converter 800.

Certain embodiments of the present invention provide a buck converter including a peak-current controller and a valley-current controller, where the valley-current controller adjusts a valley-voltage threshold in response to a change in a feedback voltage with a constant reference voltage in order to achieve the input and output power balance. Some embodiments of the present invention provide a buck converter including a peak-current controller and a valley-current controller, where the peak-current controller adjusts a peak-voltage threshold in response to a change in a feedback voltage with a constant reference voltage and the valley-current controller adjusts a valley-voltage threshold in response to the change in the feedback voltage with the constant reference voltage, in order to achieve the input and output power balance.

Certain embodiments of the present invention provide a buck converter that possesses better stability and stronger anti-noise capability than a conventional hysteresis-mode buck converter. Some embodiments of the present invention provide a buck converter that can adjust the switching frequency automatically according to the output power and can achieve higher efficiency at light loads than a conventional current-mode buck converter and/or a conventional voltage-mode buck converter.

According to another embodiment, a system controller (e.g., the chip 602) for a power converter (e.g., the power converter 600) includes a first current controller (e.g., the peak-current controller 696) configured to receive a first input signal (e.g., the current-sensing voltage 691) and generate a first output signal (e.g., the peak-voltage control signal 697) based at least in part on the first input signal, a second current controller (e.g., the valley-current controller 698) configured to receive a compensation signal (e.g., the compensation voltage 611) and a second input signal (e.g., the current-sensing voltage 695) and generate a second output signal (e.g., the valley-voltage control signal 699) based at least in part on the second input signal, and a drive signal generator (e.g., the combination of the logic controller 620, the SR flip-flop 622, and the drivers 630 and 634) configured to receive the first output signal and the second output signal, generate a first drive signal (e.g., the drive signal 633) based at least in part on the first output signal and the second output signal, and generate a second drive signal (e.g., the drive signal 637) based at least in part on the first output signal and the second output signal. The first current controller (e.g., the peak-current controller 696) is configured to, in response to the first input signal (e.g., the current-sensing voltage 691) becoming equal to or larger than a first threshold (e.g., the peak-voltage threshold $V_{th\_pe}$), change the first output signal (e.g., the peak-voltage control signal 697) from a first logic level to a second logic level, and the second current controller (e.g., the valley-current controller 698) is configured to, in response to the second input signal (e.g., the current-sensing voltage 695) becoming equal to or smaller than a second threshold (e.g., the valley-voltage threshold $V_{th\_va}$), change the second output signal (e.g., the valley-voltage control signal 699) from the first logic level to the second logic level. The drive signal generator (e.g., a combination of the logic controller 620, the SR flip-flop 622, and the drivers 630 and 634) is configured to: in response to the first output signal (e.g., the peak-voltage control signal 697) being at the first logic level and the second output signal (e.g., the valley-voltage control signal 699) being at the second logic level, generate, with or without a first delay, the first drive signal (e.g., the drive signal 633) at a third logic level; and in response to the first output signal (e.g., the peak-voltage control signal 697) being at the second logic level and the second output signal (e.g., the valley-voltage control signal 699) being at the first logic level, generate, with or without a second delay, the first drive signal (e.g., the drive signal 633) at a fourth logic level, the fourth logic level being different from the third logic level. The second current controller (e.g., the valley-current controller 698) is further configured to, under a continuous-conduction-mode, in response to the compensation signal increasing in magnitude, increase the second threshold (e.g., the valley-voltage threshold $V_{th\_va}$) in magnitude; and in response to the compensation signal decreasing in magnitude, decrease the second threshold (e.g., the valley-voltage threshold $V_{th\_va}$) in magnitude. For example, the system controller (e.g., the chip 602) is implemented according to at least FIG. 6.

In another example, the first current controller (e.g., the peak-current controller 696) is configured to, in response to the first input signal (e.g., the current-sensing voltage 691) becoming equal to or larger than the first threshold (e.g., the peak-voltage threshold $V_{th\_pe}$), change the first output signal (e.g., the peak-voltage control signal 697) from the first logic level to the second logic level; keep the first output signal (e.g., the peak-voltage control signal 697) at the second logic level for a predetermined period of time (e.g., the predetermined period of time $T_p$); and change the first output signal (e.g., the peak-voltage control signal 697) from the second logic level back to the first logic level.

In yet another example, the second current controller (e.g., the valley-current controller 698) is further configured to receive the first output signal (e.g., the peak-voltage control signal 697). In yet another example, the second current controller (e.g., the valley-current controller 698) is further configured to: in response to the second input signal (e.g., the current-sensing voltage 695) becoming equal to or smaller than the second threshold (e.g., the valley-voltage threshold $V_{th\_va}$), change the second output signal (e.g., the valley-voltage control signal 699) from the first logic level to the second logic level; and in response to the first output signal (e.g., the peak-voltage control signal 697) changing from the first logic level to the second logic level, change the second output signal (e.g., the valley-voltage control signal 699) from the second logic level back to the first logic level.

In yet another example, the drive signal generator (e.g., the combination of the logic controller 620, the SR flip-flop 622, and the drivers 630 and 634) is further configured to: output the first drive signal (e.g., the drive signal 633) to a first transistor (e.g., the transistor 640) including a first transistor terminal; and output the second drive signal (e.g., the drive signal 637) to a second transistor (e.g., the transistor 644) including a second transistor terminal connected to the first transistor terminal. The first transistor terminal and the second transistor terminal are connected to a first inductor terminal of an inductor (e.g., the inductor 650), and the inductor (e.g., the inductor 650) includes a second inductor terminal associated with a terminal voltage (e.g., the output voltage 682). In yet another example, the system controller further includes: an error amplifier (e.g., the error amplifier 610) configured to receive a reference voltage (e.g., the reference voltage 686) and a feedback voltage (e.g., the feedback voltage 684), the feedback voltage being proportional to the terminal voltage (e.g., the output voltage 682); and a compensation network (e.g., the compensation network 612). The error amplifier (e.g., the error amplifier 610) is further configured to, together with the compensation network (e.g., the compensation network 612), generate the compensation signal (e.g., the compensation voltage 611) based at least in part on the reference voltage (e.g., the reference voltage 686) and the feedback voltage (e.g., the feedback voltage 684). In yet another example, the first input signal (e.g., the current-sensing voltage 691) represents a magnitude of a first transistor current flowing through the first transistor (e.g., the transistor 640), and the second input signal (e.g., the current-sensing voltage 695) represents a magnitude of a second transistor current flowing through the second transistor (e.g., the transistor 644).

In yet another example, the drive signal generator includes: a flip-flop (e.g., the SR flip-flop 622) configured to receive the first output signal and the second output signal and generate a modulation signal (e.g., the modulation signal 623) based at least in part on the first output signal and the second output signal; a logic controller (e.g., the logic controller 620) configured to receive the modulation signal (e.g., the modulation signal 623) and generate a first logic signal (e.g., the logic signal 631) and a second logic signal (e.g., the logic signal 635) based at least in part on the modulation signal; a first driver (e.g., the driver 630) configured to receive the first logic signal (e.g., the logic signal 631) and generate the first drive signal (e.g., the drive signal 633) based at least in part on the first logic signal (e.g., the logic signal 631); and a second driver (e.g., the driver 634) configured to receive the second logic signal (e.g., the logic signal 635) and generate the second drive signal (e.g., the drive signal 637) based at least in part on the second logic signal (e.g., the logic signal 635).

In yet another example, the first logic level is a logic low level, and the second logic level is a logic high level. In yet another example, the third logic level is the logic low level, and the fourth logic level is the logic high level. In yet another example, the drive signal generator (e.g., the combination of the logic controller 620, the SR flip-flop 622, and the drivers 630 and 634) is further configured to, in response to the first output signal (e.g., the peak-voltage control signal 697) being at the first logic level and the second output signal (e.g., the valley-voltage control signal 699) changing from the first logic level to the second logic level, change, with or without the first delay, the first drive signal (e.g., the drive signal 633) from the fourth logic level to the third logic level; and change, with or without a third delay, the second drive signal (e.g., the drive signal 637) from the fourth logic level to the third logic level. In yet another example, the drive signal generator (e.g., the combination of the logic controller 620, the SR flip-flop 622, and the drivers 630 and 634) is further configured to, in response to the first output signal (e.g., the peak-voltage control signal 697) being at the first logic level and the second output signal (e.g., the valley-voltage control signal 699) changing from the first logic level to the second logic level, change, with the first delay, the first drive signal (e.g., the drive signal 633) from the fourth logic level to the third logic level; and change, without the third delay, the second drive signal (e.g., the drive signal 637) from the fourth logic level to the third logic level.

In yet another example, the drive signal generator (e.g., the combination of the logic controller 620, the SR flip-flop 622, and the drivers 630 and 634) is further configured to, in response to the first output signal (e.g., the peak-voltage control signal 697) changing from the first logic level to the second logic level and the second output signal (e.g., the valley-voltage control signal 699) changing from the second logic level to the first logic level, changing, with or without the second delay, the first drive signal (e.g., the drive signal 633) from the third logic level to the fourth logic level; and changing, with or without a third delay, the second drive signal (e.g., the drive signal 637) from the third logic level to the fourth logic level. In yet another example, the drive signal generator (e.g., the combination of the logic controller 620, the SR flip-flop 622, and the drivers 630 and 634) is further configured to, in response to the first output signal (e.g., the peak-voltage control signal 697) changing from the first logic level to the second logic level and the second output signal (e.g., the valley-voltage control signal 699) changing from the second logic level to the first logic level, changing, without the second delay, the first drive signal (e.g., the drive signal 633) from the third logic level to the fourth logic level; and changing, with the third delay, the second drive signal (e.g., the drive signal 637) from the third logic level to the fourth logic level.

According to yet another embodiment, a system controller (e.g., the chip 802) for a power converter (e.g., the power converter 800) includes a first current controller (e.g., the peak-current controller 896) configured to receive a first input signal (e.g., the current-sensing voltage 891) and generate a first output signal (e.g., the peak-voltage control signal 897) based at least in part on the first input signal, and a second current controller (e.g., the valley-current controller 898) configured to receive a second input signal (e.g., the current-sensing voltage 895), generate a second output signal (e.g., the valley-voltage control signal 899) based at least in part on the second input signal, and generate a third output signal (e.g., the mode control signal 861). Additionally, the system controller (e.g., the chip 802) further includes an output signal generator (e.g., a combination of the NAND gate 856 and the AND gate 858) configured to receive a third input signal (e.g., the signal 855), the third output signal (e.g., the mode control signal 861) and the second output signal (e.g., the valley-voltage control signal 899), and generate a fourth output signal (e.g., the signal 859) based at least in part on the third input signal (e.g., the signal 855), the third output signal (e.g., the mode control signal 861) and the second output signal (e.g., the valley-voltage control signal 899), and a drive signal generator (e.g., a combination of the logic controller 820, the SR flip-flop 822, and the drivers 830 and 834) configured to receive the first output signal (e.g., the peak-voltage control signal 897) and the fourth output signal (e.g., the signal 859), generate a first drive signal (e.g., the drive signal 833) based at least in part on the first output signal and the fourth output signal, and generate a second drive signal (e.g., the drive signal 837) based at least in part on the first output signal and the fourth output signal. The first current controller (e.g., the peak-current controller 896) is configured to, in response to the first input signal (e.g., the current-sensing voltage 891) becoming equal to or larger than a first threshold (e.g., the peak-voltage threshold $V_{th\_pe}$), change the first output signal (e.g., the peak-voltage control signal 897) from a first logic level to a second logic level, and the second current controller (e.g., the valley-current controller 898) is configured to, in response to the second input signal (e.g., the current-sensing voltage 895) becoming equal to or smaller than a second threshold (e.g., the valley-voltage threshold $V_{th\_va}$), change the second output signal (e.g., the valley-voltage control signal 899) from the first logic level to the second logic level. The drive signal generator (e.g., the combination of the logic controller 820, the SR flip-flop 822, and the drivers 830 and 834) is configured to: in response to the first output signal (e.g., the peak-voltage control signal 897) being at the first logic level and the fourth output signal (e.g., the signal 859) being at the second logic level, generate, with or without a first delay, the first drive signal (e.g., the drive signal 833) at a third logic level; and in response to the first output signal (e.g., the peak-voltage control signal 897) being at the second logic level and the fourth output signal (e.g., the signal 859) being at the first logic level, generate, with or without a second delay, the first drive signal (e.g., the drive signal 833) at a fourth logic level, the fourth logic level being different from the third logic level. The second current controller (e.g., the valley-current controller 898) is further configured to, in response to the second threshold (e.g., the valley-voltage threshold $V_{th\_va}$) being larger than a predetermined threshold (e.g., the mode threshold $V_{th\_mod}$), generate the third output signal (e.g., the mode control signal 861) at a fifth logic level; and in response to the second threshold (e.g., the valley-voltage threshold $V_{th\_va}$) being smaller than the predetermined threshold (e.g., the mode threshold $V_{th\_mod}$), generate the third output signal (e.g., the mode control signal 861) at a sixth logic level, the sixth logic level being different from the fifth logic level. For example, the system controller (e.g., the chip 802) is implemented according to at least FIG. 8.

In another example, the fifth logic level corresponds to a continuous-conduction-mode, and the sixth logic level corresponds to a discontinuous-conduction-mode. In yet another example, the fifth logic level is a logic low level; and the sixth logic level is a logic high level. In yet another example, the second current controller (e.g., the valley-current controller 898) is further configured to, under the continuous-conduction-mode, in response to the compensation signal increasing in magnitude, increase the second threshold (e.g., the valley-voltage threshold $V_{th\_va}$) in magnitude; and in response to the compensation signal decreasing in magnitude, decrease the second threshold (e.g., the valley-voltage threshold $V_{th\_va}$) in magnitude.

In yet another example, the output signal generator includes a NAND gate (e.g., the NAND gate 856) configured to receive the third input signal (e.g., the signal 855) and the third output signal (e.g., the mode control signal 861) and generate a gate signal (e.g., the signal 857) based at least in part on the third input signal (e.g., the signal 855) and the third output signal (e.g., the mode control signal 861), and an AND gate (e.g., the AND gate 858) configured to receive the gate signal (e.g., the signal 857) and the second output signal (e.g., the valley-voltage control signal 899) and generate the fourth output signal (e.g., the signal 859) based at least in part on the gate signal (e.g., the signal 857) and the second output signal (e.g., the valley-voltage control signal 899).

In yet another example, the first current controller (e.g., the peak-current controller 896) is configured to, in response to the first input signal (e.g., the current-sensing voltage 891) becoming equal to or larger than the first threshold (e.g., the peak-voltage threshold $V_{th\_pe}$), change the first output signal (e.g., the peak-voltage control signal 897) from the first logic level to the second logic level; keep the first output signal (e.g., the peak-voltage control signal 897) at the second logic level for a predetermined period of time (e.g., the predetermined period of time $T_q$); and change the first output signal (e.g., the peak-voltage control signal 897) from the second logic level back to the first logic level.

In yet another example, the second current controller (e.g., the valley-current controller 898) is further configured to receive the first output signal (e.g., the peak-voltage control signal 897). In yet another example, the second current controller (e.g., the valley-current controller 898) is further configured to: in response to the second input signal (e.g., the current-sensing voltage 895) becoming equal to or smaller than the second threshold (e.g., the valley-voltage threshold $V_{th\_va}$), change the second output signal (e.g., the valley-voltage control signal 899) from the first logic level to the second logic level; and in response to the first output signal (e.g., the peak-voltage control signal 897) changing from the first logic level to the second logic level, change the second output signal (e.g., the valley-voltage control signal 899) from the second logic level back to the first logic level.

In yet another example, the drive signal generator (e.g., the combination of the logic controller 820, the SR flip-flop 822, and the drivers 830 and 834) is further configured to: output the first drive signal (e.g., the drive signal 833) to a first transistor (e.g., the transistor 840) including a first transistor terminal; and output the second drive signal (e.g., the drive signal 837) to a second transistor (e.g., the transistor 844) including a second transistor terminal connected to the first transistor terminal. The first transistor terminal and the second transistor terminal are connected to a first inductor terminal of an inductor (e.g., the inductor 850), and the inductor (e.g., the inductor 850) includes a second inductor terminal associated with a terminal voltage (e.g., the output voltage 882). In yet another example, the system controller further includes an error amplifier (e.g., the error amplifier 810) configured to receive a reference voltage (e.g., the reference voltage 886) and a feedback voltage (e.g., the feedback voltage 884), the feedback voltage being proportional to the terminal voltage (e.g., the output voltage 882); and a compensation network (e.g., the compensation network 812). The error amplifier (e.g., the error amplifier 810) is further configured to, together with the compensation network (e.g., the compensation network 812), generate the compensation signal (e.g., the compensation voltage 811) based at least in part on the reference voltage (e.g., the reference voltage 886) and the feedback voltage (e.g., the feedback voltage 884). In yet another example, the system controller further includes a comparator (e.g., the comparator 852) configured to receive the reference voltage (e.g., the reference voltage 886) and the feedback voltage (e.g., the feedback voltage 884) and generate a comparison signal (e.g., the comparison signal 853) based at least in part on the reference voltage (e.g., the reference voltage 886) and the feedback voltage (e.g., the feedback voltage 884), and a NOT gate (e.g., the NOT gate 854) configured to receive the comparison signal (e.g., the comparison signal 853) and generate the third input signal (e.g., the signal 855) based at least in part on the comparison signal (e.g., the comparison signal 853). In yet another example, the system controller further includes the first input signal (e.g., the current-sensing voltage 891) represents a magnitude of a first transistor current flowing through the first transistor (e.g., the transistor 840), and the second input signal (e.g., the current-sensing voltage 895) represents a magnitude of a second transistor current flowing through the second transistor (e.g., the transistor 844).

In yet another example, the drive signal generator includes: a flip-flop (e.g., the SR flip-flop 822) configured to receive the first output signal (e.g., the peak-voltage control signal 897) and the fourth output signal (e.g., the signal 859) and generate a modulation signal (e.g., the modulation signal 823) based at least in part on the first output signal and the fourth output signal; a logic controller (e.g., the logic controller 820) configured to receive the modulation signal (e.g., the modulation signal 823) and generate a first logic signal (e.g., the logic signal 831) and a second logic signal (e.g., the logic signal 835) based at least in part on the modulation signal; a first driver (e.g., the driver 830) configured to receive the first logic signal (e.g., the logic signal 831) and generate the first drive signal (e.g., the drive signal 833) based at least in part on the first logic signal (e.g., the logic signal 831); and a second driver (e.g., the driver 834) configured to receive the second logic signal (e.g., the logic signal 835) and generate the second drive signal (e.g., the drive signal 837) based at least in part on the second logic signal (e.g., the logic signal 835).

In yet another example, the first logic level is a logic low level, and the second logic level is a logic high level. In yet another example, the third logic level is the logic low level, and the fourth logic level is the logic high level. In yet another example, the drive signal generator (e.g., the combination of the logic controller 820, the SR flip-flop 822, and the drivers 830 and 834) is further configured to, in response to the first output signal (e.g., the peak-voltage control signal 897) being at the first logic level and the fourth output signal (e.g., the signal 859) changing from the first logic level to the second logic level, change, with or without the first delay, the first drive signal (e.g., the drive signal 833) from the fourth logic level to the third logic level; and change, with or without a third delay, the second drive signal (e.g., the drive signal 837) from the fourth logic level to the third logic level. In yet another example, the drive signal generator (e.g., the combination of the logic controller 820, the SR flip-flop 822, and the drivers 830 and 834) is further configured to, in response to the first output signal (e.g., the peak-voltage control signal 897) being at the first logic level and the fourth output signal (e.g., the signal 859) changing from the first logic level to the second logic level, change, with the first delay, the first drive signal (e.g., the drive signal 833) from the fourth logic level to the third logic level; and change, without the third delay, the second drive signal (e.g., the drive signal 837) from the fourth logic level to the third logic level.

In yet another example, wherein the drive signal generator (e.g., the combination of the logic controller 820, the SR flip-flop 822, and the drivers 830 and 834) is further configured to, in response to the first output signal (e.g., the peak-voltage control signal 897) changing from the first logic level to the second logic level and the fourth output signal (e.g., the signal 859) changing from the second logic level to the first logic level, changing, with or without the second delay, the first drive signal (e.g., the drive signal 833) from the third logic level to the fourth logic level; and changing, with or without a third delay, the second drive signal (e.g., the drive signal 837) from the third logic level to the fourth logic level. In yet another example, the drive signal generator (e.g., the combination of the logic controller 820, the SR flip-flop 822, and the drivers 830 and 834) is further configured to, in response to the first output signal (e.g., the peak-voltage control signal 897) changing from the first logic level to the second logic level and the fourth output signal (e.g., the signal 859) changing from the second logic level to the first logic level, changing, without the second delay, the first drive signal (e.g., the drive signal 833) from the third logic level to the fourth logic level; and changing, with the third delay, the second drive signal (e.g., the drive signal 837) from the third logic level to the fourth logic level.

According to yet another embodiment, a system controller (e.g., the chip 1002) for a power converter (e.g., the power converter 1000) includes a first current controller (e.g., the peak-current controller 1096) configured to receive a compensation signal (e.g., the compensation voltage 1011) and a first input signal (e.g., the current-sensing voltage 1091) and generate a first output signal (e.g., the peak-voltage control signal 1097) based at least in part on the first input signal, a second current controller (e.g., the valley-current controller 1098) configured to receive a second input signal (e.g., the current-sensing voltage 1095), generate a second output signal (e.g., the valley-voltage control signal 1099) based at least in part on the second input signal, and a drive signal generator (e.g., a combination of the logic controller 1020, the SR flip-flop 1022, and the drivers 1030 and 1034) configured to receive the first output signal (e.g., the peak-voltage control signal 1097) and a third output signal (e.g., the signal 1059) related to the second output signal (e.g., the valley-voltage control signal 1099), generate a first drive signal (e.g., the drive signal 1033) based at least in part on the first output signal and the third output signal, and generate a second drive signal (e.g., the drive signal 1037)

based at least in part on the first output signal and the third output signal. The first current controller (e.g., the peak-current controller 1096) is configured to, in response to the first input signal (e.g., the current-sensing voltage 1091) becoming equal to or larger than a first threshold (e.g., the peak-voltage threshold $V_{th\_pe}$), change the first output signal (e.g., the peak-voltage control signal 1097) from a first logic level to a second logic level, and the second current controller (e.g., the valley-current controller 1098) is configured to, in response to the second input signal (e.g., the current-sensing voltage 1095) becoming equal to or smaller than a second threshold (e.g., the valley-voltage threshold $V_{th\_va}$), change the second output signal (e.g., the valley-voltage control signal 1099) from the first logic level to the second logic level. The drive signal generator (e.g., the combination of the logic controller 1020, the SR flip-flop 1022, and the drivers 1030 and 1034) is configured to: in response to the first output signal (e.g., the peak-voltage control signal 1097) being at the first logic level and the third output signal (e.g., the signal 1059) being at the second logic level, generate, with or without a first delay, the first drive signal (e.g., the drive signal 1033) at a third logic level; and in response to the first output signal (e.g., the peak-voltage control signal 1097) being at the second logic level and the third output signal (e.g., the signal 1059) being at the first logic level, generate, with or without a second delay, the first drive signal (e.g., the drive signal 1033) at a fourth logic level, the fourth logic level being different from the third logic level. The first current controller (e.g., the peak-current controller 1096) is further configured to, under a continuous-conduction-mode, in response to the compensation signal increasing in magnitude, increase the first threshold (e.g., the peak-voltage threshold $V_{th\_pe}$) in magnitude; and in response to the compensation signal decreasing in magnitude, decrease the first threshold (e.g., the peak-voltage threshold $V_{th\_pe}$) in magnitude. For example, the system controller (e.g., the chip 1002) is implemented according to at least FIG. 10.

In another example, the second current controller (e.g., the valley-current controller 1098) is further configured to receive the compensation signal (e.g., the compensation voltage 1011). In yet another example, the second current controller (e.g., the valley-current controller 1098) is further configured to, under the continuous-conduction-mode, in response to the second threshold (e.g., the valley-voltage threshold $V_{th\_va}$) being larger than a predetermined threshold (e.g., the mode threshold $V_{th\_mod}$), generate a fourth output signal (e.g., the mode control signal 1061) at a fifth logic level; and in response to the second threshold (e.g., the valley-voltage threshold $V_{th\_va}$) being smaller than the predetermined threshold (e.g., the mode threshold $V_{th\_mod}$), generate the fourth output signal (e.g., the mode control signal 1061) at a sixth logic level, the sixth logic level being different from the fifth logic level. In yet another example, the fifth logic level corresponds to the continuous-conduction-mode, and the sixth logic level corresponds to a discontinuous-conduction-mode. In yet another example, the fifth logic level is a logic low level, and the sixth logic level is a logic high level.

In yet another example, the second current controller (e.g., the valley-current controller 1098) is further configured to, under the continuous-conduction-mode, in response to the compensation signal increasing in magnitude, increase the second threshold (e.g., the valley-voltage threshold $V_{th\_va}$) in magnitude; and in response to the compensation signal decreasing in magnitude, decrease the second threshold (e.g., the valley-voltage threshold $V_{th\_va}$) in magnitude.

In yet another example, the first current controller (e.g., the peak-current controller 1096) and the second current controller (e.g., the valley-current controller 1098) are further configured to, under the continuous-conduction-mode, in response to the compensation signal increasing in magnitude, keep a result of the first threshold (e.g., the peak-voltage threshold $V_{th\_pe}$) minus the second threshold (e.g., the valley-voltage threshold $V_{th\_va}$) constant; and in response to the compensation signal decreasing in magnitude, keep the result of the first threshold (e.g., the peak-voltage threshold $V_{th\_pe}$) minus the second threshold (e.g., the valley-voltage threshold $V_{th\_va}$) constant. In yet another example, the first current controller (e.g., the peak-current controller 1096) and the second current controller (e.g., the valley-current controller 1098) are further configured to, under the continuous-conduction-mode, in response to the compensation signal increasing in magnitude, change a result of the first threshold (e.g., the peak-voltage threshold $V_{th\_pe}$) minus the second threshold (e.g., the valley-voltage threshold $V_{th\_va}$); and in response to the compensation signal decreasing in magnitude, change the result of the first threshold (e.g., the peak-voltage threshold $V_{th\_pe}$) minus the second threshold (e.g., the valley-voltage threshold $V_{th\_va}$).

In yet another example, the second current controller (e.g., the valley-current controller 1098) is configured to generate a fourth output signal (e.g., the mode control signal 1061). In yet another example, the system controller further includes an output signal generator (e.g., a combination of the NAND gate 1056 and the AND gate 1058) configured to receive a third input signal (e.g., the signal 1055), the fourth output signal (e.g., the mode control signal 1061) and the second output signal (e.g., the valley-voltage control signal 1099), and generate the third output signal (e.g., the signal 1059) based at least in part on the third input signal (e.g., the signal 1055), the fourth output signal (e.g., the mode control signal 1061) and the second output signal (e.g., the valley-voltage control signal 1099). In yet another example, the output signal generator includes a NAND gate (e.g., the NAND gate 1056) configured to receive the third input signal (e.g., the signal 1055) and the fourth output signal (e.g., the mode control signal 1061) and generate a gate signal (e.g., the signal 1057) based at least in part on the third input signal (e.g., the signal 1055) and the fourth output signal (e.g., the mode control signal 1061), and an AND gate (e.g., the AND gate 1058) configured to receive the gate signal (e.g., the signal 1057) and the second output signal (e.g., the valley-voltage control signal 1099) and generate the third output signal (e.g., the signal 1059) based at least in part on the gate signal (e.g., the signal 1057) and the second output signal (e.g., the valley-voltage control signal 1099).

In yet another example, the first current controller (e.g., the peak-current controller 1096) is configured to, in response to the first input signal (e.g., the current-sensing voltage 1091) becoming equal to or larger than the first threshold (e.g., the peak-voltage threshold $V_{th\_pe}$), change the first output signal (e.g., the peak-voltage control signal 1097) from the first logic level to the second logic level; keep the first output signal (e.g., the peak-voltage control signal 1097) at the second logic level for a predetermined period of time (e.g., the predetermined period of time $T_r$); and change the first output signal (e.g., the peak-voltage control signal 1097) from the second logic level back to the first logic level.

In yet another example, the second current controller (e.g., the valley-current controller 1098) is further configured to receive the first output signal (e.g., the peak-voltage control signal 1097). In yet another example, the second current controller (e.g., the valley-current controller 1098) is further configured to: in response to the second input signal (e.g., the current-sensing voltage 1095) becoming equal to or smaller than the second threshold (e.g., the valley-voltage threshold $V_{th\_va}$), change the second output signal (e.g., the valley-voltage control signal 1099) from the first logic level to the second logic level; and in response to the first output signal (e.g., the peak-voltage control signal 1097) changing from the first logic level to the second logic level, change the second output signal (e.g., the valley-voltage control signal 1099) from the second logic level back to the first logic level.

In yet another example, the drive signal generator (e.g., the combination of the logic controller 1020, the SR flip-flop 1022, and the drivers 1030 and 1034) is further configured to: output the first drive signal (e.g., the drive signal 1033) to a first transistor (e.g., the transistor 1040) including a first transistor terminal; and output the second drive signal (e.g., the drive signal 1037) to a second transistor (e.g., the transistor 1044) including a second transistor terminal connected to the first transistor terminal. The first transistor terminal and the second transistor terminal are connected to a first inductor terminal of an inductor (e.g., the inductor 1050), and the inductor (e.g., the inductor 1050) includes a second inductor terminal associated with a terminal voltage (e.g., the output voltage 1082). In yet another example, the system controller further includes an error amplifier (e.g., the error amplifier 1010) configured to receive a reference voltage (e.g., the reference voltage 1086) and a feedback voltage (e.g., the feedback voltage 1084), the feedback voltage being proportional to the terminal voltage (e.g., the output voltage 1082), and a compensation network (e.g., the compensation network 1012). The error amplifier (e.g., the error amplifier 1010) is further configured to, together with the compensation network (e.g., the compensation network 1012), generate the compensation signal (e.g., the compensation voltage 1011) based at least in part on the reference voltage (e.g., the reference voltage 1086) and the feedback voltage (e.g., the feedback voltage 1084). In yet another example, the system controller further includes a comparator (e.g., the comparator 1052) configured to receive the reference voltage (e.g., the reference voltage 1086) and the feedback voltage (e.g., the feedback voltage 1084) and generate a comparison signal (e.g., the comparison signal 1053) based at least in part on the reference voltage (e.g., the reference voltage 1086) and the feedback voltage (e.g., the feedback voltage 1084), and a NOT gate (e.g., the NOT gate 1054) configured to receive the comparison signal (e.g., the comparison signal 1053) and generate the third input signal (e.g., the signal 1055) based at least in part on the comparison signal (e.g., the comparison signal 1053). In yet another example, the system controller further includes the first input signal (e.g., the current-sensing voltage 1091) represents a magnitude of a first transistor current flowing through the first transistor (e.g., the transistor 1040), and the second input signal (e.g., the current-sensing voltage 1095) represents a magnitude of a second transistor current flowing through the second transistor (e.g., the transistor 1044).

In yet another example, the drive signal generator includes a flip-flop (e.g., the SR flip-flop 1022) configured to receive the first output signal (e.g., the peak-voltage control signal 1097) and the third output signal (e.g., the signal 1059) and generate a modulation signal (e.g., the modulation signal 1023) based at least in part on the first output signal and the third output signal, and a logic controller (e.g., the logic controller 1020) configured to receive the modulation signal (e.g., the modulation signal 1023) and generate a first logic signal (e.g., the logic signal 1031) and a second logic signal (e.g., the logic signal 1035) based at least in part on the modulation signal. Additionally, the drive signal generator further includes a first driver (e.g., the driver 1030) configured to receive the first logic signal (e.g., the logic signal 1031) and generate the first drive signal (e.g., the drive signal 1033) based at least in part on the first logic signal (e.g., the logic signal 1031), and a second driver (e.g., the driver 1034) configured to receive the second logic signal (e.g., the logic signal 1035) and generate the second drive signal (e.g., the drive signal 1037) based at least in part on the second logic signal (e.g., the logic signal 1035).

In yet another example, the first logic level is a logic low level, and the second logic level is a logic high level. In yet another example, the third logic level is the logic low level, and the fourth logic level is the logic high level. In yet another example, the drive signal generator (e.g., the combination of the logic controller 1020, the SR flip-flop 1022, and the drivers 1030 and 1034) is further configured to, in response to the first output signal (e.g., the peak-voltage control signal 1097) being at the first logic level and the third output signal (e.g., the signal 1059) changing from the first logic level to the second logic level, change, with or without the first delay, the first drive signal (e.g., the drive signal 1033) from the fourth logic level to the third logic level; and change, with or without a third delay, the second drive signal (e.g., the drive signal 1037) from the fourth logic level to the third logic level. In yet another example, the drive signal generator (e.g., the combination of the logic controller 1020, the SR flip-flop 1022, and the drivers 1030 and 1034) is further configured to, in response to the first output signal (e.g., the peak-voltage control signal 1097) being at the first logic level and the third output signal (e.g., the signal 1059) changing from the first logic level to the second logic level, change, with the first delay, the first drive signal (e.g., the drive signal 1033) from the fourth logic level to the third logic level; and change, without the third delay, the second drive signal (e.g., the drive signal 1037) from the fourth logic level to the third logic level.

In yet another example, the drive signal generator (e.g., the combination of the logic controller 1020, the SR flip-flop 1022, and the drivers 1030 and 1034) is further configured to, in response to the first output signal (e.g., the peak-voltage control signal 1097) changing from the first logic level to the second logic level and the third output signal (e.g., the signal 1059) changing from the second logic level to the first logic level, changing, with or without the second delay, the first drive signal (e.g., the drive signal 1033) from the third logic level to the fourth logic level; and changing, with or without a third delay, the second drive signal (e.g., the drive signal 1037) from the third logic level to the fourth logic level. In yet another example, the drive signal generator (e.g., the combination of the logic controller 1020, the SR flip-flop 1022, and the drivers 1030 and 1034) is further configured to, in response to the first output signal (e.g., the peak-voltage control signal 1097) changing from the first logic level to the second logic level and the third output signal (e.g., the signal 1059) changing from the second logic level to the first logic level, changing, without the second delay, the first drive signal (e.g., the drive signal 1033) from the third logic level to the fourth logic level; and changing, with the third delay, the second drive signal (e.g., the drive signal 1037) from the third logic level to the fourth logic level.

According to yet another embodiment, a method for a power converter (e.g., the power converter 600) includes:

receiving a first input signal (e.g., the current-sensing voltage 691), generating a first output signal (e.g., the peak-voltage control signal 697) based at least in part on the first input signal; receiving a compensation signal (e.g., the compensation voltage 611), and determining, under a continuous-conduction-mode, a second threshold (e.g., the valley-voltage threshold $V_{th\_va}$) based at least in part on the compensation signal (e.g., the compensation voltage 611). Additionally, the method further includes receiving a second input signal (e.g., the current-sensing voltage 695), generating a second output signal (e.g., the valley-voltage control signal 699) based at least in part on the second input signal, receiving the first output signal and the second output signal, generating a first drive signal (e.g., the drive signal 633) based at least in part on the first output signal and the second output signal, and generating a second drive signal (e.g., the drive signal 637) based at least in part on the first output signal and the second output signal. The generating a first output signal (e.g., the peak-voltage control signal 697) based at least in part on the first input signal includes, in response to the first input signal (e.g., the current-sensing voltage 691) becoming equal to or larger than a first threshold (e.g., the peak-voltage threshold $V_{th\_pe}$), changing the first output signal (e.g., the peak-voltage control signal 697) from a first logic level to a second logic level, and the generating a second output signal (e.g., the valley-voltage control signal 699) based at least in part on the second input signal includes, in response to the second input signal (e.g., the current-sensing voltage 695) becoming equal to or smaller than a second threshold (e.g., the valley-voltage threshold $V_{th\_va}$), changing the second output signal (e.g., the valley-voltage control signal 699) from the first logic level to the second logic level. The generating a first drive signal (e.g., the drive signal 633) based at least in part on the first output signal and the second output signal includes: in response to the first output signal (e.g., the peak-voltage control signal 697) being at the first logic level and the second output signal (e.g., the valley-voltage control signal 699) being at the second logic level, generating, with or without a first delay, the first drive signal (e.g., the drive signal 633) at a third logic level; and in response to the first output signal (e.g., the peak-voltage control signal 697) being at the second logic level and the second output signal (e.g., the valley-voltage control signal 699) being at the first logic level, generating, with or without a second delay, the first drive signal (e.g., the drive signal 633) at a fourth logic level, the fourth logic level being different from the third logic level. The determining, under a continuous-conduction-mode, a second threshold (e.g., the valley-voltage threshold $V_{th\_va}$) based at least in part on the compensation signal (e.g., the compensation voltage 611) includes, under the continuous-conduction-mode, in response to the compensation signal increasing in magnitude, increasing the second threshold (e.g., the valley-voltage threshold $V_{th\_va}$) in magnitude; and in response to the compensation signal decreasing in magnitude, decreasing the second threshold (e.g., the valley-voltage threshold $V_{th\_va}$) in magnitude. For example, the method is implemented according to at least FIG. 6.

According to yet another embodiment, a method for a power converter (e.g., the power converter 800) includes receiving a first input signal (e.g., the current-sensing voltage 891), generating a first output signal (e.g., the peak-voltage control signal 897) based at least in part on the first input signal, receiving a second input signal (e.g., the current-sensing voltage 895), and generating a second output signal (e.g., the valley-voltage control signal 899) based at least in part on the second input signal. Additionally, the method further includes generating a third output signal (e.g., the mode control signal 861), receiving a third input signal (e.g., the signal 855), the third output signal (e.g., the mode control signal 861) and the second output signal (e.g., the valley-voltage control signal 899), and generating a fourth output signal (e.g., the signal 859) based at least in part on the third input signal (e.g., the signal 855), the third output signal (e.g., the mode control signal 861) and the second output signal (e.g., the valley-voltage control signal 899). Moreover, the method further includes receiving the first output signal (e.g., the peak-voltage control signal 897) and the fourth output signal (e.g., the signal 859), generating a first drive signal (e.g., the drive signal 833) based at least in part on the first output signal and the fourth output signal, and generating a second drive signal (e.g., the drive signal 837) based at least in part on the first output signal and the fourth output signal. The generating a first output signal (e.g., the peak-voltage control signal 897) based at least in part on the first input signal includes, in response to the first input signal (e.g., the current-sensing voltage 891) becoming equal to or larger than a first threshold (e.g., the peak-voltage threshold $V_{th\_pe}$), changing the first output signal (e.g., the peak-voltage control signal 897) from a first logic level to a second logic level, and the generating a second output signal (e.g., the valley-voltage control signal 899) based at least in part on the second input signal includes, in response to the second input signal (e.g., the current-sensing voltage 895) becoming equal to or smaller than a second threshold (e.g., the valley-voltage threshold $V_{th\_va}$), changing the second output signal (e.g., the valley-voltage control signal 899) from the first logic level to the second logic level. The generating a first drive signal (e.g., the drive signal 833) based at least in part on the first output signal and the fourth output signal includes: in response to the first output signal (e.g., the peak-voltage control signal 897) being at the first logic level and the fourth output signal (e.g., the signal 859) being at the second logic level, generating, with or without a first delay, the first drive signal (e.g., the drive signal 833) at a third logic level; and in response to the first output signal (e.g., the peak-voltage control signal 897) being at the second logic level and the fourth output signal (e.g., the signal 859) being at the first logic level, generating, with or without a second delay, the first drive signal (e.g., the drive signal 833) at a fourth logic level. The fourth logic level is different from the third logic level. The generating a third output signal (e.g., the mode control signal 861) includes: in response to the second threshold (e.g., the valley-voltage threshold $V_{th\_va}$) being larger than a predetermined threshold (e.g., the mode threshold $V_{th\_mod}$), generating the third output signal (e.g., the mode control signal 861) at a fifth logic level; and in response to the second threshold (e.g., the valley-voltage threshold $V_{th\_va}$) being smaller than the predetermined threshold (e.g., the mode threshold $V_{th\_mod}$), generating the third output signal (e.g., the mode control signal 861) at a sixth logic level. The sixth logic level is different from the fifth logic level. For example, the method is implemented according to at least FIG. 8.

According to yet another embodiment, a method for a power converter (e.g., the power converter 1000) includes receiving a compensation signal (e.g., the compensation voltage 1011), determining, under a continuous-conduction-mode, a first threshold (e.g., the peak-voltage threshold $V_{th\_pe}$) based at least in part on the compensation signal (e.g., the compensation voltage 1011), receiving a first input signal (e.g., the current-sensing voltage 1091), and generating a first output signal (e.g., the peak-voltage control signal 1097) based at least in part on the first input signal. Additionally, the method further includes receiving a second input signal (e.g., the current-sensing voltage 1095), and generating a second output signal (e.g., the valley-voltage control signal 1099) based at least in part on the second input signal. Moreover, the method further includes receiving the first output signal (e.g., the peak-voltage control signal 1097) and a third output signal (e.g., the signal 1059) related to the second output signal (e.g., the valley-voltage control signal 1099); generating a first drive signal (e.g., the drive signal 1033) based at least in part on the first output signal and the third output signal; and generating a second drive signal (e.g., the drive signal 1037) based at least in part on the first output signal and the third output signal. The generating a first output signal (e.g., the peak-voltage control signal 1097) based at least in part on the first input signal includes, in response to the first input signal (e.g., the current-sensing voltage 1091) becoming equal to or larger than the first threshold (e.g., the peak-voltage threshold $V_{th\_pe}$), changing the first output signal (e.g., the peak-voltage control signal 1097) from a first logic level to a second logic level, and generating a second output signal (e.g., the valley-voltage control signal 1099) based at least in part on the second input signal includes, in response to the second input signal (e.g., the current-sensing voltage 1095) becoming equal to or smaller than a second threshold (e.g., the valley-voltage threshold $V_{th\_va}$), changing the second output signal (e.g., the valley-voltage control signal 1099) from the first logic level to the second logic level. The generating a first drive signal (e.g., the drive signal 1033) based at least in part on the first output signal and the third output signal includes: in response to the first output signal (e.g., the peak-voltage control signal 1097) being at the first logic level and the third output signal (e.g., the signal 1059) being at the second logic level, generating, with or without a first delay, the first drive signal (e.g., the drive signal 1033) at a third logic level; and in response to the first output signal (e.g., the peak-voltage control signal 1097) being at the second logic level and the third output signal (e.g., the signal 1059) being at the first logic level, generating, with or without a second delay, the first drive signal (e.g., the drive signal 1033) at a fourth logic level, the fourth logic level being different from the third logic level. The determining, under a continuous-conduction-mode, a first threshold (e.g., the peak-voltage threshold $V_{th\_pe}$) based at least in part on the compensation signal (e.g., the compensation voltage 1011) includes, under the continuous-conduction-mode, in response to the compensation signal increasing in magnitude, increasing the first threshold (e.g., the peak-voltage threshold $V_{th\_pe}$) in magnitude; and in response to the compensation signal decreasing in magnitude, decreasing the first threshold (e.g., the peak-voltage threshold $V_{th\_pe}$) in magnitude. For example, the method is implemented according to at least FIG. 10.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a power converter, the system controller comprising:
   a first current controller configured to receive a first input signal and generate a first output signal based at least in part on the first input signal;
   a second current controller configured to receive a second input signal, generate a second output signal based at least in part on the second input signal, and generate a third output signal;
   an output signal generator configured to receive a third input signal, the third output signal and the second output signal, and generate a fourth output signal based at least in part on the third input signal, the third output signal and the second output signal; and
   a drive signal generator configured to receive the first output signal and the fourth output signal, generate a first drive signal based at least in part on the first output signal and the fourth output signal, and generate a second drive signal based at least in part on the first output signal and the fourth output signal;
   wherein:
   the first current controller is configured to, in response to the first input signal becoming equal to or larger than a first threshold, change the first output signal from a first logic level to a second logic level; and
   the second current controller is configured to, in response to the second input signal becoming equal to or smaller than a second threshold, change the second output signal from the first logic level to the second logic level;
   wherein the drive signal generator is configured to:
   in response to the first output signal being at the first logic level and the fourth output signal being at the second logic level, generate, with or without a first delay, the first drive signal at a third logic level; and
   in response to the first output signal being at the second logic level and the fourth output signal being at the first logic level, generate, with or without a second delay, the first drive signal at a fourth logic level, the fourth logic level being different from the third logic level;
   wherein the second current controller is further configured to,
   in response to the second threshold being larger than a predetermined threshold, generate the third output signal at a fifth logic level; and
   in response to the second threshold being smaller than the predetermined threshold, generate the third output signal at a sixth logic level, the sixth logic level being different from the fifth logic level.

2. The system controller of claim 1 wherein:
the fifth logic level corresponds to a continuous-conduction-mode; and
the sixth logic level corresponds to a discontinuous-conduction-mode.

3. The system controller of claim 2 wherein:
the fifth logic level is a logic low level; and
the sixth logic level is a logic high level.

4. The system controller of claim 2 wherein the second current controller is further configured to, under the continuous-conduction-mode, in response to the compensation signal increasing in magnitude, increase the second threshold in magnitude; and in response to the compensation signal decreasing in magnitude, decrease the second threshold in magnitude.

5. The system controller of claim 1 wherein the output signal generator includes:

a NAND gate configured to receive the third input signal and the third output signal and generate a gate signal based at least in part on the third input signal and the third output signal; and an AND gate configured to receive the gate signal and the second output signal and generate the fourth output signal based at least in part on the gate signal and the second output signal.

6. The system controller of claim 1 wherein the first current controller is configured to, in response to the first input signal becoming equal to or larger than the first threshold, change the first output signal from the first logic level to the second logic level;

keep the first output signal at the second logic level for a predetermined period of time; and change the first output signal from the second logic level back to the first logic level.

7. The system controller of claim 1 wherein the second current controller is further configured to receive the first output signal.

8. The system controller of claim 7 wherein the second current controller is further configured to:

in response to the second input signal becoming equal to or smaller than the second threshold, change the second output signal from the first logic level to the second logic level; and in response to the first output signal changing from the first logic level to the second logic level, change the second output signal from the second logic level back to the first logic level.

9. The system controller of claim 1 wherein the drive signal generator is further configured to:

output the first drive signal to a first transistor including a first transistor terminal; and output the second drive signal to a second transistor including a second transistor terminal connected to the first transistor terminal;

wherein:

the first transistor terminal and the second transistor terminal are connected to a first inductor terminal of an inductor; and the inductor includes a second inductor terminal associated with a terminal voltage.

10. The system controller of claim 9, and further comprising:

an error amplifier configured to receive a reference voltage and a feedback voltage, the feedback voltage being proportional to the terminal voltage; and a compensation network;

wherein the error amplifier is further configured to, together with the compensation network, generate the compensation signal based at least in part on the reference voltage and the feedback voltage.

11. The system controller of claim 10, and further comprising:

a comparator configured to receive the reference voltage and the feedback voltage and generate a comparison signal based at least in part on the reference voltage and the feedback voltage; and a NOT gate configured to receive the comparison signal and generate the third input signal based at least in part on the comparison signal.

12. The system controller of claim 9, and further comprising:

the first input signal represents a magnitude of a first transistor current flowing through the first transistor; and the second input signal represents a magnitude of a second transistor current flowing through the second transistor.

13. The system controller of claim 1 wherein the drive signal generator includes:

a flip-flop configured to receive the first output signal and the fourth output signal and generate a modulation signal based at least in part on the first output signal and the fourth output signal;

a logic controller configured to receive the modulation signal and generate a first logic signal and a second logic signal based at least in part on the modulation signal;

a first driver configured to receive the first logic signal and generate the first drive signal based at least in part on the first logic signal; and a second driver configured to receive the second logic signal and generate the second drive signal based at least in part on the second logic signal.

14. The system controller of claim 1 wherein:

the first logic level is a logic low level; and the second logic level is a logic high level.

15. The system controller of claim 14 wherein:

the third logic level is the logic low level; and the fourth logic level is the logic high level.

16. The system controller of claim 1 wherein the drive signal generator is further configured to, in response to the first output signal being at the first logic level and the fourth output signal changing from the first logic level to the second logic level, change, with or without the first delay, the first drive signal from the fourth logic level to the third logic level; and change, with or without a third delay, the second drive signal from the fourth logic level to the third logic level.

17. The system controller of claim 16 wherein the drive signal generator is further configured to, in response to the first output signal being at the first logic level and the fourth output signal changing from the first logic level to the second logic level, change, with the first delay, the first drive signal from the fourth logic level to the third logic level; and change, without the third delay, the second drive signal from the fourth logic level to the third logic level.

18. The system controller of claim 1 wherein the drive signal generator is further configured to, in response to the first output signal changing from the first logic level to the second logic level and the fourth output signal changing from the second logic level to the first logic level, change, with or without the second delay, the first drive signal from the third logic level to the fourth logic level; and change, with or without a third delay, the second drive signal from the third logic level to the fourth logic level.

19. The system controller of claim 18 wherein the drive signal generator is further configured to, in response to the first output signal changing from the first logic level to the second logic level and the fourth output signal changing from the second logic level to the first logic level,
change, without the second delay, the first drive signal from the third logic level to the fourth logic level; and
change, with the third delay, the second drive signal from the third logic level to the fourth logic level.

20. A system controller for a power converter, the system controller comprising:
a first current controller configured to receive a compensation signal and a first input signal and generate a first output signal based at least in part on the first input signal;
a second current controller configured to receive a second input signal, generate a second output signal based at least in part on the second input signal; and
a drive signal generator configured to receive the first output signal and a third output signal related to the second output signal, generate a first drive signal based at least in part on the first output signal and the third output signal, and generate a second drive signal based at least in part on the first output signal and the third output signal;
wherein:
the first current controller is configured to, in response to the first input signal becoming equal to or larger than a first threshold, change the first output signal from a first logic level to a second logic level; and
the second current controller is configured to, in response to the second input signal becoming equal to or smaller than a second threshold, change the second output signal from the first logic level to the second logic level;
wherein the drive signal generator is configured to:
in response to the first output signal being at the first logic level and the third output signal being at the second logic level, generate, with or without a first delay, the first drive signal at a third logic level; and
in response to the first output signal being at the second logic level and the third output signal being at the first logic level, generate, with or without a second delay, the first drive signal at a fourth logic level, the fourth logic level being different from the third logic level;
wherein the first current controller is further configured to, under a continuous-conduction-mode,
in response to the compensation signal increasing in magnitude, increase the first threshold in magnitude; and
in response to the compensation signal decreasing in magnitude, decrease the first threshold in magnitude.

21. The system controller of claim 20 wherein the second current controller is further configured to receive the compensation signal.

22. The system controller of claim 21 wherein the second current controller is further configured to, under the continuous-conduction-mode,
in response to the second threshold being larger than a predetermined threshold, generate a fourth output signal at a fifth logic level; and
in response to the second threshold being smaller than the predetermined threshold, generate the fourth output signal at a sixth logic level, the sixth logic level being different from the fifth logic level.

23. The system controller of claim 22 wherein:
the fifth logic level corresponds to the continuous-conduction-mode; and
the sixth logic level corresponds to a discontinuous-conduction-mode.

24. The system controller of claim 23 wherein:
the fifth logic level is a logic low level; and
the sixth logic level is a logic high level.

25. The system controller of claim 20 wherein the second current controller is further configured to, under the continuous-conduction-mode,
in response to the compensation signal increasing in magnitude, increase the second threshold in magnitude; and
in response to the compensation signal decreasing in magnitude, decrease the second threshold in magnitude.

26. The system controller of claim 25 wherein the first current controller and the second current controller are further configured to, under the continuous-conduction-mode,
in response to the compensation signal increasing in magnitude, keep a result of the first threshold minus the second threshold constant; and
in response to the compensation signal decreasing in magnitude, keep the result of the first threshold minus the second threshold constant.

27. The system controller of claim 25 wherein the first current controller and the second current controller are further configured to, under the continuous-conduction-mode,
in response to the compensation signal increasing in magnitude, change a result of the first threshold minus the second threshold; and
in response to the compensation signal decreasing in magnitude, change the result of the first threshold minus the second threshold.

28. The system controller of claim 20 wherein the second current controller is configured to generate a fourth output signal.

29. The system controller of claim 28, and further comprising an output signal generator configured to receive a third input signal, the fourth output signal and the second output signal, and generate the third output signal based at least in part on the third input signal, the fourth output signal and the second output signal.

30. The system controller of claim 29 wherein the output signal generator includes:
a NAND gate configured to receive the third input signal and the fourth output signal and generate a gate signal based at least in part on the third input signal and the fourth output signal; and
an AND gate configured to receive the gate signal and the second output signal and generate the third output signal based at least in part on the gate signal and the second output signal.

31. The system controller of claim 20 wherein the first current controller is configured to, in response to the first input signal becoming equal to or larger than the first threshold,
change the first output signal from the first logic level to the second logic level;
keep the first output signal at the second logic level for a predetermined period of time; and change the first output signal from the second logic level back to the first logic level.

32. The system controller of claim 20 wherein the second current controller is further configured to receive the first output signal.

33. The system controller of claim 32 wherein the second current controller is further configured to:
  in response to the second input signal becoming equal to or smaller than the second threshold, change the second output signal from the first logic level to the second logic level; and
  in response to the first output signal changing from the first logic level to the second logic level, change the second output signal from the second logic level back to the first logic level.

34. The system controller of claim 20 wherein the drive signal generator is further configured to:
  output the first drive signal to a first transistor including a first transistor terminal; and
  output the second drive signal to a second transistor including a second transistor terminal connected to the first transistor terminal;
  wherein:
    the first transistor terminal and the second transistor terminal are connected to a first inductor terminal of an inductor; and
    the inductor includes a second inductor terminal associated with a terminal voltage.

35. The system controller of claim 34, and further comprising:
  an error amplifier configured to receive a reference voltage and a feedback voltage, the feedback voltage being proportional to the terminal voltage; and
  a compensation network;
  wherein the error amplifier is further configured to, together with the compensation network, generate the compensation signal based at least in part on the reference voltage and the feedback voltage.

36. The system controller of claim 35, and further comprising:
  a comparator configured to receive the reference voltage and the feedback voltage and generate a comparison signal based at least in part on the reference voltage and the feedback voltage; and
  a NOT gate configured to receive the comparison signal and generate the third input signal based at least in part on the comparison signal.

37. The system controller of claim 34, and further comprising:
  the first input signal represents a magnitude of a first transistor current flowing through the first transistor; and
  the second input signal represents a magnitude of a second transistor current flowing through the second transistor.

38. The system controller of claim 20 wherein the drive signal generator includes:
  a flip-flop configured to receive the first output signal and the third output signal and generate a modulation signal based at least in part on the first output signal and the third output signal;
  a logic controller configured to receive the modulation signal and generate a first logic signal and a second logic signal based at least in part on the modulation signal;
  a first driver configured to receive the first logic signal and generate the first drive signal based at least in part on the first logic signal; and
  a second driver configured to receive the second logic signal and generate the second drive signal based at least in part on the second logic signal.

39. The system controller of claim 20 wherein:
  the first logic level is a logic low level; and
  the second logic level is a logic high level.

40. The system controller of claim 39 wherein:
  the third logic level is the logic low level; and
  the fourth logic level is the logic high level.

41. The system controller of claim 20 wherein the drive signal generator is further configured to, in response to the first output signal being at the first logic level and the third output signal changing from the first logic level to the second logic level,
  change, with or without the first delay, the first drive signal from the fourth logic level to the third logic level; and
  change, with or without a third delay, the second drive signal from the fourth logic level to the third logic level.

42. The system controller of claim 41 wherein the drive signal generator is further configured to, in response to the first output signal being at the first logic level and the third output signal changing from the first logic level to the second logic level,
  change, with the first delay, the first drive signal from the fourth logic level to the third logic level; and
  change, without the third delay, the second drive signal from the fourth logic level to the third logic level.

43. The system controller of claim 20 wherein the drive signal generator is further configured to, in response to the first output signal changing from the first logic level to the second logic level and the third output signal changing from the second logic level to the first logic level,
  change, with or without the second delay, the first drive signal from the third logic level to the fourth logic level; and
  change, with or without a third delay, the second drive signal from the third logic level to the fourth logic level.

44. The system controller of claim 43 wherein the drive signal generator is further configured to, in response to the first output signal changing from the first logic level to the second logic level and the third output signal changing from the second logic level to the first logic level,
  change, without the second delay, the first drive signal from the third logic level to the fourth logic level; and
  change, with the third delay, the second drive signal from the third logic level to the fourth logic level.

45. A method for a power converter, the method comprising:
  receiving a first input signal;
  generating a first output signal based at least in part on the first input signal;
  receiving a second input signal;
  generating a second output signal based at least in part on the second input signal;
  generating a third output signal;
  receiving a third input signal, the third output signal and the second output signal;
  generating a fourth output signal based at least in part on the third input signal, the third output signal and the second output signal;

receiving the first output signal and the fourth output signal;
generating a first drive signal based at least in part on the first output signal and the fourth output signal; and
generating a second drive signal based at least in part on the first output signal and the fourth output signal;
wherein:
- the generating a first output signal based at least in part on the first input signal includes, in response to the first input signal becoming equal to or larger than a first threshold, changing the first output signal from a first logic level to a second logic level; and
- the generating a second output signal based at least in part on the second input signal includes, in response to the second input signal becoming equal to or smaller than a second threshold, changing the second output signal from the first logic level to the second logic level;

wherein the generating a first drive signal based at least in part on the first output signal and the fourth output signal includes:
- in response to the first output signal being at the first logic level and the fourth output signal being at the second logic level, generating, with or without a first delay, the first drive signal at a third logic level; and
- in response to the first output signal being at the second logic level and the fourth output signal being at the first logic level, generating, with or without a second delay, the first drive signal at a fourth logic level, the fourth logic level being different from the third logic level;

wherein the generating a third output signal includes:
- in response to the second threshold being larger than a predetermined threshold, generating the third output signal at a fifth logic level; and
- in response to the second threshold being smaller than the predetermined threshold, generating the third output signal at a sixth logic level, the sixth logic level being different from the fifth logic level.

46. A method for a power converter, the method comprising:
receiving a compensation signal;
determining, under a continuous-conduction-mode, a first threshold based at least in part on the compensation signal;
receiving a first input signal;
generating a first output signal based at least in part on the first input signal;
receiving a second input signal;
generating a second output signal based at least in part on the second input signal;
receiving the first output signal and a third output signal related to the second output signal;
generating a first drive signal based at least in part on the first output signal and the third output signal; and
generating a second drive signal based at least in part on the first output signal and the third output signal;
wherein:
- the generating a first output signal based at least in part on the first input signal includes, in response to the first input signal becoming equal to or larger than the first threshold, changing the first output signal from a first logic level to a second logic level; and
- generating a second output signal based at least in part on the second input signal includes, in response to the second input signal becoming equal to or smaller than a second threshold, changing the second output signal from the first logic level to the second logic level;

wherein the generating a first drive signal based at least in part on the first output signal and the third output signal includes:
- in response to the first output signal being at the first logic level and the third output signal being at the second logic level, generating, with or without a first delay, the first drive signal at a third logic level; and
- in response to the first output signal being at the second logic level and the third output signal being at the first logic level, generating, with or without a second delay, the first drive signal at a fourth logic level, the fourth logic level being different from the third logic level;

wherein the determining, under a continuous-conduction-mode, a first threshold based at least in part on the compensation signal includes, under the continuous-conduction-mode,
- in response to the compensation signal increasing in magnitude, increasing the first threshold in magnitude; and
- in response to the compensation signal decreasing in magnitude, decreasing the first threshold in magnitude.

* * * * *